United States Patent [19]

Yamamoto et al.

[11] Patent Number: 5,799,139
[45] Date of Patent: Aug. 25, 1998

[54] IMAGE FORMATION PROCESSING SYSTEM

[75] Inventors: Haruo Yamamoto; Katsumi Amakawa; Shuji Hayashi; Masaya Fujimoto; Koichi Matsuo; Ryuichi Okumura; Shinji Hayashi, all of Osaka, Japan

[73] Assignee: Mita Industrial Co., Ltd., Osaka, Japan

[21] Appl. No.: 831,598

[22] Filed: Apr. 10, 1997

Related U.S. Application Data

[63] Continuation of Ser. No. 237,791, May 4, 1994, abandoned.

[30] Foreign Application Priority Data

| May 12, 1993 | [JP] | Japan | 5-110331 |
| May 13, 1993 | [JP] | Japan | 5-111489 |
| May 14, 1993 | [JP] | Japan | 5-112005 |

[51] Int. Cl.$^6$ ............................................. G06F 15/00
[52] U.S. Cl. .................................................. 395/114
[58] Field of Search ........................... 395/101, 105, 395/106, 109, 111, 112, 113, 114, 117, 131, 132, 133, 515, 522, 523, 326, 200.06, 200.1, 200.15, 200.2, 680; 358/501, 448

[56] References Cited

U.S. PATENT DOCUMENTS

| 5,130,806 | 7/1992 | Reed et al. | 358/296 |
| 5,148,295 | 9/1992 | Matsubara | 358/451 |
| 5,197,117 | 3/1993 | Kato et al. | 395/105 |
| 5,206,929 | 4/1993 | Langford et al. | 395/328 |
| 5,226,112 | 7/1993 | Mensing et al. | 395/114 |
| 5,289,570 | 2/1994 | Suzuki | 395/783 |
| 5,313,580 | 5/1994 | Remion | 395/285 |
| 5,442,732 | 8/1995 | Matysek et al. | 395/116 |

FOREIGN PATENT DOCUMENTS

| 478352 | 4/1992 | European Pat. Off. |
| 532837 | 3/1993 | European Pat. Off. |
| 541398 | 5/1993 | European Pat. Off. |

OTHER PUBLICATIONS

QuarkXpress (Reference Manual) 1995 Puplication.
W. Horak Experimental Text and Facsimile Integrated Workstation, *1982 International Zurich Seminar on Digital Communications—Proceedings*, Mar. 1982, Zurich, CH, pp. 93-100.

*Primary Examiner*—Joseph Mancuso
*Assistant Examiner*—Gabriel I. Garcia
*Attorney, Agent, or Firm*—Beveridge, DeGrandi, Weilacher & Young, LLP

[57] ABSTRACT

A copying apparatus includes a copying machine unit, an operation portion having a central processing unit and an image processing unit having a central processing unit. A workstation is connected to the operation portion through the image processing unit. Data communication is performed between the workstation and the image processing unit and between the image processing unit and the operation portion. The image formation processing performed by the copying machine unit is controlled based on a command generated by operating the workstation.

17 Claims, 52 Drawing Sheets

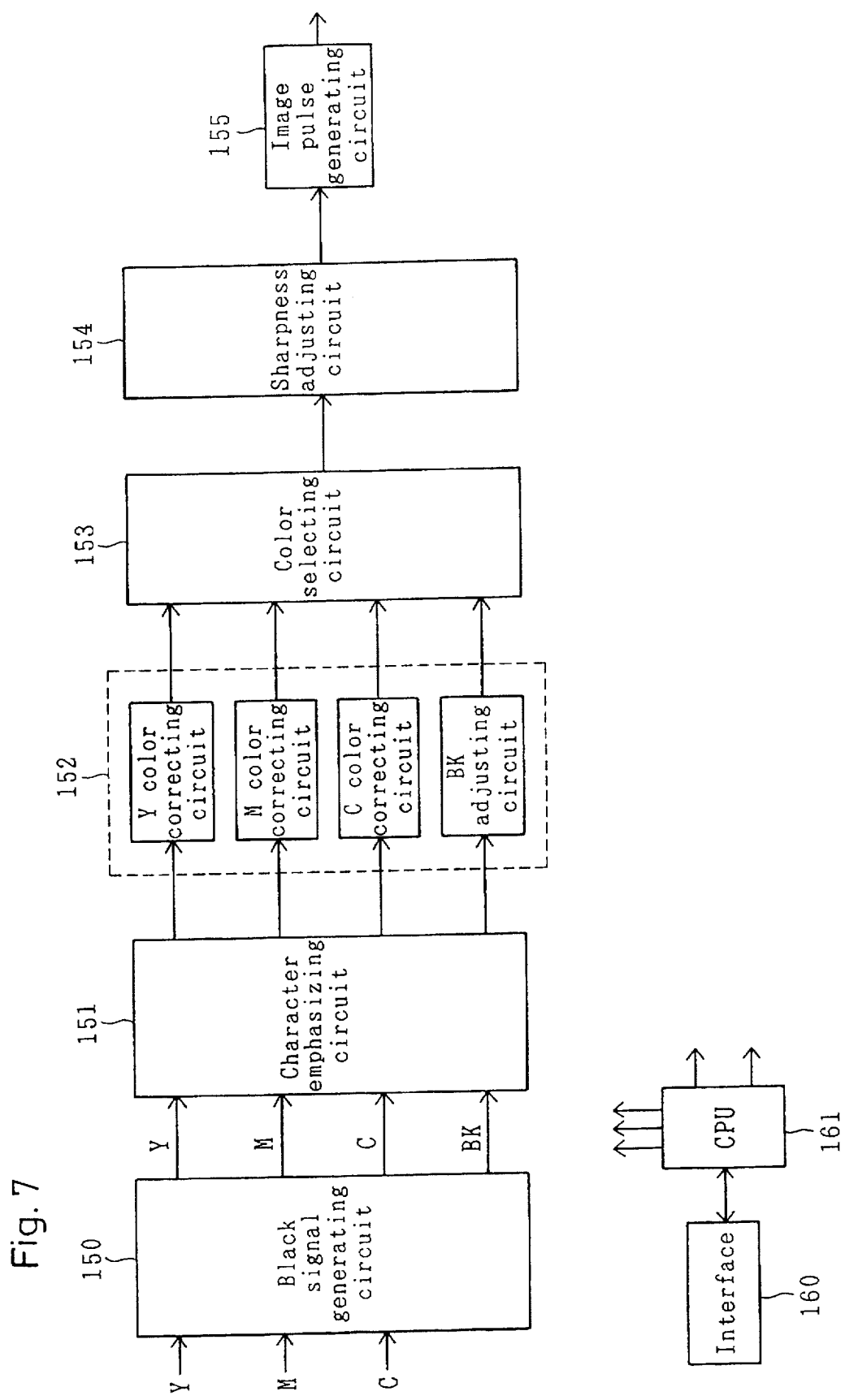

Fig. 24

IMAGE FORMATION PROCESSING SYSTEM

This application is a continuation, of application Ser. No. 08/237,791, filed May 4, 1994 which application is entirely incorporated herein by reference, now abandoned.

BACKGROUND OF THE INVENTION

1. Field of the Invention

The present invention relates to an image formation processing system which performs image formation processing of an image forming apparatus such as an electrophotographic copying machine.

2. Description of the Prior Art

Generally, an image forming apparatus such as an electrophotographic copying machine includes an operation portion. Image formation processing is performed in response to a user's operation of an on key on starting the operation portion. However, to improve the function of the electrophotographic copying machine, a system may be useful in which an original image read out by a scanner is processed through a terminal such as a personal computer and the processing result is printed out through the copying machine. In this case, however, it is necessary for the user to go over to the copying machine to push the printing key of the copying machine after operating the terminal.

SUMMARY OF THE INVENTION

An object of the present invention is to remove this inconvenience to improve the use and function of an image forming apparatus.

Another object of the present invention is to provide an image formation processing system wherein communication is performed with an image forming apparatus through a workstation so that operations such as image formation and printing are performed at the workstation.

A further object of the present invention is to provide an image processing system wherein an image forming operation is performed while a display on an image forming apparatus is viewed substantially on the workstation.

Yet another object of the present invention is to provide an image formation processing system wherein a control based on a command transmitted from the workstation is set on the image forming apparatus without failure.

To achieve the above-mentioned objects, an image formation system of the present invention is provided with the following: an image forming unit; an operation portion provided in the image forming unit and including a central processing unit capable of controlling image formation by the image forming unit based on an input data; an image processing unit including a central processing unit; and a workstation connected to the operation portion through the image processing unit. Data communication can be performed between the workstation and the image processing unit and between the image processing unit and the operation portion, and an image formation processing by the image forming unit can be controlled based on a command generated by operating the workstation.

According to such features, the image forming unit can be remote-controlled by transmitting commands, for example, with respect to printing, copy quantity setting, cassette selection, color balance adjustment and sharpness adjustment from the workstation to the image processing unit by operating the workstation, and by transmitting data corresponding to the commands from the image processing unit to the operation portion.

The image processing unit produces image forming unit controlling data of a same format as a format of data generated when a key on the operation portion is operated, in accordance with a condition setting request command transmitted from the workstation, and transmits the data to the operation portion. When no data showing that a setting in accordance with the command has been made is returned to the workstation, the workstation re-transmits the command.

According to such features, when the setting in accordance with the command is not realized in the image forming unit although the command has been transmitted, the workstation retransmits the command automatically. Therefore, it is unnecessary for the user to operate the workstation again. The retransmission of the command is also performed when, although the setting has been made in the image forming unit, it is not confirmed due to a communication error. Thus, the possibility is extremely strong that the setting of the image forming unit based on the command generated by the workstation is achieved without failure. As a result, the reliability of the image formation processing system increases and the inconvenience of operation when a communication error occurs is removed.

An image formation processing system of the present invention is provided with an image forming unit, a workstation capable of remote-controlling an image forming operation of the image forming unit, and display controlling means for providing a display associated with the remote control in the form of window on a display screen of the workstation.

According to such features, since a display such as a setting condition and an operation key of the image forming unit are provided in the form of window on the display screen of the workstation, the condition of the image forming unit is viewed on the workstation and the window of the operation key is operated by means of a mouse pointer. Since the key window is operated as if the key on the operation portion were directly operated, the user can remote-control the image forming unit without being confused.

BRIEF DESCRIPTION OF THE DRAWINGS

These and other objects and features of this invention will become clear from the following description, taken in conjunction with the preferred embodiments with reference to the accompanied drawings in which:

FIG. 7 is a block diagram of the image processing unit;

FIG. 24 is a flowchart of a subroutine F;

DESCRIPTION OF THE PREFERRED EMBODIMENTS

Figure 1:
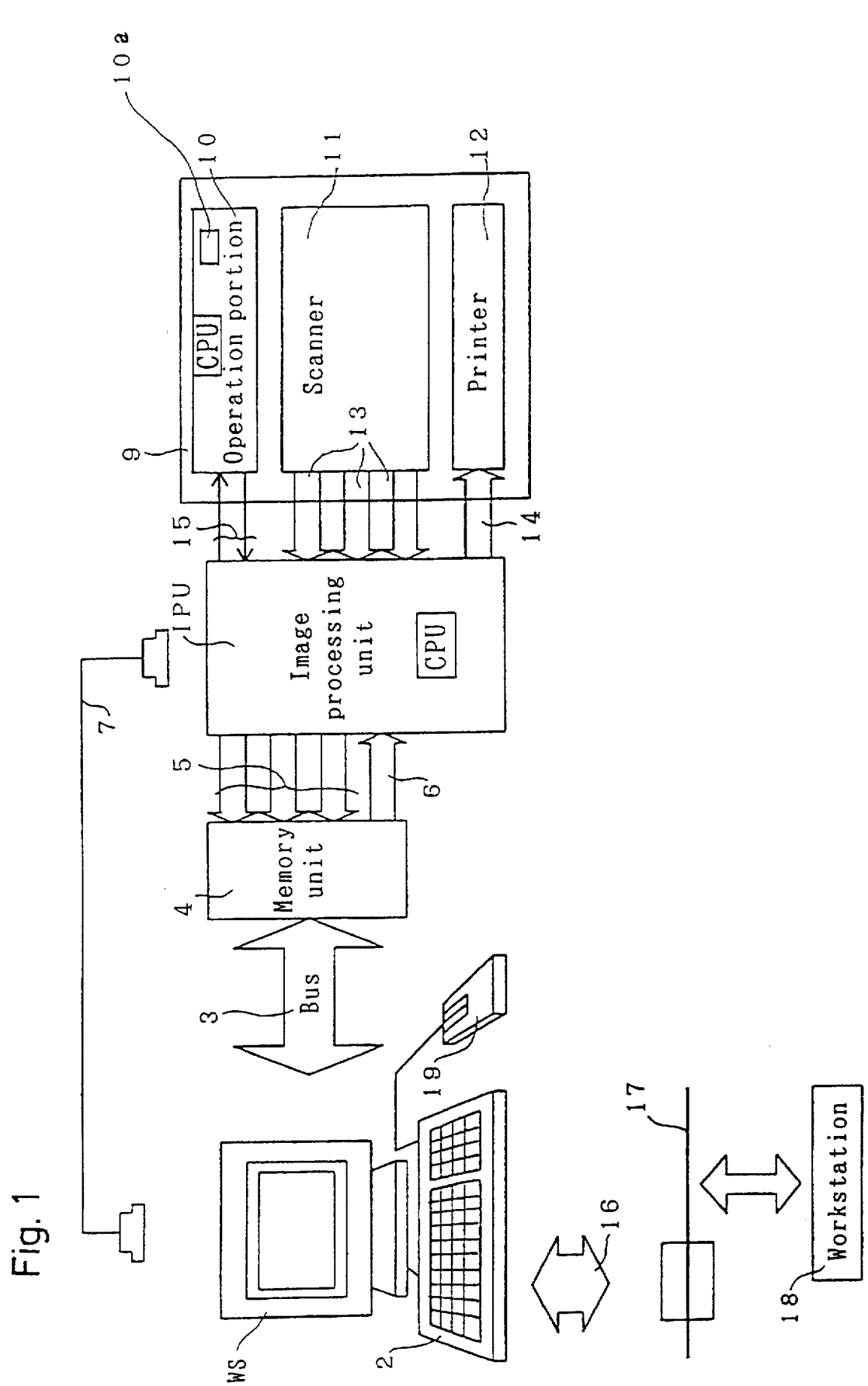
FIG. 1 is a schematic view showing the general arrangement of an image forming processing system embodying the present invention.

FIG. 1 is a block diagram schematically showing the general arrangement of an image formation processing system. Reference character WS represents a workstation. Reference numeral 2 represents a keyboard of the workstation WS. Reference numeral 19 represents a mouse. Reference numeral 3 represents a general purpose data bus. Reference numeral 4 represents a memory unit with a storage capacity of 128 MB. Reference numerals 5 and 6 represent special purpose data buses. Reference character IPU represents an image processing unit. Reference numeral 7 represents a control signal line connecting the workstation WS and the image processing unit IPU. Reference numeral 9 represents a color digital copying machine unit. The copying machine unit 9 includes an operation portion 10, a scanner section 11 for reading an original, and a printer section 12.

The image processing unit IPU communicates with the operation portion 10 of the copying machine unit 9 through a control signal line 15. The operation portion 10 has a non-illustrated central processing unit (CPU) which controls image formation by the copying machine unit 9 based on input data and a key panel 10a for setting copier functions. The CPU also communicates with the image processing unit IPU. Data buses 13 and 14 are for image data. Through the bus 13, an image data is transmitted from the scanner section 11 to the image processing unit IPU, where the image data is read. In a normal copy mode, image formation processing is performed by the copying machine unit 9 and the image processing unit IPU. The image processing unit IPU reads and processes an image data from the scanner section 11, and provides the processed data to the printer section 12 through the data bus 14. The printer section 12 performs a printing operation to form a color image based on the image data provided from the image processing unit IPU.

Thus, in the normal copy mode where image formation is performed only by the copying machine unit 9 and the image processing unit IPU, the processing is performed in real time. For this reason, the image processing unit IPU is not provided with a large capacity memory such as a frame memory. Therefore, in the normal copy mode, processing is not performed in a manner such that image data is stored in a memory and then the image data stored in the memory is processed. The real-time method is used in the normal copy mode in order to reduce the memory capacity of the image processing unit IPU and realize a rapid image formation. For example, storing the image data in the memory necessitates a large amount of memory capacity.

Assume now that the resolution of a color image is 400 dpi and the tone number for one dot is 256. For image data for an A3 size sheet, a storage capacity of 32 MB is required for one color. Since a color image is realized by four colors: magenta, cyan, yellow and black, a large capacity of memory with a storage capacity of 32×4=128 MB is required, which results in an increase in cost. Moreover, processing of an image data stored in such a memory necessitates reading/writing of 128 MB of data, which increases the processing time remarkably. For these reasons, the image processing unit IPU is not provided with a large capacity memory such as the frame memory, but it has a line memory and employs a pipeline method in which signal processing is performed for every line. Specifically, it has twenty to thirty 5-KB line memories (the total capacity of 30 of such line memories is only 150 KB).

The image processing unit IPU is incorporated into one body together with the copying machine unit 9 to constitute a copying machine system. In a copying operation by the copying machine system alone, as described above, an image data from the scanner section 11 is processed by the pipeline method substantially in real time, and the processed data is provided to the printer section 12. However, in another processing mode, that is, in a mode where processing is performed not only by the copying machine system, the image processing unit IPU supplies an image data from the scanner section 11 to the separately-provided memory unit 4 and provides an image data from the memory unit 4 to the printer section 12.

For example, through the image processing unit IPU, an image data read out by the scanner section 11 is stored in the memory unit 4 so that the workstation WS analyzes it, and the processed data is outputted to the printer section 12. A processing system which uses the workstation WS is advantageous over a processing system which uses only hardware since it has more flexibility and the range of processing functions is wider. The system which uses only hardware for processing is defective since it can perform only fixed functions provided by the hardware. The processing performed by means of software through the workstation WS is very effective, for example, in color correction processing. This is because multiplication coefficients and constants for color correction can appropriately be decided by means of software. Moreover, it is possible to cause the workstation WS and the memory unit 4 to cooperate to perform image composition processing. The result of the processing can be outputted as an image by means of the printer section 12.

The memory unit 4 has a storage capacity of 128 MB. Image data read by the scanner section 11 is inputted from the image processing unit IPU to the memory unit 4. Data is also outputted from the memory unit 4 to the image processing unit IPU. The memory unit 4 and the workstation WS are connected by the data bus 3. This connection enables the workstation WS to access the memory unit 4 directly, as a file and by other various access methods. With the above-described arrangement, image processing and evaluation can be performed.

However, another connection is required to control the copying machine unit 9 by the workstation WS. In this embodiment, the control of the copying machine unit 9 by means of the workstation WS is performed through the control signal line 7 and the image processing unit IPU. The control signal line 7 is connected to interfaces called RS-232C provided for the workstation WS and for the image processing unit IPU (see FIG. 14). The image processing unit IPU is also provided with a CPU for the setting of the image processing data and for the communication with the operation portion 10 and with the workstation WS.

The workstation WS which serves as a terminal also serves as a host in a subsequently-described remote control mode. As a terminal, it monitors the memory, sets data to a portion of the image processing unit IPU which processes data, reads data at input/output (I/O) ports. The workstation WS which is also connected to an ethernet 17 through a network connection 16 can exchange data with another workstation 18.

The workstation WS employs a window system, where a plurality of windows can be opened. As such windows, the following are provided: a terminal window serving as a terminal of the image processing unit IPU; an operation portion window for remote control; an image evaluating system window; and a simulation setting window.

Figure 14:
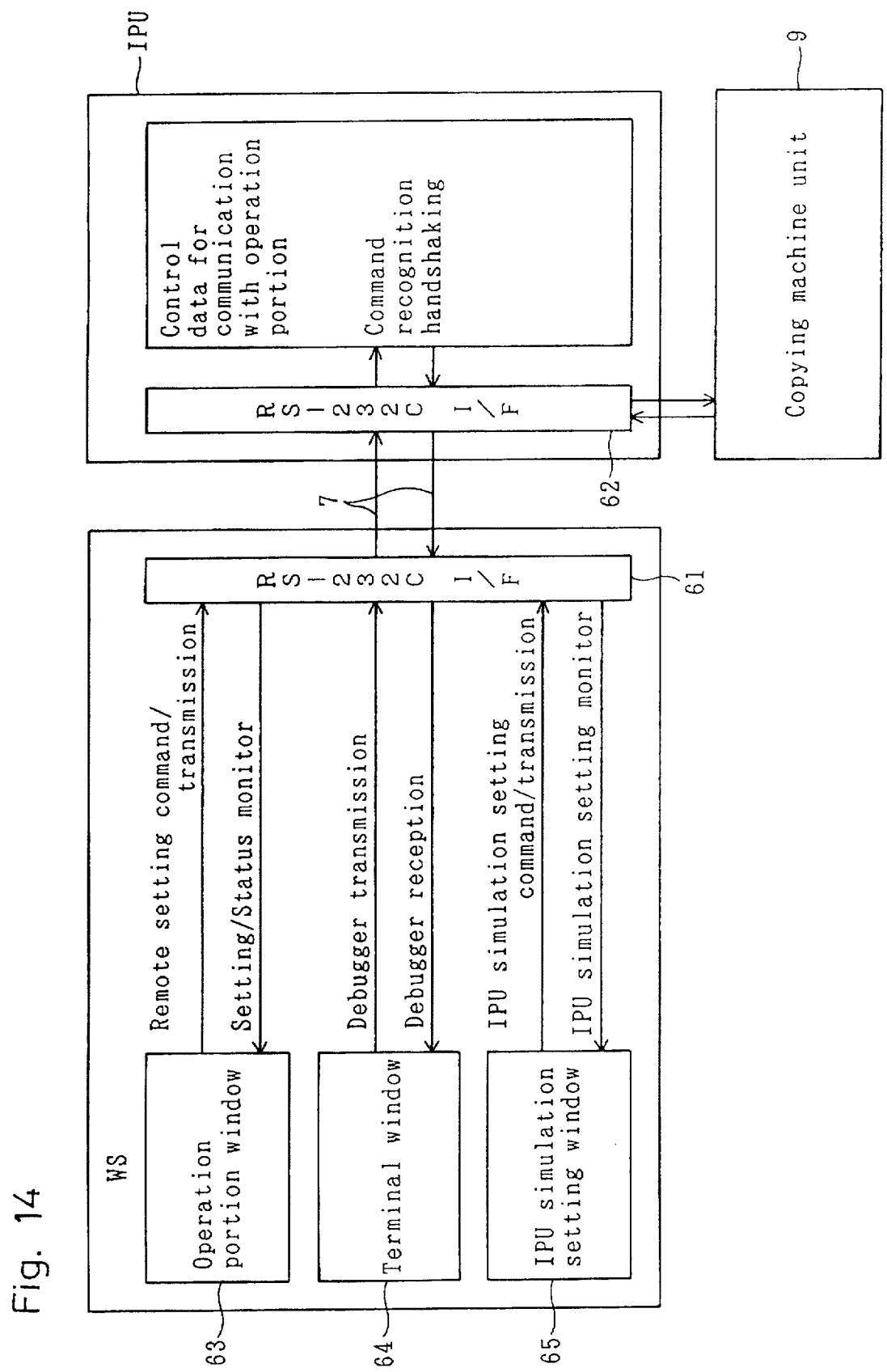
FIG. 14 is a view showing the kinds of windows of the workstation.

Of the windows, the operation portion window, the terminal window and the simulation setting window are shown in FIG. 14. The workstation WS and the image processing unit IPU exchange data through interfaces (RS-232C) 61 and 62 provided therefor and the control signal line 7 (see FIG. 1) as shown in FIG. 14. Reference numeral 63 represents the operation portion window as shown in FIGS. 2 to 5. Reference numeral 64 represents the terminal window opened when the workstation WS is used as a terminal. Reference numeral 65 represents the simulation setting window. "Debugger" in FIG. 14 is the name of a program which runs in a terminal mode.

The remote control window (and a remote control mode) will be described. The remote control mode will hereinafter be referred to as remote mode. First, the outline will be described. Assume now that the workstation has been turned on. When the copying machine unit 9 is turned on, software of the CPU provided in the operation portion 10 of the copying machine unit 9 runs and software of the CPU provided in the image processing unit IPU also runs. However, this only activates the normal copy mode. To activate the remote mode, a remote control command is transmitted from the workstation WS to the image processing unit IPU, the image processing unit IPU receives the command and makes a request of the operation portion 10 in accordance therewith, and the operation portion is brought into the remote mode and returns the result to the workstation WS through the image processing unit IPU.

In the remote mode thus activated, the workstation WS transmits a command to the image processing unit IPU in accordance with a control operation performed by the user. The image processing unit IPU decodes the command, sets a condition in accordance with the command through a communication with the operation portion 10 and notifies the workstation WS of the result.

Figure 2:
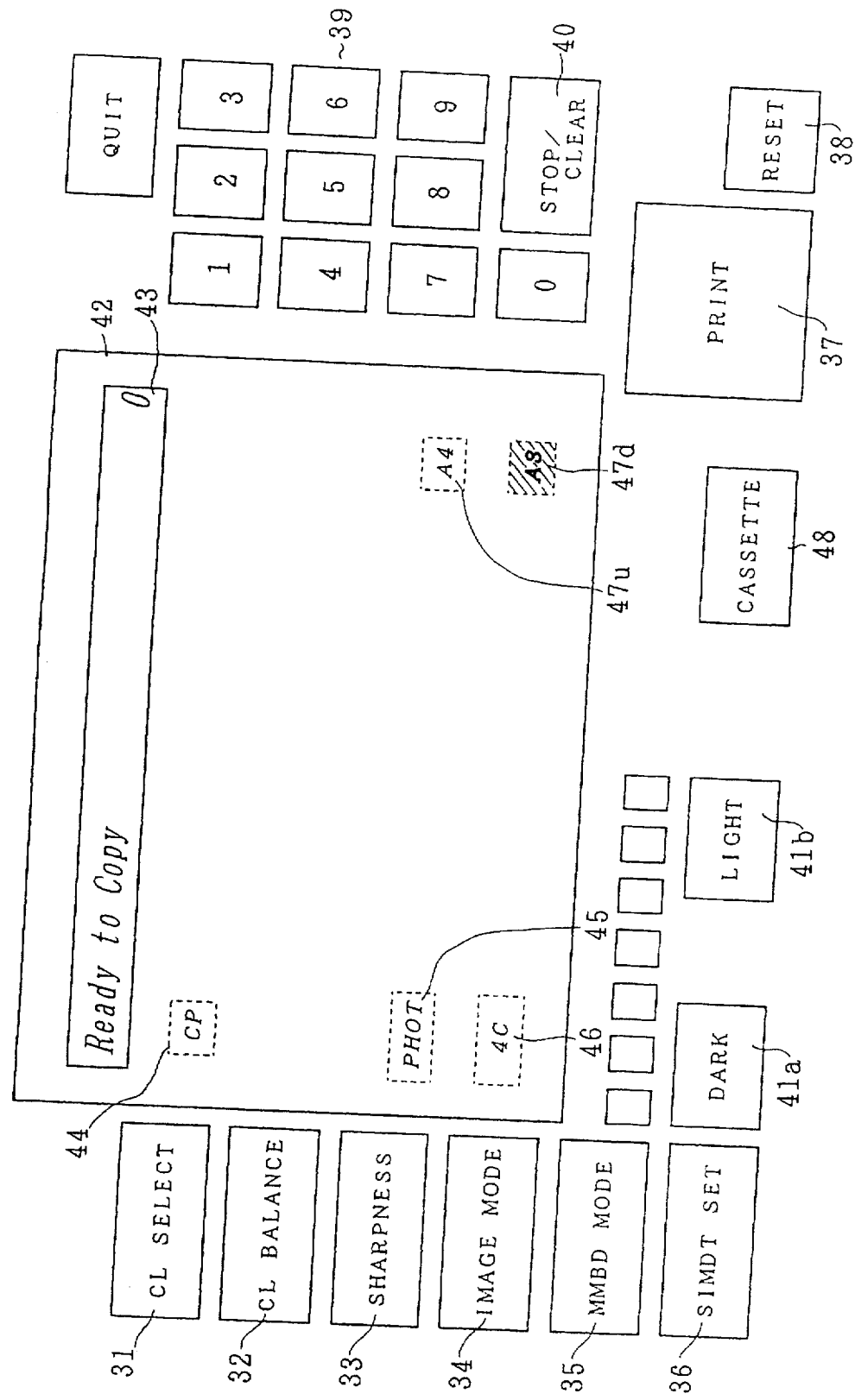
FIG. 2 is a view showing a remote mode display on a workstation of the system of FIG. 1.

When the remote mode is activated, a display as shown in FIG. 2 is provided on the workstation WS. This display (remote control panel) includes two kinds of windows: a key window which the user can operate by means of the mouse 19; and a display window which merely displays information such as machine conditions and setting conditions. For example, in FIG. 2, the following are provided as the key windows: a color selecting key 31; a color balance key 32; a sharpness key 33; an image mode key 34; a memory mode key 35; a simulation key 36; a printing key 37; a reset key 38; copy quantity setting keys 39; a stop/clear key 40; and a cassette key 48.

As the display window, the following windows are provided within a liquid crystal display (LCD) window 42 shown in FIG. 2: a message window 43; a memory unit mode display window 44; an image quality mode display window 45; a copy color display window 46; and cassette display windows. As the cassette display windows, an upper window 47u indicating an upper cassette and a lower window 47d indicating a lower cassette are provided.

The display windows have no frames except the message window 43. By providing no frames to the display windows, the display windows with no frames and the key windows with frames are distinguished visually. Of the display windows, in the memory unit mode display window 44, "CP", "IN" and "OUT" are displayed. "CP" represents a mode in which an image data is read by the scanner and outputted to the printer. "IN" represents a mode in which the image data from the scanner is taken into the memory unit. "OUT" represents a mode in which the image data is outputted from the memory unit.

The image quality mode displayed in the image quality mode display window 45 includes a character mode, a photo mode, a character/photo mode. FIG. 2 shows the photo mode (PHOT). The copy color display window 46 displays the color of a color image formed by the printer section 12. FIG. 2 shows that the image is to be formed by four colors (yellow, magenta, cyan and black). With respect to the cassette windows 47u and 47d, the color of the selected window (in the case of FIG. 2, the lower window 47d) is reverse to that of the non-selected one, for example, is, the background is black and characters are white.

Figure 3:
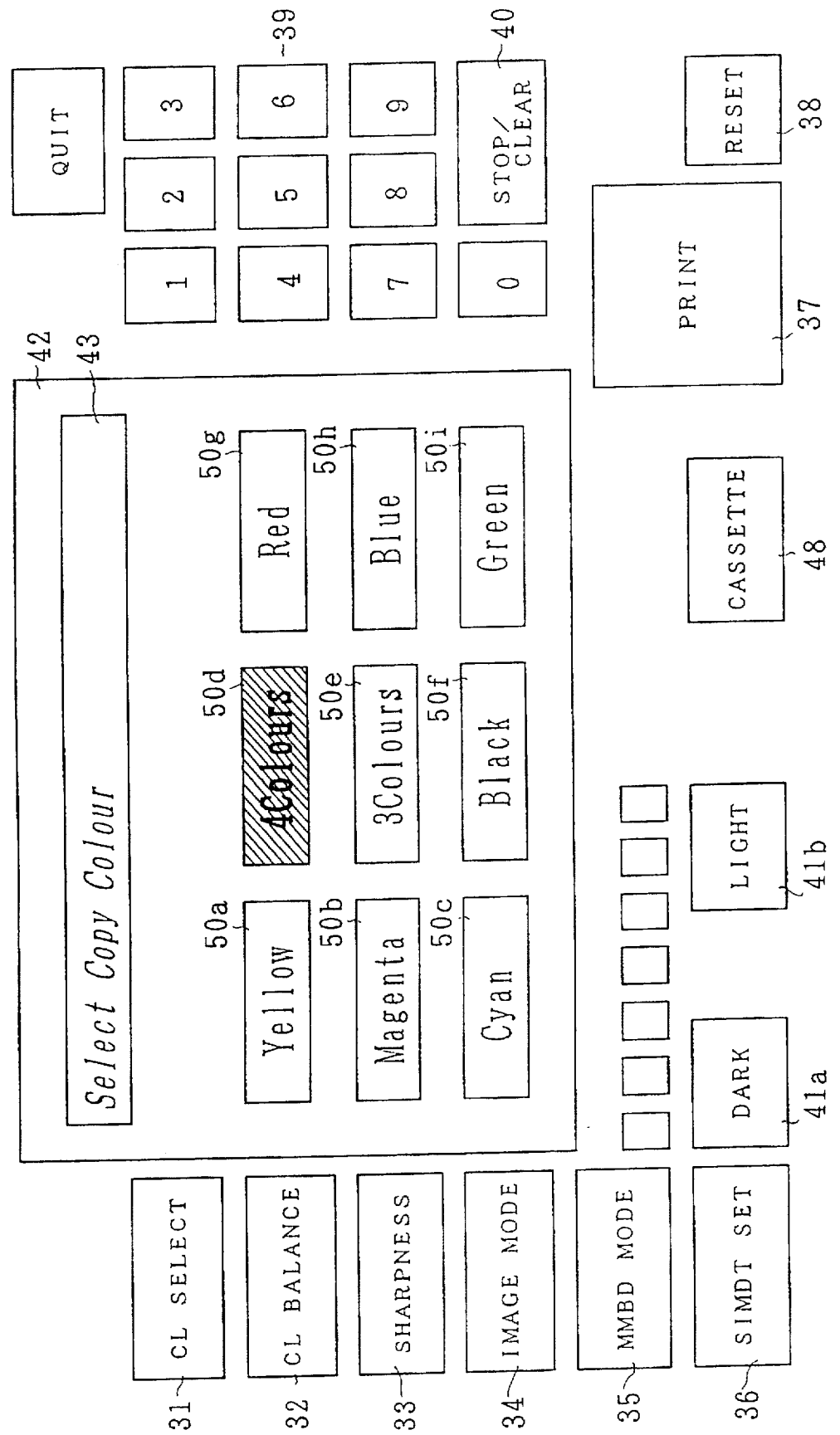
FIG. 3 is a view showing a color selection mode display of the workstation.
Figure 4:
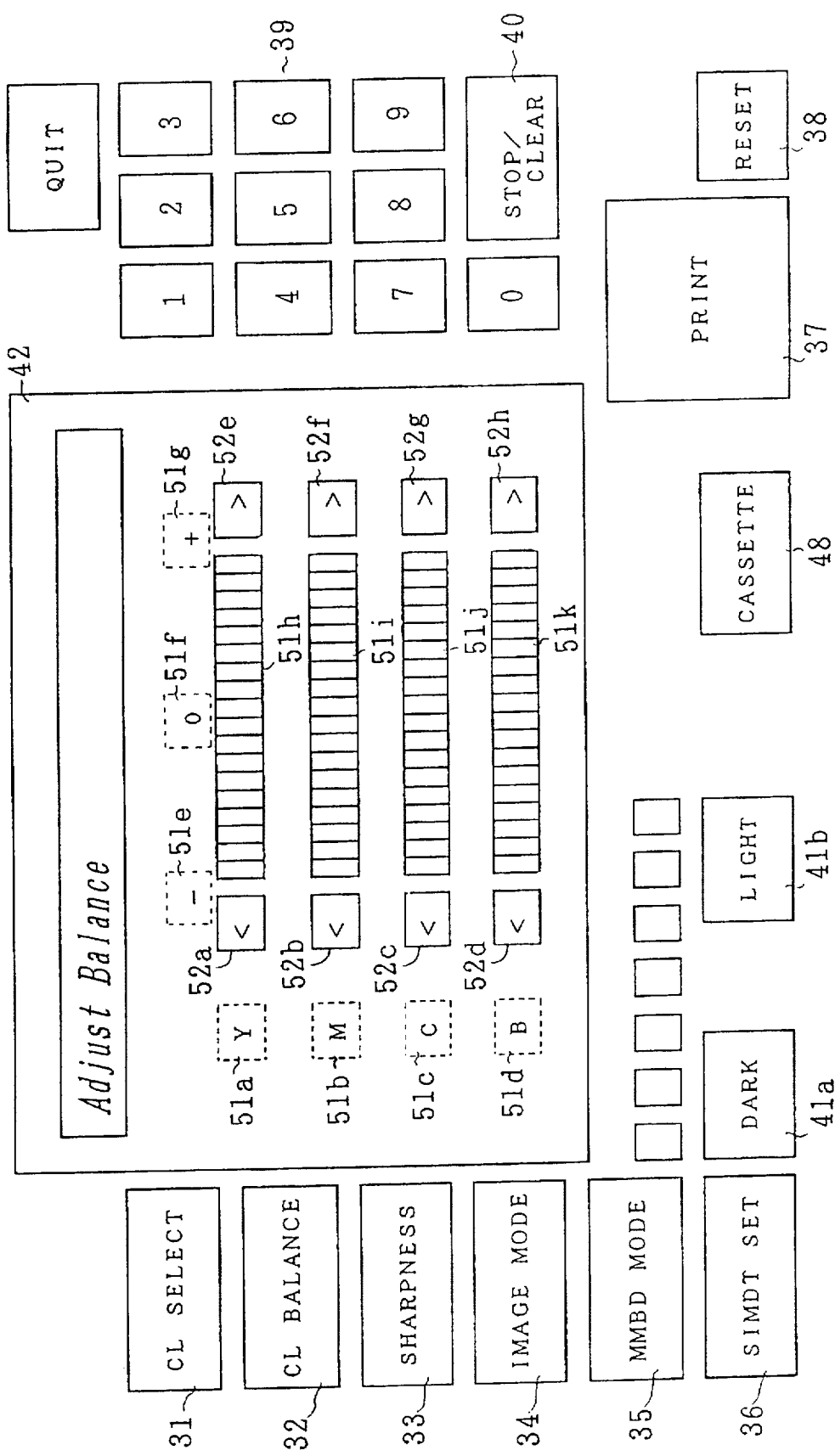
FIG. 4 is a view showing a color balance adjustment display of the workstation.
Figure 5:
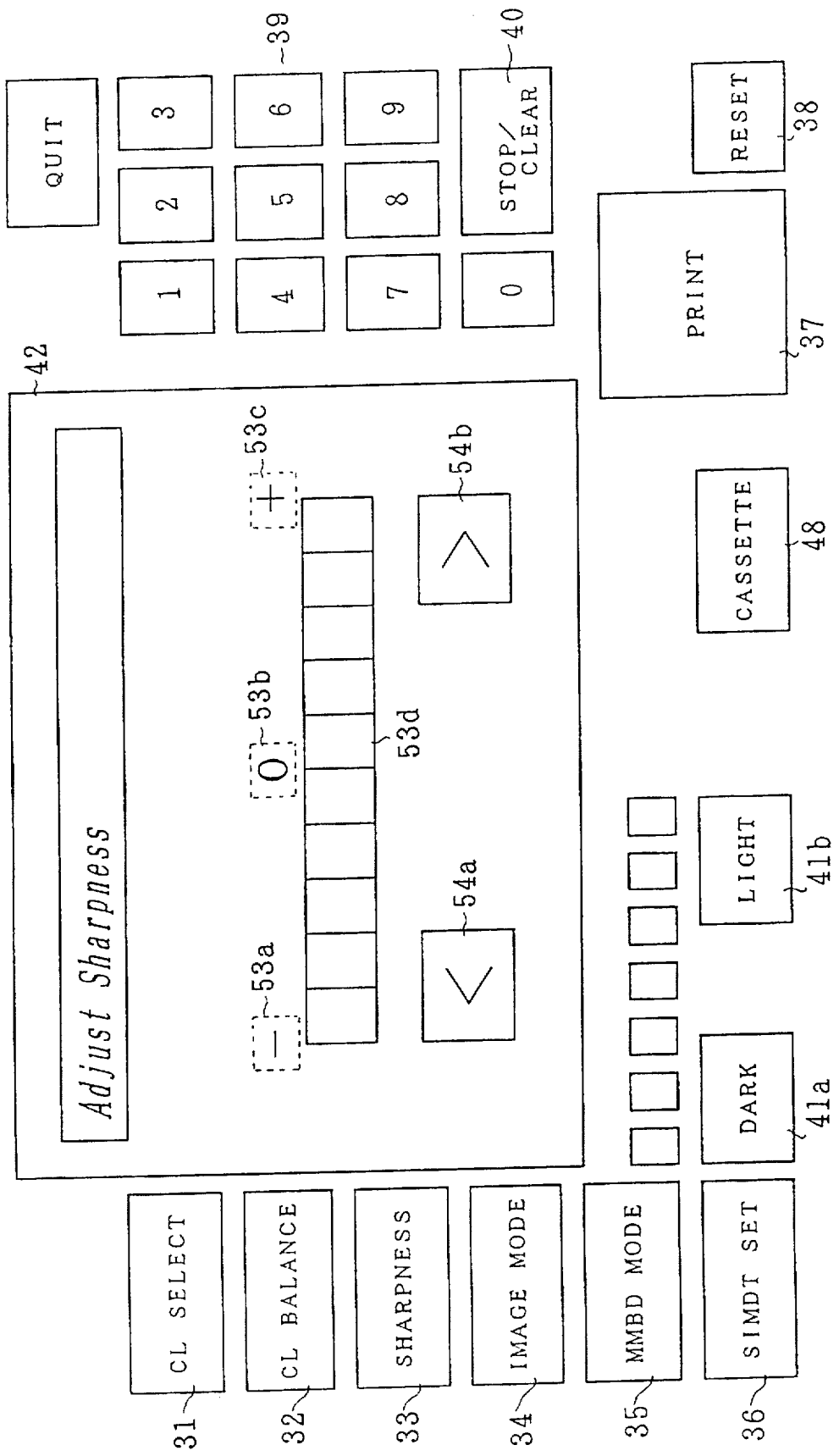
FIG. 5 is a view showing a sharpness adjustment display of the workstation.

In the message window 43 are displayed messages such as "Ready to Copy", "Waiting", "Copying" and "Jamming." Also displayed are messages such as "Select Copy Color" as shown in FIG. 3, "Adjust Balance" as shown in FIG. 4 and "Adjust Sharpness" as shown in FIG. 5.

In this embodiment, the key windows which are operable and the display windows which are inoperable are controlled in different display manners. Moreover, since the key windows are sometimes operable and sometimes inoperable, the display manner is changed to distinguish the two conditions. Specifically, when the pointer of the mouse 19 is moved into an inoperable window, the color of the window is not changed, whereas when the pointer is moved into an operable window, the color of the window frame is changed from navy to red and the color of the characters in the window is reversed from black to white.

Assume now that the cassette key 48 is operable. When the pointer is moved in the cassette key 48, the color of the window frame thereof is changed from navy to red and the characters "CASSETTE" in the window are reversed from black to white. When the pointer is moved out of the window (cassette key 48) without the mouse button being pushed, the color of the window frame is returned from red to navy and the color of the characters in the window is returned from white to black. However, assume that the printing key 37 is inoperable ; the colors of the window frame and characters are changed neither when the pointer is moved in the printing key 37 nor when it is moved out of the printing key 37. Moreover, when the pointer is moved in or out of the display windows 43, 44, 45, 46, 47d and 47u designed to be inoperable, the frames and characters thereof are not changed.

When the mouse button is pushed while the pointer is in the window of the cassette key 48, the color of the background in the widow is reversed. A cassette change command is generated by the workstation WS the instant that the mouse button is pushed, and the command is transmitted to the image processing unit IPU as a communication data. After recognizing the command, the image processing unit IPU generates a data showing that the cassette key 48 has been operated, and transmits the data to the operation portion 10 of the copying machine unit 9. At the operation portion 10, a data showing that the presently-selected cassette is changed from the lower cassette to the upper cassette is generated and the result is transmitted to the image processing unit IPU.

The image processing unit IPU recognizes this, and returns to the workstation WS a data showing that a cassette change has been made on the operation portion. When the data showing that the upper cassette has been selected is returned, the workstation WS returns the color of the background in the window 48 to the original color. In other words, the color of the background in the window reversed when the mouse button is pushed remains reversed while the processing is being executed to indicate that the processing is being executed, and when the processing ends, the color of the background is returned to the original color to indicate that the processing ends.

The windows of FIG. 2 correspond to displays and operation keys of the operation portion 10 of the copying machine unit 9. Conversely, the operation portion 10 is provided with displays and manually operating keys similar to these windows. Since the displays of the workstation WS are the same as those of the operation portion 10 of the copying machine unit 9, the user can operate the workstation WS without being confused. However, at the operation portion 10, key selection is not made by means of the pointer, and the frames and characters of the keys are not changed (however, the color of the background is changed in some keys).

The display in the LCD window is changed as shown in FIGS. 3, 4 and 5 when the color selecting key 31, the color balance key 32 and the sharpness key 33 are operated. When the color selecting key 31 for specifying the color of a color image formed by the printer section 12 is operated, the display in the LCD window 42 is changed to the one as shown in FIG. 3. In this LCD display window 42, while the message window 43 is inoperable, the selection among yellow, magenta, cyan, black, 4 colors, 3 colors, red, blue and green windows 50a to 50i is made by means of the mouse pointer.

In FIG. 3, "4 colors "(the use of four colors which are yellow, magenta, cyan and black) is selected. In this case, in the selected window, the colors of the background and characters are reversed. When the display of FIG. 3 is in the window 42, the color of the background of the color select key 31 is yellow to indicate that the color select mode is ON.

When the color balance key 32 is operated under the condition shown in FIG. 2, the display as shown in FIG. 4 is provided. The windows displayed in the LCD window 42 are Y (yellow), M (magenta), C (cyan), B (black), –, 0, + and graduations display windows 51a to 51k and eight key windows 52a to 52h for changing the quantities of the colors. Normally, the quantities of yellow, magenta, cyan and black are all initialized to 0. When an increase in quantity of, for example, yellow is intended, the quantity of yellow is shifted toward the + side by operating the key 52e. When the color balance key is again operated after the color balance setting is finished, the display is returned to the one shown in FIG. 2. However, when the quantity of at least one of the colors is increased from 0, the color balance key is still yellow after the display is returned to the one shown in FIG. 2, thereby notifying the user that the color balance has been changed.

When the sharpness key 33 is operated under the condition shown in FIG. 2, the display is changed to the one as shown in FIG. 5. The windows displayed in the LCD window 42 are –, 0, + and sharpness graduations windows 53a to 53c and operation key windows 54a and 54b for adjusting sharpness. When the sharpness key 33 is again operated after the sharpness adjustment is finished, the display is returned to the one shown in FIG. 2. However, when the sharpness is increased from 0, the sharpness key is still yellow after the display is returned to the one shown in FIG. 2, thereby notifying the user that the sharpness has been changed.

As described above, the remote operation is performed in an X window of the workstation WS and the controls are all realized by means of the mouse 19. The window control realizes the visualization, and in the window, the same or similar keys are arranged in the same manner as the operation portion 10 of the copying machine unit 9. Moreover, the displays are also the same as those of the operation portion 10. By these features, the operation is facilitated. The LCD window 42 is called an LCD window in this specification since the corresponding display portion of the operation portion 10 of the copying machine unit 9 comprises an LCD (liquid crystal display).

Figure 6:
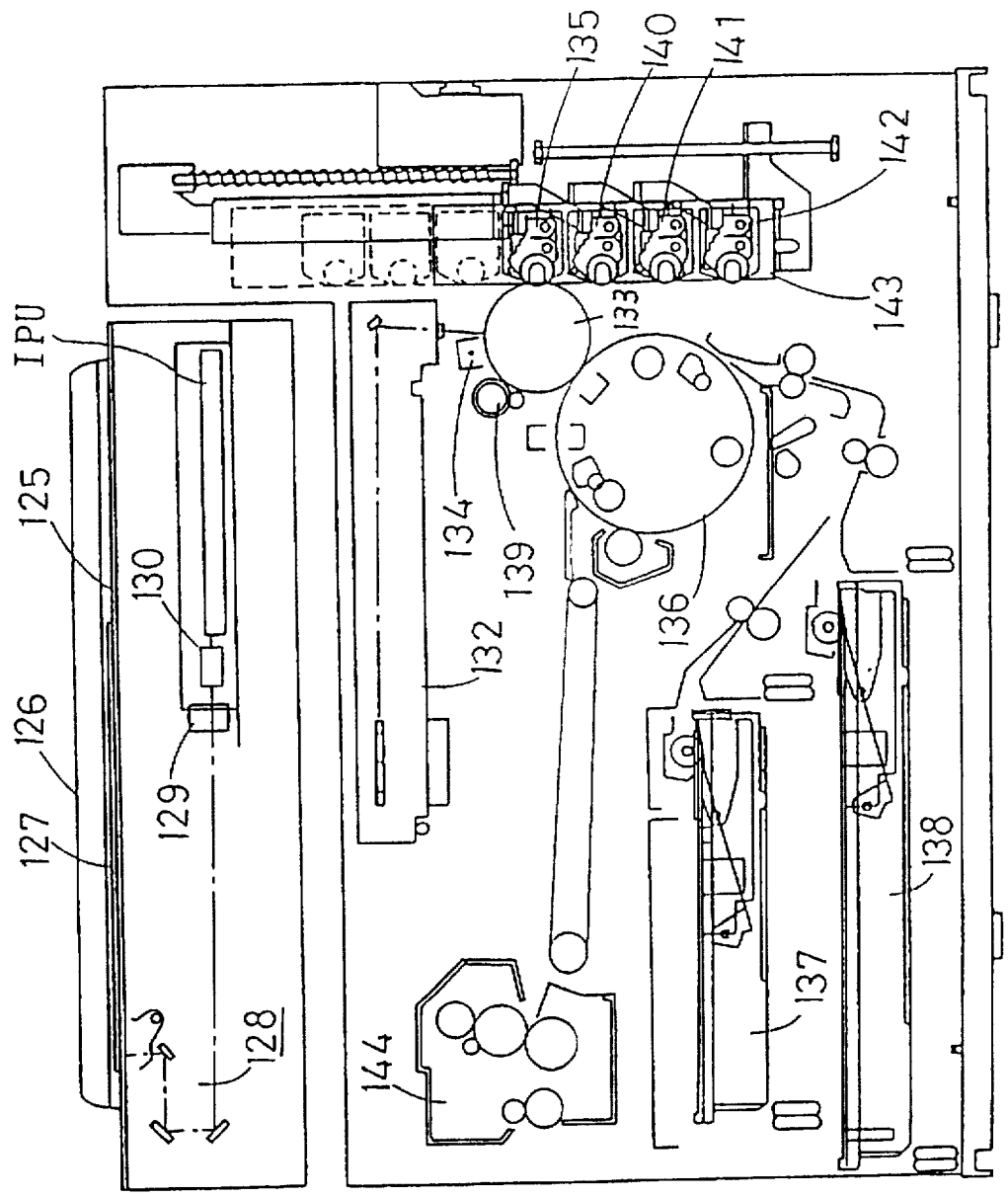
FIG. 6 is a view showing a copying machine system comprising a copying machine unit and an image processing unit.

FIG. 6 is a schematic view of a color digital copying machine comprising the copying machine unit 9 and the image processing unit IPU. The color copying operation in the normal mode will be described. A color original 127 placed on a contact glass 125 while being pressed thereagainst by an original cover 126 is scanned by a scanning optical system constituting the scanner section 11 (FIG. 1). With light as a medium, image information of the color original 127 is directed from a condenser lens 129 to an image signal generator 130 having a light receiving device such as a charge coupled device (CCD), where the image information is converted into an electric signal. After necessary signal processing such as the generation of a color image data of black is performed at the image processing unit IPU, a latent image is formed on a photoreceptor drum 133 by the laser scanner unit 132. Prior to this operation, the surface of the photoreceptor drum 133 is charged by a main charger 134.

To form a color image, first, a latent image is formed on the photoreceptor drum 133 by a laser beam based on a color image data of yellow on which signal processing has been executed, and the latent image is developed by a Y developer unit 135. The Y developer unit 135 which contains yellow toner develops the latent image on the photoreceptor drum 133 with the yellow toner. The image on the photoreceptor drum 133 developed with yellow toner is transferred onto a sheet of paper arranged to wind around the surface of a transferring drum 136. The sheet is supplied by way of a paper feeding path from a paper feeding cassette 137 or 138. The sheet remains on the surface of the transferring drum 136 ready for the image transferring of the next color.

Specifically, residual toner and charge are removed by a cleaning unit 139 and a charge removing unit (not shown), respectively, and the photoreceptor drum 133 is charged again by the main charger 134. Then, a latent image corresponding to a magenta image on the photoreceptor drum 133 formed by a laser beam for forming a latent image based on magenta color image data is developed by an M developer unit 140. At this time, the M developer unit 140 which has been brought to a position opposite to the photoreceptor drum 133 in place of the Y developer unit 135 develops the latent image with magenta toner.

In this embodiment, as shown in FIG. 6, the Y developer unit 135 for development of yellow images, the M developer unit 140 for development of magenta images, a C developer unit 141 for development of cyan images and a BK developer unit 142 for development of black images are successively fixed in a vertical direction to a moving member 143 which vertically moves. These developer units are alternatively brought to a development position (the position opposite to the photoreceptor drum 133) in accordance with the color image data used for forming a latent image by means of a laser beam.

The image on the photoreceptor drum 133 developed with magenta toner is transferred onto the sheet of paper (the sheet of paper on which the yellow image has been transferred) on the transferring drum 136. A cyan image and a black image are further transferred onto the sheet in a similar manner. The sheet on which the color image has been formed is separated from the transferring drum 136, and after the image is fixed by a fixing unit 144, the sheet is discharged from the electro-photographic copying machine unit 9.

The image processing unit IPU includes, as shown in FIG. 7, a black signal generating circuit 150 for generating a black signal based on Y, M and C signals from the previously-mentioned image signal generator 130, a character emphasizing circuit 151, color correcting circuits 152, a color selecting circuit 153 for determining which color the image is formed in, a sharpness adjusting circuit 154 (having differentiating and integrating filters) for changing the sharpness of the image, an image pulse generating circuit 155 for generating a laser beam driving pulse based on an image signal, an interface 160, and a CPU 161 for various controls and communication with the workstation WS through the interface 160.

Referring now to FIGS. 8 to 13, data transfer (handshaking) among the workstation WS, the image processing unit IPU and the operation portion 10 will be described. FIG. 8A shows a handshaking when the remote mode is activated. When the program is activated on the workstation WS (S1), a remote setting request command is generated. The command is transmitted to the image processing unit IPU. Receiving the command, the image processing unit IPU sets a remote mode flag to ON (S3), and transmits it to the operation portion 10. Moreover, since the normal mode is not the remote mode, the image processing unit IPU sets a condition change request flag to 1 to change the present condition from the normal mode condition to the remote mode condition and transmits it to the operation portion 10.

Receiving the condition change request, the operation portion 10 determines whether the remote mode is ON or OFF. Since the remote mode is ON under the present condition, the operation portion 10 sets a remote mode flag to ON (S5) and transmits it to the image processing unit IPU. It also sets a condition change recognition flag to 1 and transmits it to the image processing unit IPU. The copying machine unit 9 is not brought into the remote mode until the condition change recognition flag is set to 1 and received by the image processing unit IPU.

Receiving the condition change recognition flag, the image processing unit IPU transmits to the workstation WS a remote setting recognition command representing that the copying machine is in a remote control possible condition (S7). It also sets the condition change request flag to 0 and transmits it to the operation portion (S8). Receiving the condition change request flag, the operation portion sets the condition change recognition flag to 0 and transmits it to the image processing unit IPU.

Figure 8A:
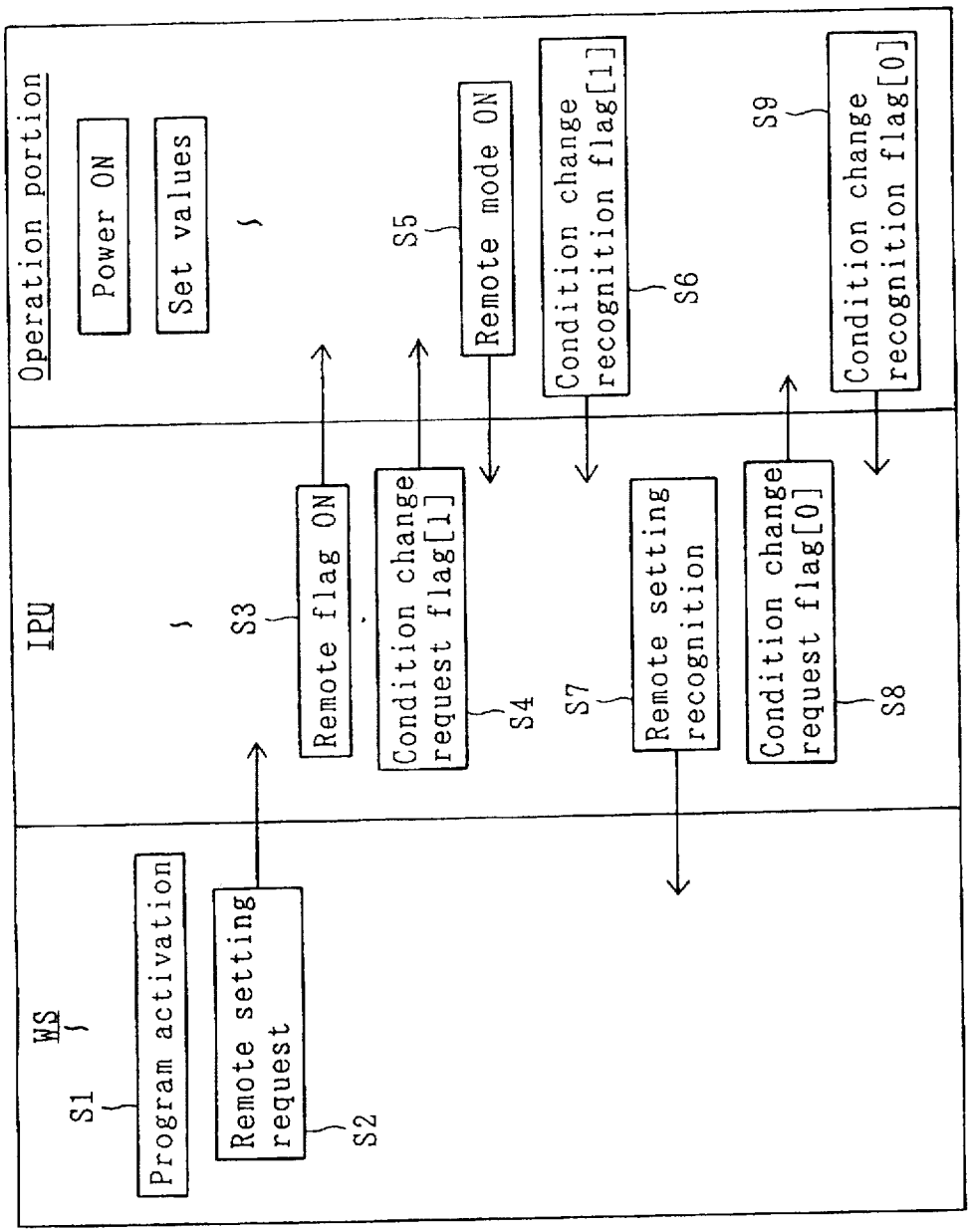
FIGS. 8A and 8B are views showing communications among the workstation, an image processing unit and an operation portion in a remote mode.
Figure 8B:
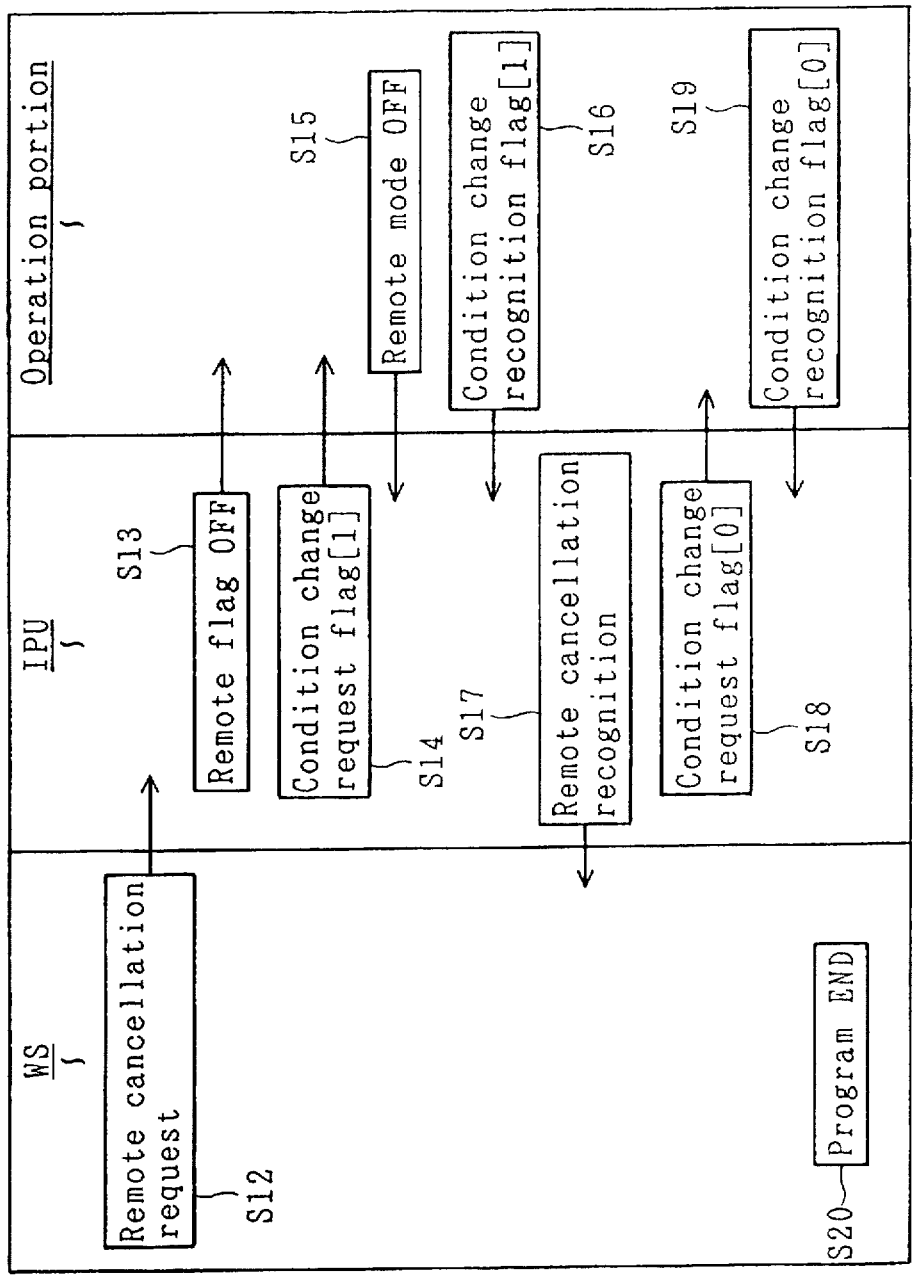

The remote mode is set in the above-described manner. The cancellation of the remote mode is performed in a manner as shown in FIG. 8B. In this case, a remote mode cancellation request command is generated by the workstation WS and transmitted to the image processing unit IPU (S12). The remaining part of the handshaking is the same as that of FIG. 8A except that the remote mode flag is reset to OFF and that "setting" is replaced by "cancellation".

The handshaking among the workstation WS, the image processing unit IPU and the operation portion 10 is performed in order to avoid a situation in which although the workstation WS is in the remote mode, the copying machine cannot be remote-controlled since the copying machine is not in the remote mode. The requests subsequently described with reference to FIGS. 9 to 13 are made for the same reason.

Figure 9:
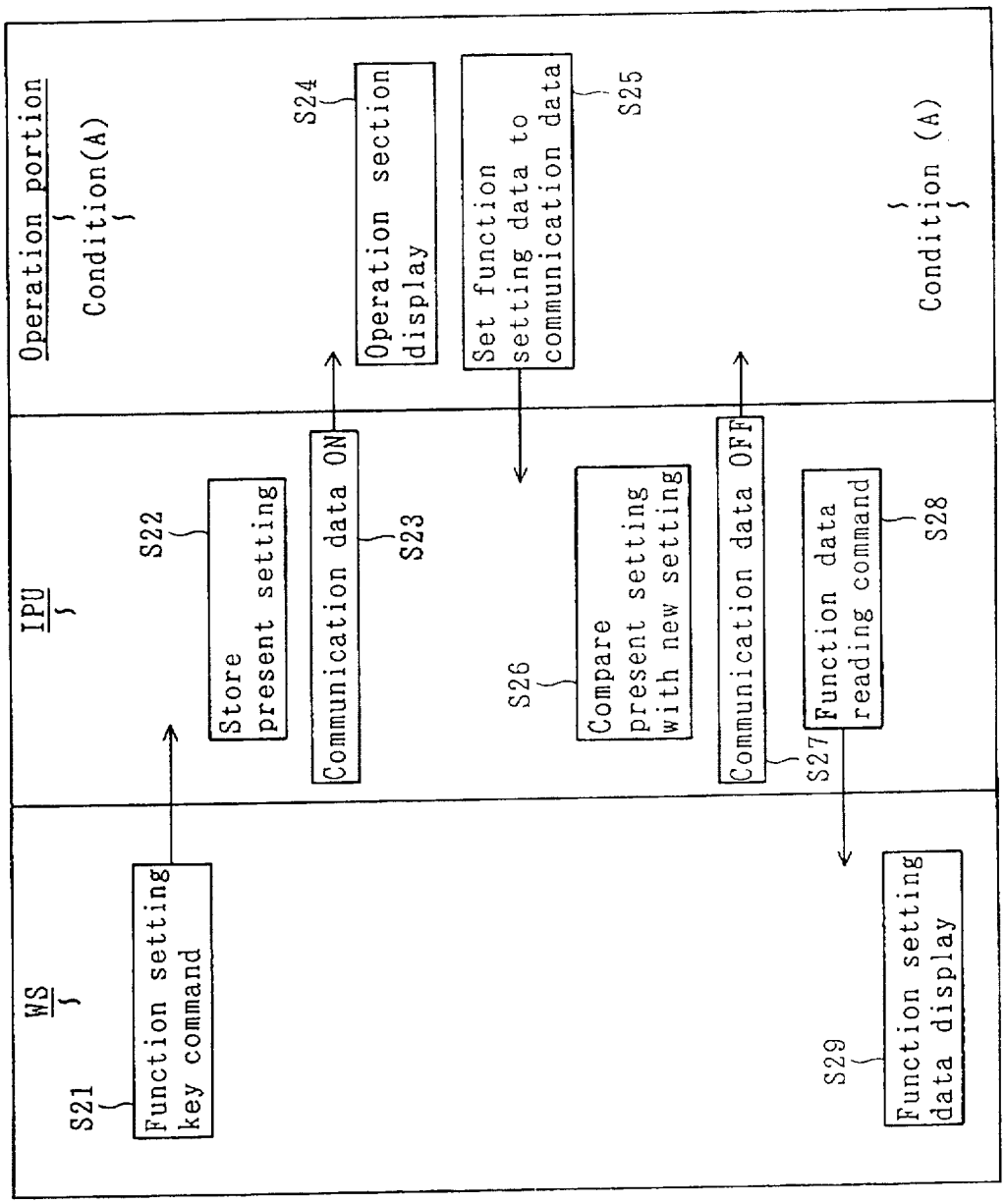
FIG. 9 is a view showing a communication among the workstation, the image processing unit and the operation portion in response to an operation of a function setting key.

FIGS. 9 to 13 show handshakings in the remote mode. FIG. 9 shows a handshaking with respect to function setting keys such as a cassette selecting key, an image quality mode key, an exposure key, a sharpness key, a color balance key, a copy quantity key and a color selecting key, that is, a handshaking with respect to a function setting data generated when one of the previously-described keys 31, 32, 33, 34, 39, 41a, 41b and 48 shown on the remote control panel of the workstation WS is operated by means of the mouse. First, a function setting key command corresponding to the key operated on the workstation WS is generated and transmitted to the image processing unit IPU (S21). Receiving the command, the image processing unit IPU stores the present setting of the copying machine unit 9, and transmits to the operation portion 10 a data showing that the communication data is set to ON.

In order that the CPU of the operation portion 10 sets the key operation in the remote mode and the key operation on the operation portion 10 on equal conditions, a data equivalent to a data showing that a key on the operation portion 10 is operated is transmitted (S23). Receiving the data, the operation portion 10 displays the received function setting data in the display portion thereof (S24). It also sets the function setting data to the communication data and returns it to the image processing unit IPU (S25).

Receiving this data, the image processing unit IPU compares the new setting with the setting previously stored at S22 (S26). When they are different (that is, the setting has been changed), the image processing unit IPU regards the desired setting as having been made, and resets the communication data of the function setting key to OFF and transmits it to the operation portion 10 (S27). It also transmits a data reading command to the workstation WS to notify it that the setting has been changed (S28). A prescribed display on the workstation WS is not changed until the data reading command is received (S29). Condition (A) is a condition in which the following are waited for: a key input from the operation portion 10 by the user, a function setting key input from the workstation WS and a condition setting key input from the workstation WS.

A case where the cassette key 48 is operated on the workstation WS as the function setting key will be described as an example with reference to FIG. 9. When the cassette key 48 is operated, a cassette change command is generated (S21) and transmitted to the image processing unit IPU. The image processing unit IPU stores the present cassette setting (S22). When the presently-set cassette is, for example, the lower cassette, a data representative of the lower cassette is stored. Thereafter, the image processing unit IPU activates a cassette change communication data and transmits it to the operation portion 10 (S23). Receiving this data, the operation portion 10 provides the display indicating that the upper cassette key is operated (S24). Then, the operation portion sets a data representative of the upper cassette as the communication data and transmits it to the image processing unit IPU (S25).

Receiving this data, the image processing unit IPU compares the received data with the data representative of the lower cassette previously stored at S22 (S26). Since they are different, the image processing unit IPU deactivates the data showing that the cassette is changed and transmits it to the operation portion 10 (S27). It also transmits a command representative of the lower cassette to the workstation WS (S28). The workstation WS changes the cassette display on its display screen from the lower cassette to the upper cassette (that is, returns the color of the lower window to the original color and changes the color of the upper window). Although no description will be given, the handshakings of the image quality mode, the exposure, the sharpness, the color balance, the copy quantity and the color selection are performed in a similar manner.

Figure 10:
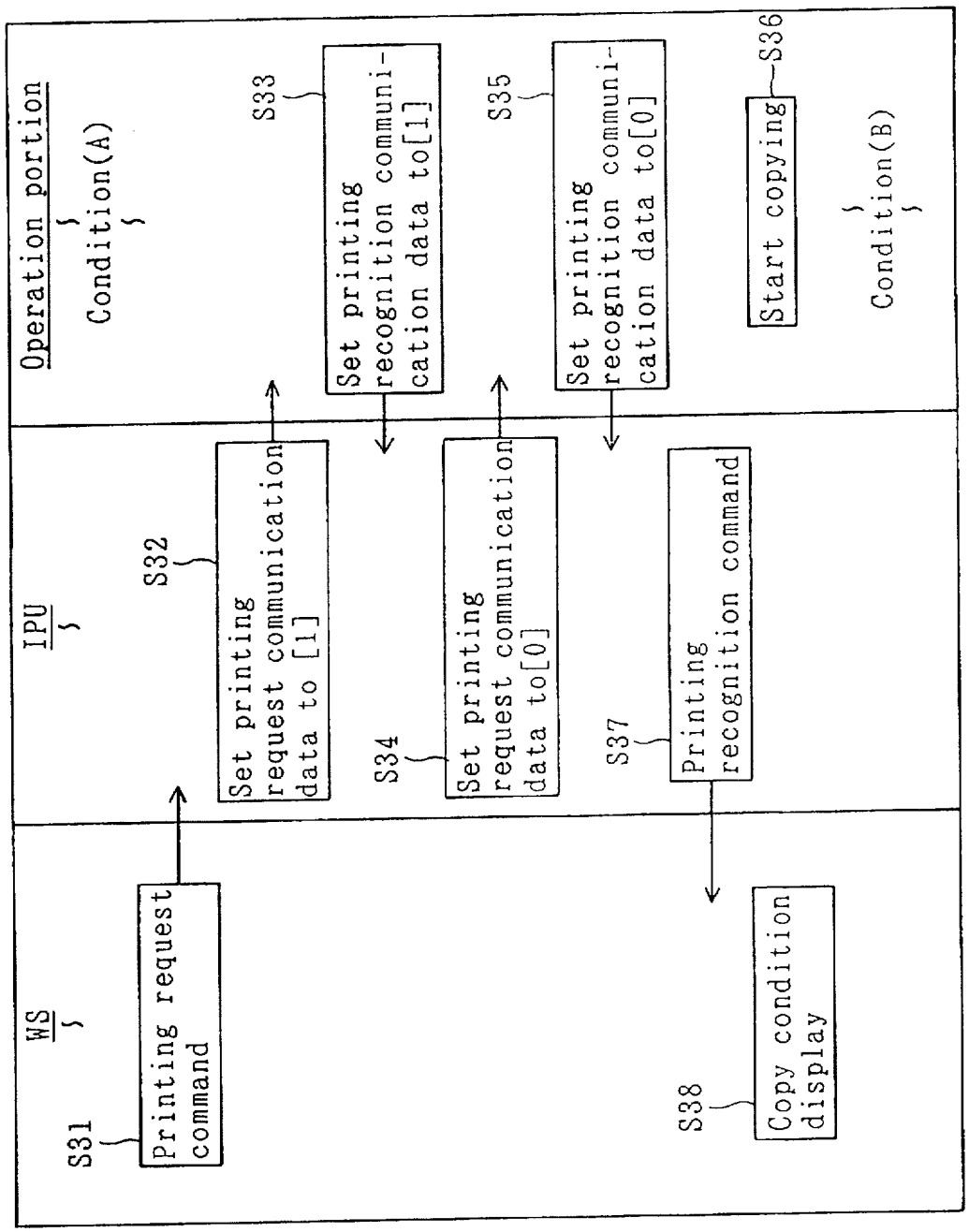
FIG. 10 is a view showing a communication among the workstation, the image processing unit and the operation portion in response to an operation of a condition setting key.

FIGS. 10 to 13 show handshakings of the condition setting data performed when the printing key 37, the stop/clear key 40 and the reset (all reset) key 38 are operated, respectively. FIG. 10 shows the case of printing. When the printing key 37 is operated on the workstation WS, the workstation WS generates a printing request command and transmits it to the image processing unit IPU (S31). Receiving the command, the image processing unit IPU sets a printing request communication data to 1 and transmits it to the operation portion 10 (S32).

Receiving the data, the operation portion 10 sets to 1 a printing recognition communication data representing that the printing request has been received and transmits it to the image processing unit IPU (S33). Receiving the data, the image processing unit IPU sets the printing request communication data to 0 and transmits it to the operation portion 10 (S34). The printing request communication data set at S32 remains 1 until the printing recognition communication data is received. However, when the printing recognition communication data is received, it is set to 0 and transmitted to the operation portion 10.

Receiving the printing request communication data which has been set to 0, the operation portion 10 sets the printing recognition communication data to 0 (S35). As long as the printing request communication data which has been set to 0 is not received, the operation portion 10 maintains the printing recognition communication data set at S33 at 1. After setting the printing recognition communication data to 0 at S35 and transmitting it to the image processing unit IPU, the operation portion 10 starts copying (S36). During that time, the image processing unit IPU having received the printing recognition communication data of 0 transmits a printing recognition command to the workstation WS (S37). Receiving the command, the workstation WS displays on its display screen a message that copying is being performed. In FIG. 10, Condition (B) is a condition in which copying is being performed, and the operation of the stop/clear key by the user and the operation of the stop/clear key from the workstation WS are being waited. Condition (A) is as described with reference to FIG. 9.

In the case of the function setting of FIG. 9, since the function is actually changed, the recognition is made based on the change of the setting. In the case of printing, however, it is impossible to make such recognition. Therefore, the handshaking is performed in the above-described manner so that it is recognized that the actual command is received. This applies to the subsequently-described FIGS. 11 to 13.

Figure 11:
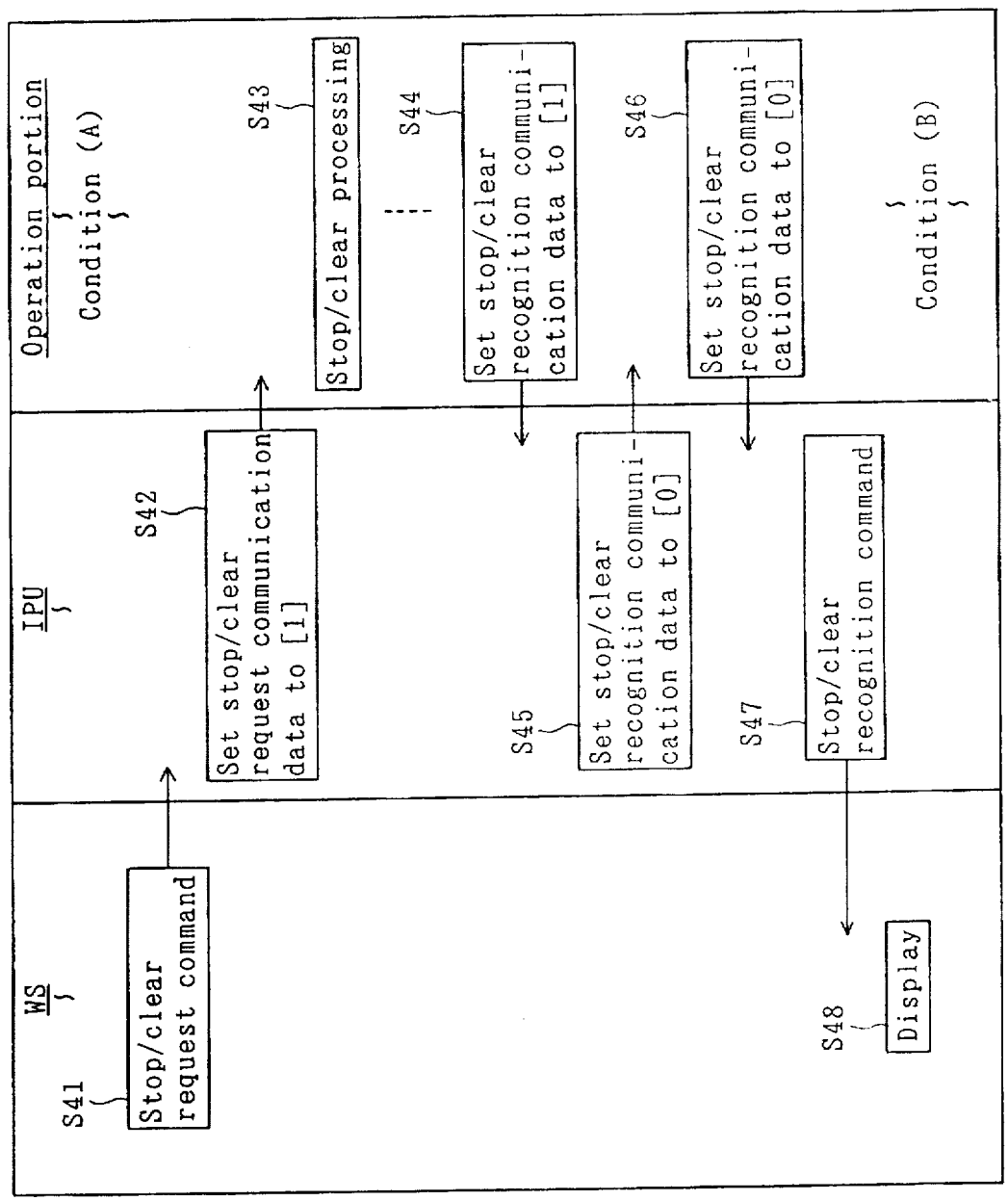
FIG. 11 is a view showing a communication among the workstation, the image processing unit and the operation portion in response to an operation of a stop/clear key during copying.

FIG. 11 shows a handshaking with respect to the stop/clear operation (that is, copy stopping operation) during copying. When the stop/clear key 40 is operated on the workstation WS during copying, the workstation WS generates a stop/clear request command and transmits it to the image processing unit IPU (S41). Receiving the command, the image processing unit IPU immediately sets a stop/clear request communication data to 1 and transmits it to the operation portion 10 (S42). Receiving the data, the operation portion 10 performs processing to stop the copying machine unit 9 (S43). After stopping copying, the operation portion 10 sets a stop/clear recognition communication data to 1 and transmits it to the image processing unit IPU (S44). Receiving the data, the image processing unit IPU sets the stop/clear request communication data to 0 and transmits it to the operation portion 10 (S45).

Receiving the data, the operation portion 10 sets the stop/clear recognition communication data to 0 and transmits it to the image processing unit IPU (S46). Receiving the data, the image processing unit IPU transmits a stop/clear recognition command to the workstation WS (S47). After receiving the command, the workstation WS provides a stop/clear display on its display screen (S48). In the case of printing of FIG. 10, printing is started after the printing recognition communication data is set to 0 and transmitted at S35, whereas in the case of copy stopping of FIG. 11, the stop/clear operation is started when the operation portion 10 receives the stop/clear request communication data which has been set to 1 from the image processing unit IPU. This is in order to meet the demand that stopping should be made as soon as possible.

Figure 12:
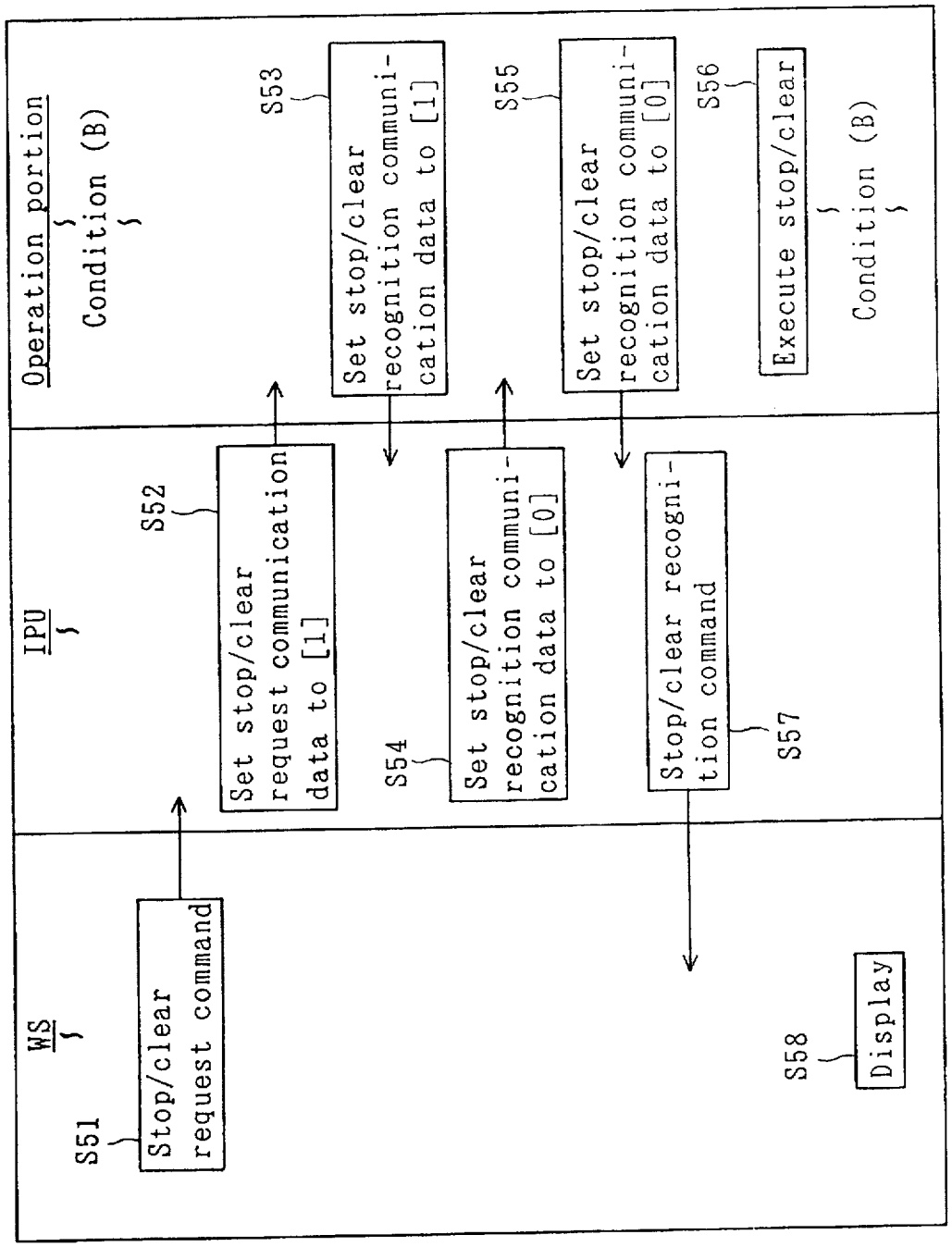
FIG. 12 is a view showing a communication among the workstation, the image processing unit and the operation portion in response to an operation of the stop/clear key other than during copying.

On the contrary, in a subsequently-described stop/clear operation of FIG. 12 which is a copy stopping operation other than during copying, since it is unnecessary to stop copying as soon as possible, the stop/clear operation is started after a handshaking is sufficiently performed. FIG. 12 will not be described since FIG. 12 is different from FIG. 11 only in this regard.

Figure 13:
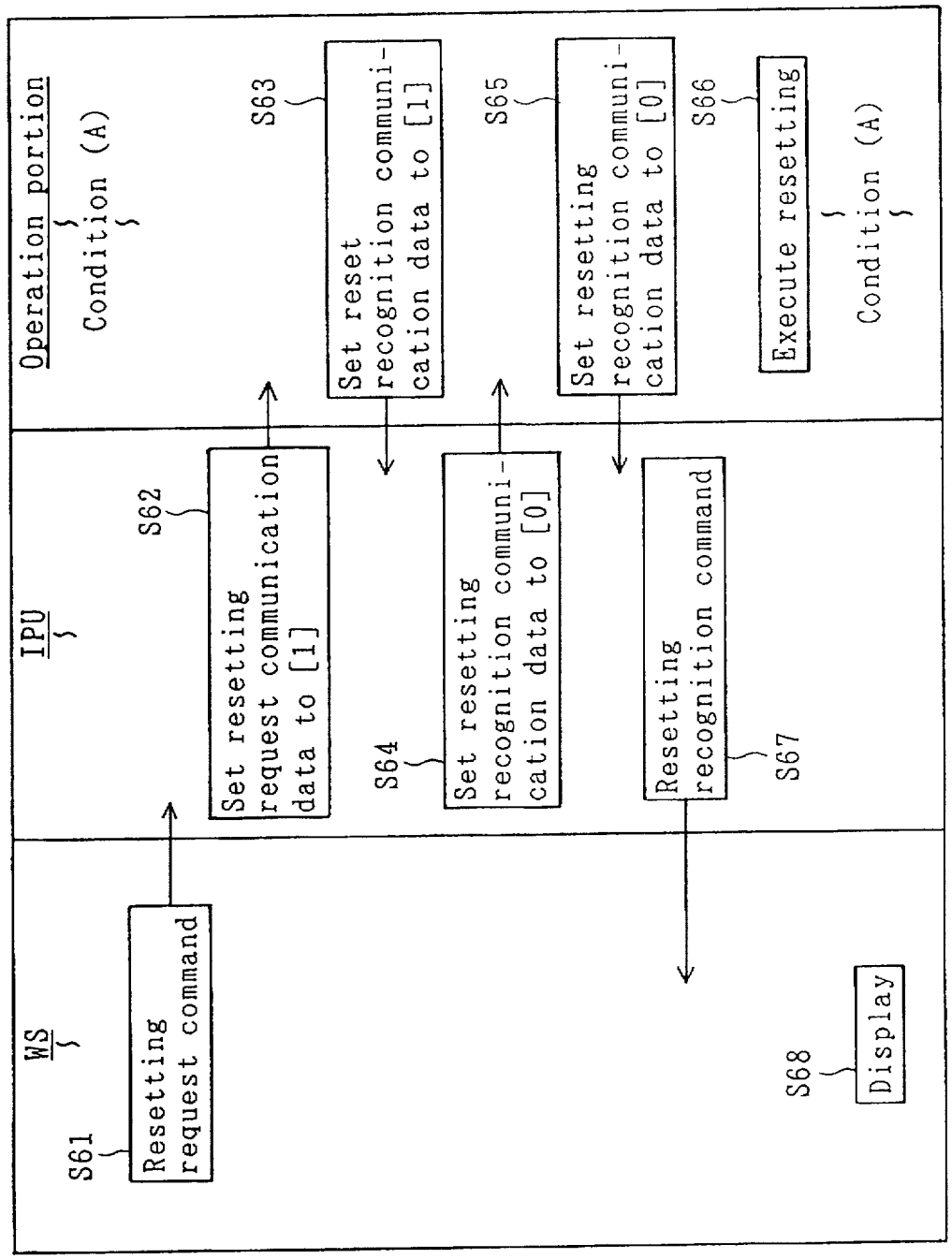
FIG. 13 is a view showing a communication among the workstation, the image processing unit and the operation portion in response to an operation of a reset key.

The resetting of FIG. 13 for returning functions such as the cassette and the image quality mode to the initial conditions is performed after a handshaking is performed in a similar manner to FIG. 12.

The handshakings of data transfer among the workstation WS, the image processing unit IPU and the operation portion 10 in the remote mode are performed in the above-described manners. It is necessary that the command data transferred between the workstation WS and the image processing unit IPU should be distinguished from data used when the workstation WS is used as a normal terminal. That is, the data output of the memory and the data output of the I/O which are displayed in the normal terminal mode consist of letters and numerals like the commands used in the remote mode. Therefore, in this embodiment, the commands used in the remote mode are provided with the following characteristics so that they are distinguished from the data used in the normal terminal mode.

First, the remote mode setting and cancellation commands and the remote setting command for setting functions and conditions transmitted from the workstation WS to the image processing unit IPU are marked with $ at their heads.

The workstation WS cannot provide the initial display unless it is informed of the condition of the copying machine unit at the time of the activation of the remote mode. Therefore, it generates a status command to obtain information on the condition of the copying machine unit. The status request commands are marked with #.

Status reading data transmitted from the image processing unit IPU to the workstation WS to notify the setting conditions and recognition commands of the copying machine unit 9 are marked with %. Specific examples of these commands and data will be shown in the following.

Commands Transferred Through Communication Between WS and IPU

Remote Mode Setting and Canceling Commands

Remote mode setting

Format: $REM|ON⌐

Remote mode cancellation

Format: $REM|OF⌐

The above-mentioned $ in the format is added for distinction from the commands used in the terminal mode. REM represents the remote mode. | indicates that a parameter will follow. ON and OF are parameters which represent setting and cancellation, respectively. ⌐ is a delimiter formed by the carriage return and indicates that the command data terminates here.

<Remote Setting Commands> a) Function Setting Commands
   (1) Cassette change request
      Format: $CAS[⌐
   (2) Image quality mode change request
      Format: $IMD|⌐
   (3) Exposure change request
      Format: $EXP[U⌐ Exposure data up (lighter)
              $EXP[D⌐ Exposure data down (darker)
   (4) Copy quantity setting request
      Format: $CNT[01⌐ Set 1 as copy quantity
             $CNT[99⌐ Set 99 as copy quantity
   (5) Color selection request
      Format: $COL[0⌐ 4 colors
             $COL[1⌐ 3 colors
             $COL[2⌐ Yellow
             $COL[3⌐ Magenta
             $COL[4⌐ Cyan
             $COL[5⌐ Red
             $COL[6⌐ Green
             $COL[7⌐ Blue
             $COL[8⌐ Black
             ($COL[9⌐ ACS)
   (6) Sharpness setting
      Format: $SHP[U⌐ Sharpness data up (sharper)
              $SHP[D⌐ Sharpness data down (less sharp)
   (7) Color balance |magenta| setting
      Format: $CBM[U⌐ Color balance magenta data up
                     (increase magenta)
      Format: $CBM[D⌐ Color balance magenta data down
                     (decrease magenta)
   (8) Color balance |cyan| setting
      Format: $CBC[U⌐ Color balance cyan data up
                    (increase cyan)
      Format: $CBC[D⌐ Color balance cyan data down
                    (decrease cyan)
   (9) Color balance |yellow| setting
      Format: $CBY[U⌐ Color balance yellow data up
                   (increase yellow)
      Format: $CBY[D⌐ Color balance yellow data down
                   (decrease yellow)
   (10) Color balance |black| setting
      Format: $CBB[U⌐ Color balance black data up
                   (increase black)
      Format: $CBB[D⌐ Color balance black data down
                   (decrease black)
   (11) Memory board (memory unit) mode setting
      Format: $MMD[I⌐ Input image to memory board
              $MMD[O⌐ Output image from memory board
              $MMD|N⌐ Normal copy mode The memory board setting commands are shown here although the memory board setting relating to the control of the memory unit 4 is not directly related to the remote control of the copying machine unit 9.

b) Condition Setting Request Commands
  (1) Printing request
      Format: $PRT₁ Printing request [printing key ON]
  (2) Stop/clear request
      Format: $STP₁ Stop/clear request [stop/clear key ON]
  (3) Setting reset request
      Format: $RST₁ Setting reset request [reset key ON]
c) Status Request Commands
  (1) Selected cassette reading
      Format: #CAS₁ Selected cassette status request
  (2) Cassette size reading
      Format: #SCU₁ Upper cassette size request
              #SCU₁ Lower cassette size request
  (3) Set copy quantity reading
      Format: #CNT₁ Set copy quantity request
  (4) Exposure data reading
      Format: #EXP₁ Exposure data request
  (5) Image quality mode reading
      Format: #IMD₁ Image quality mode request
  (6) Color selection reading
      Format: #COL₁ Color selection data request
  (7) Sharpness reading
      Format: #SHP₁ Sharpness data request
  (8) Color balance [magenta] reading
      Format: #CBM₁ Color balance [magenta] data request
  (9) Color balance [cyan] reading
      Format: #CBC₁ Color balance [cyan] data request
  (10) Color balance [yellow] reading
       Format: #CBY₁ Color balance [yellow] data request
  (11) Color balance [black] reading
       Format: #CBB₁ Color balance [black] data request
  (12) Memory board mode reading
       Format: #MMD₁ Memory board mode request
<Status Reading Data>
a) Function Setting Reading Data
  (1) Selected cassette
      Format: %CAS[U]₁ Upper cassette selection
              %CAS[L]₁ Lower cassette selection
  (2) Cassette size
      Format: %SCU[x]₁ Upper cassette size xx
              %SCL[x]₁ Lower cassette size xx
        x 1:A3, 2:B4, 3:A4R, 4:B5R, 5:ASR, 6:A4, 7:A6R, 8:B5,
          9:11x17, A:8.5x14, B:8.5x11R, C:5.5x8.5R, D:8.5x11,
                                        E:UNI, F:8.5x13R
  (3) Set copy quantity
      Format: %CNT[xx]₁ Set xx as copy quantity
        xx 1 to 99 (in a decimal system)
  (4) Exposure data
      Format: %EXP[X]₁ Exposure data xx
        xx = 0 to E
  (5) Image quality mode
      Format: %IMD[P]₁ Photo mode
              %IMD[T]₁ Character mode
              %IMD[M]₁ Character/photo mode
              %IMD[A]₁ ACPS mode
  (6) Color selection
      Format: %COL[0]₁ 4 colors
              %COL[1]₁ 3 colors
              %COL[2]₁ Yellow
              %COL[3]₁ Magenta
              %COL[4]₁ Cyan
              %COL[5]₁ Red
              %COL[6]₁ Green
              %COL[7]₁ Blue
              %COL[8]₁ Black
              %COL[9]₁ ACS
  (7) Sharpness
      Format: %SHP[+5]₁ Sharpness +5
        xx [+5, +4, +3, +2, +1, +0, −1, −2, −3, −4, −5]
  (8) Color balance [magenta]
      Format: %CBM[+A]₁Color Balance Magenta+0
        xx = [+A, +9, +8, +7, +6, +5, +4, +3, +2, +1, +0, −1,
              −2, −3, −4, −5, −6, −7, −8, −9, −A]
        Note) +A represents +10 and −A represents −10.
  (9) Color balance [cyan]
      Format: %CBC[+A]₁Color Balance Cyan+10
        xx −+A, +9, +8, +7, +6, +5, +4, +3, +2, +1, +0, −1,
           −2, −3, −4, −5, −6, −7, −8, −9, −A]
        Note) +A represents +10 and −A represents −10.
  (10) Color balance [yellow]

Format: %CBY+8 +A₁Color Balance Yellow+10
  xx − [+A, +9, +8, +7, +6, +5, +4, +3, +2, +1, +0, −1,
        −2, −3, −4, −5, −6, −7, −8, −9, −A]
  Note) +A represents +10 and −A represents −10.
  (11) Color balance [black]
       Format: %CBB[+A]₁Color Balance Black+10
         xx = [+A, +9, +8, +7, +6, +5, +4, +3, +2, +1, +0, −1,
               −2, −3, −4, −5, −6, −7, −8, −9, −A]
         Note) +A represents +10 and −A represents −10.
  (12) Memory board mode
       Format: %MMD[I]₁ Input image to memory board
               %MMD[O]₁ Output image from memory board
               %MMD[N]₁ Normal copy mode
b) Condition Reading Data
  (1) Copy status
      Format: %CST[0]₁ Ready condition
              %CST[1]₁ Shading condition
              %CST[2]₁ Pre-scanning condition
              %CST[3]₁ Magenta copy condition
              %CST[4]₁ Cyan copy condition
              %CST[5]₁ Yellow copy condition
              %CST[6]₁ Black copy condition
  (2) Command recognition status
      Format: %AST[0]₁ Remote mode setting recognition
              %AST[1]₁ Remote mode cancellation recognition
              %AST[2]₁ Printing command recognition
              %AST[3]₁ Stop/clear command recognition
              %AST[4]₁ Reset command recognition
  (3) Command impermissible status
      Format: %SST[0]₁ Remote mode setting impermissible
              %SST[1]₁ Remote mode cancellation impermissible
              %SST[2]₁ Printing command impermissible
              %SST[3]₁ Stop/clear command impermissible
              %SST[4]₁ Reset command impermissible
              %SST[5]₁ Command impermissible
  (4) Error status
      Format: %EST[x]₁ Error status
        Content of x (1-byte data)
        Bit 0, 1: Busy (stable)
              0: Ready
        Bit 1, 1: Jam error
              0:
        Bit 2, 1: No cassette
              0:
        Bit 3, 1: No paper in cassette
              0:
        Bit 4, 1: Other errors
                  [including service man call]
              0:

Communication Data Transferred Between Operation portion and IPU (Relating to Remote mode)

<Operation portion to IPU>
  (1) Addition
      a) Copy quantity [cidt+0fh]
      b) Handshaking flag for remote [cidt+0ch]
         BIT7: Condition change recognition
         BIT2: Reset recognition
         BIT1: Stop/clear recognition
         BIT0: Printing recognition
      c) Machine error status [cidt+0dh]
         BIT0: Busy 1, Ready 0
         BIT1: Jam 1
         BIT2: No cassette selected 1
         BIT3: No paper in selected cassette 1
         BIT4: Other errors (including service man call) 1
      d) Selected cassette [cidt+1fh]
         BIT0: Lower cassette selected 1
         BIT1: Upper cassette selected 1
  (2) Change
      a) Lower cassette code (←manual exposure offset [not used])
         [cidt+1dh]
      b) Upper cassette code (←automatic exposure offset [not used])
         [cidt+1eh]
      c) Mode flag [cidt+8h] (add Bit 5)
         BIT5: Remote mode 1, normal copy mode 0

-continued

<IPU to Operation portion>
(1) Addition

| | |
|---|---|
| a) Request copy quantity change | [codt+30h] |
| b) Copy quantity | [codt+40h] |
| Note) Expressed in a decimal system. | |
| c) Request color selection change | [codt+31h] |
| d) Color selection | [codt+41h] |
| (0: 4 colors, 1: 3 colors, 2: yellow, 3: magenta, 4: cyan, 5: red, 6: green, 7: blue, 8: black, 9: ACS) | |
| e) Cassette change request | [codt+32h] |
| f) Image quality mode request | [codt+33h] |
| g) Exposure data up request | [codt+34h] |
| h) Exposure data down request | [codt+35h] |
| i) Sharpness up request | [codt+36h] |
| j) Sharpness down request | [codt+37h] |
| k) Color balance | |
| Magenta up request | [codt+38h] |
| Magenta down request | [codt+39h] |
| Cyan up request | [codt+3Ah] |
| Cyan down request | [codt+3Bh] |
| Yellow up request | [codt+3Ch] |
| Yellow down request | [codt+3Dh] |
| Black up request | [codt+3Eh] |
| Black down request | [codt+3Fh] |
| l) Memory board mode | [codt+42h] |
| (0: Normal copy, 1: Input mode, 2: Output mode) | |
| m) Handshaking flags for remote | [codt+0ch] |
| BIT7: Condition change request | |
| BIT2: Reset request | |
| BIT1: Stop/clear request | |
| BIT0: Printing request | |
| n) Mode flags | [codt+8h] |
| BIT5: Remote mode 1, Normal copy mode 0 | |
| Note) Request flags indicate request by 01h. | |

Subsequently, operation sequences of the CPUs of the workstation WS, the image processing unit IPU and the operation portion 10 will be described with reference to the flowcharts of FIGS. 16 to 54. First, the operation sequence of the workstation WS will be described with reference to the flowcharts of FIGS. 16 to 29. The main flow of the remote control program of the workstation WS consists mainly of the subsequently-described four portions.

(1) Window control

This includes a check of an event in the window, a control of a display in accordance with the event and an operation of a remote command transmission request flag, which are all performed by controlling the display and by means of the mouse.

(2) Communication data processing

This includes processings of transmission and received data, a terminal transmission and received data, transmission of a remote command, reception of a status command, a control for a flag for requesting transmission of a remote command, and a control for a flag for requesting status recognition check.

(3) Status data processing

This includes a check of a change of the received status data and processing of the window in accordance therewith. A data showing that the setting of the copying machine unit is changed is received by a communication data section. Since the reception of the data is reflected in the condition of a flag, the flag is checked to determine the change of the setting, and the display data of the workstation WS is changed in accordance therewith. A check for re-transmission processing is also performed.

(4) Re-transmission processing of a transmitted remote command

This includes a comparison between a transmission remote data and a reception status data, re-transmission processing of the remote data, a control for a remote command transmission request flag and a control for a status recognition check request flag. This portion includes a processing repeated a plurality of times when although a command showing that a key is operated at the workstation WS is generated, no data showing the setting in accordance therewith is returned.

The remote operation of each of the portions (1) to (4) is performed in the following manner.

First, in the portion (1), the user pushes the mouse button within a function setting window. This event is checked by a window controlling section, and a xxx remote command transmission request flag is set.

In the portion (2), a remote command of the xxx remote command transmission flag which has been set is generated to the image processing unit IPU, and the xxx remote command transmission flag is reset. Simultaneously, a xxx status recognition check request flag for xxx function setting is set. Moreover, a reception section checks the received data. When the received data is recognized to be a command data and a status data, the command is analyzed, the present status is stored as the previous condition, and the received status is stored as the present status. Further, when the xxx recognition check request flag has been set in the status, the flag is reset.

In the portion (3), the present xxx status data transmitted from the image processing unit IPU is compared with the previous condition at a status data processing section. When the data has been changed, the present status is displayed in the window. Then, a series of remote operations ends.

In the portion (4), when the xxx status data for the transmitted remote command is not changed, the remote command is re-transmitted prescribed times by a re-transmission section. When the time exceeds the prescribed time, an abnormal termination occurs.

Figure 16:
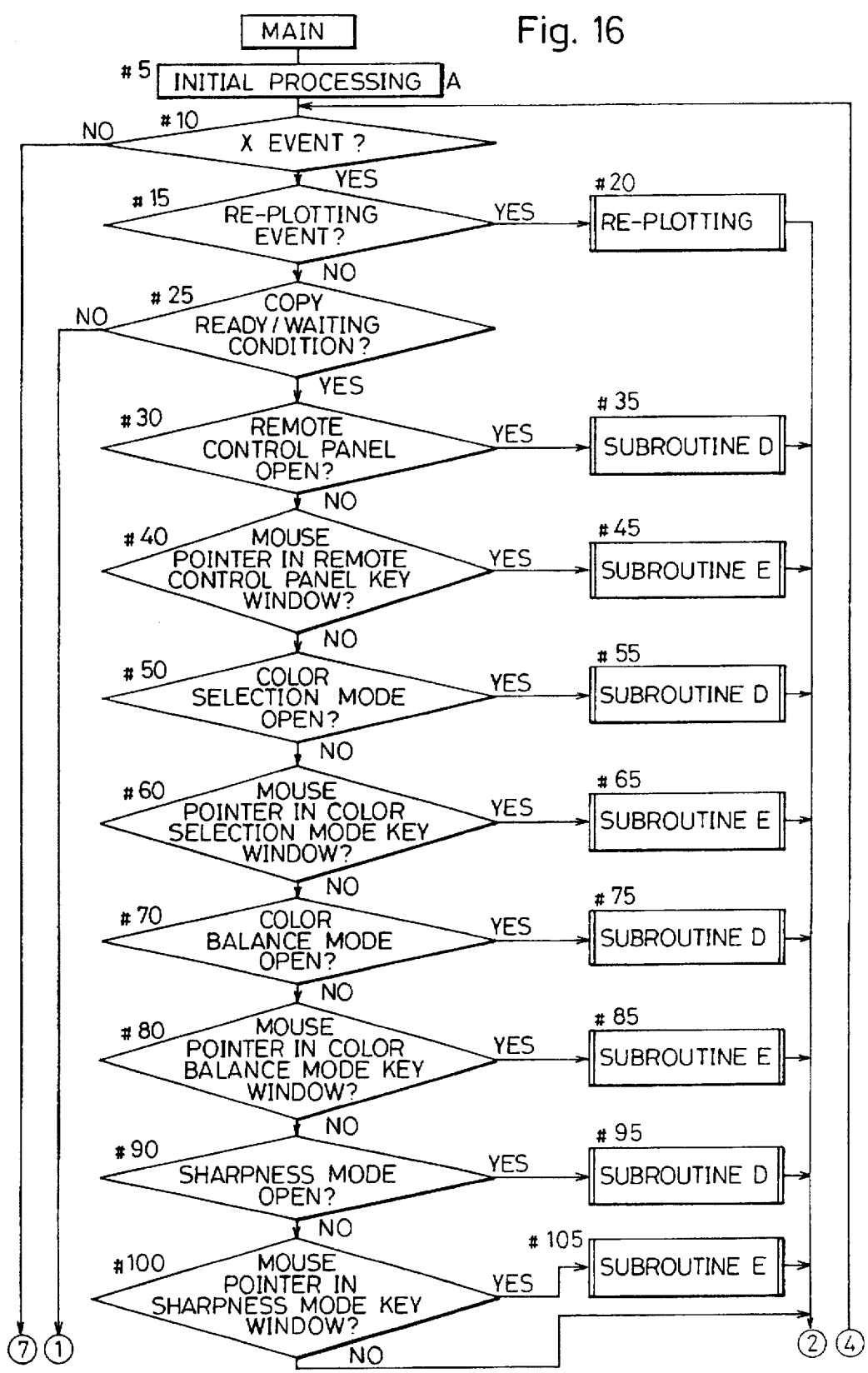
FIG. 16 is a view showing a main flow of the workstation in the remote mode.
Figure 17:
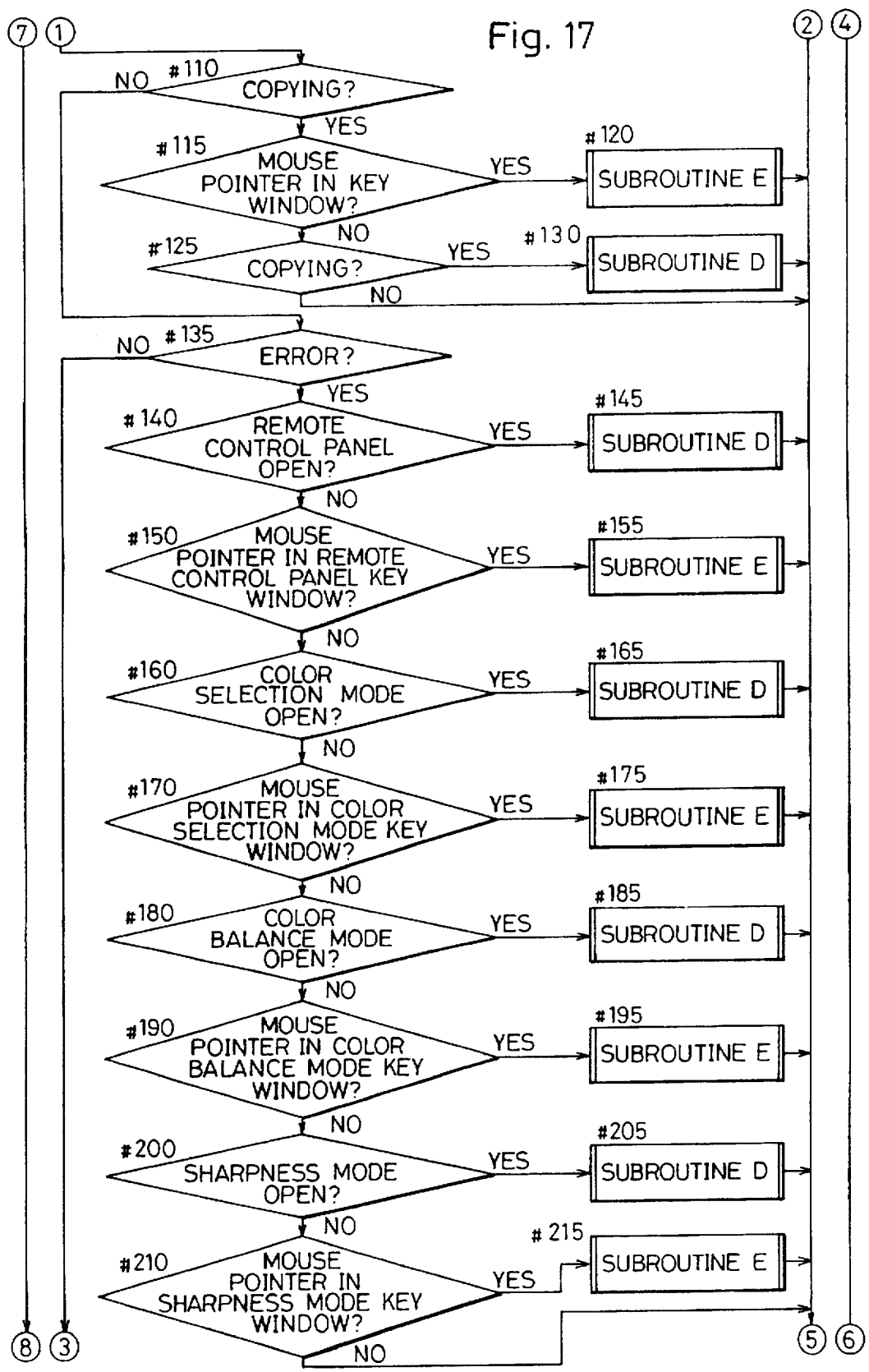
FIG. 17 is a flowchart continued from the flowchart of FIG. 16.
Figure 18:
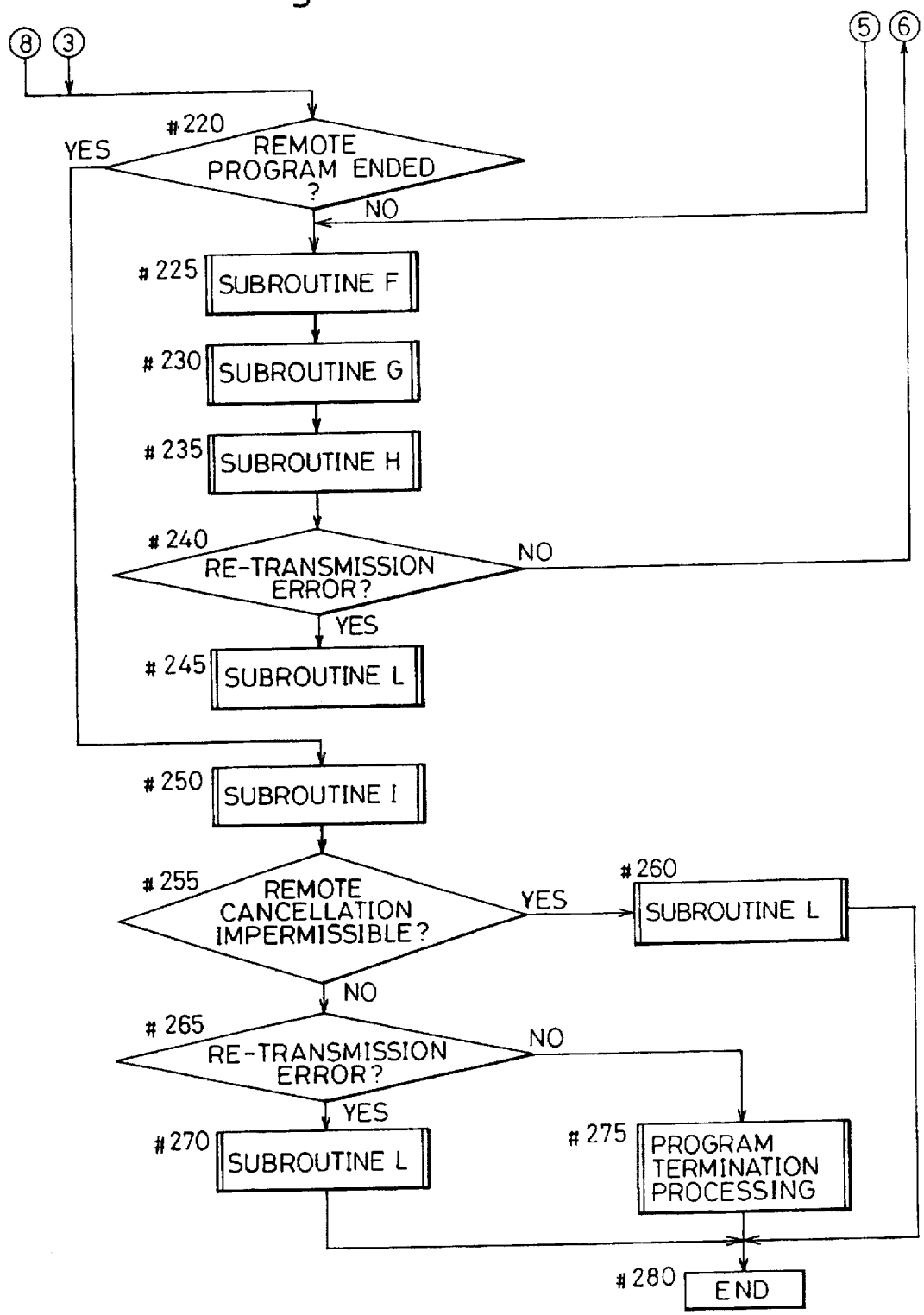
FIG. 18 is a flowchart continued from the flowchart of FIG. 17.

In the main flowchart shown in FIG. 16, the portion (1) corresponds to steps #5 to #220, the portion (2), to step #225, the portion (3), to step #230, and the portion (4), to step #235.

In the main flowchart, first, at step #5, an initial processing is performed (this initial processing will be described later). Thereafter, the process proceeds to step #10, where whether an X event occurred or not is determined. This corresponds to the determination of whether an operation (an operation by means of the mouse) in a window of the workstation WS was performed or not. That is, whether the pointer was moved into a key window or not, or whether the mouse button was pushed or not is determined.

Figure 15:
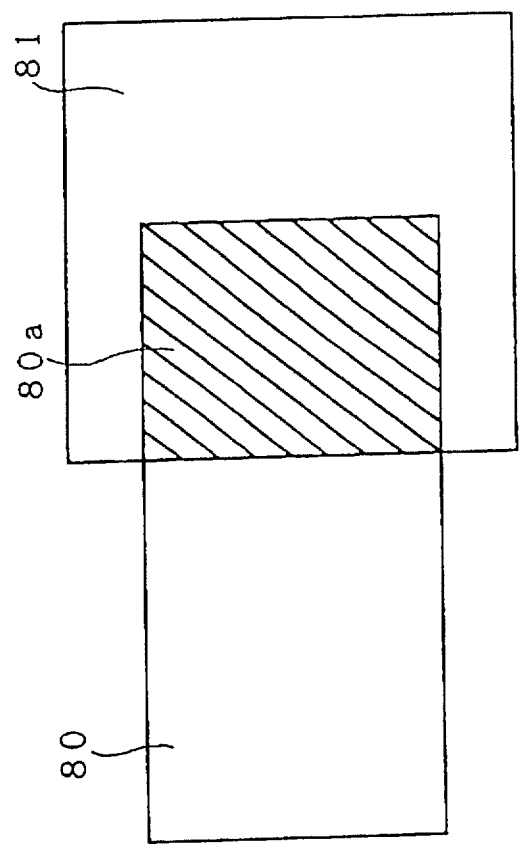
FIG. 15 is a view to assist in explaining a re-plotting processing.

When no such operation was performed, it is determined that no X event occurred, and the process proceeds to subsequently-described step #220. When the X event occurred, the process proceeds to step #15, where whether a re-plotting event occurred or not is determined. The re-plotting event is for instructing the re-plotting of a portion 80a in FIG. 15 when a window 80 in the operation portion overlaps with a window 81 of another program and the portion 80a of the window 80 is hidden as shown in the figure. This event derives from the system of the workstation WS which controls windows. That is, an X window system is running at the workstation WS and the remote program is operating in the system. The re-plotting event is a request coming from the system program and not from the remote program.

When it is determined at step #15 that the re-plotting event occurred, the re-plotting of the hidden portion is performed at step #20, and the process proceeds to step #225. When it is determined at step #15 that no such event occurred, the process proceeds to step #25, where whether or not the copying machine unit 9 is in a copy ready or waiting condition is determined. When it is either in the copy ready condition or in the waiting condition, whether the remote control panel is open as shown in FIG. 2 (a condition where the remote display of FIG. 2 is provided and the pointer is not in the window) or not is determined at step #30.

Figure 22:
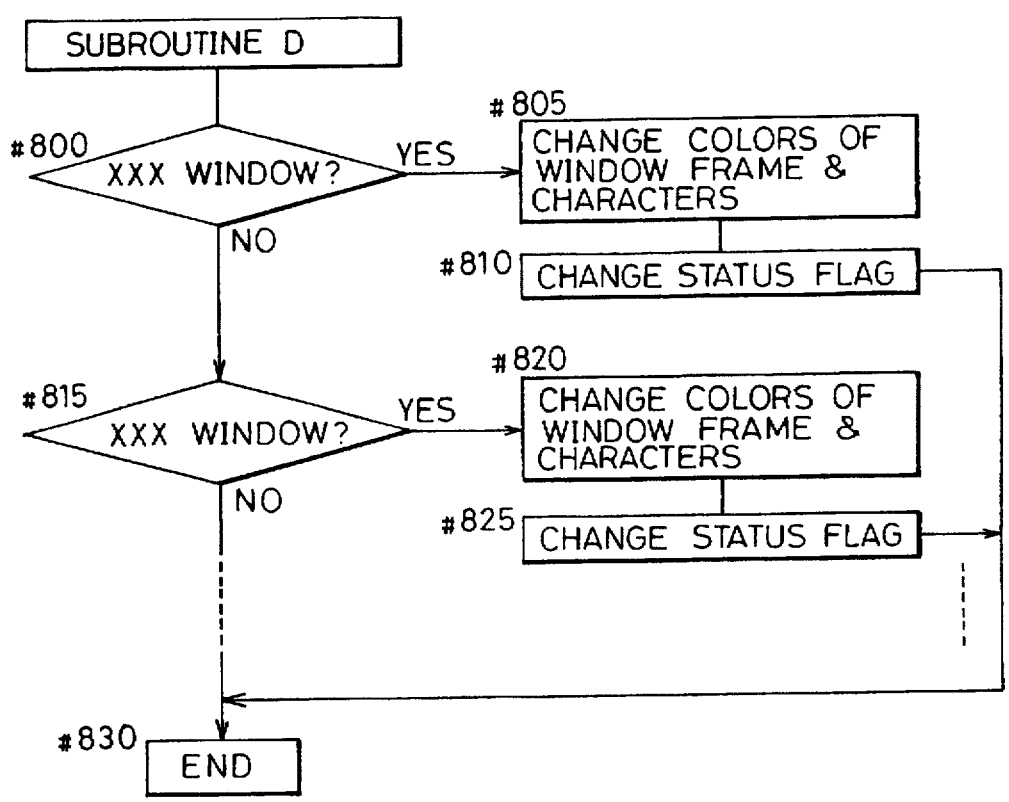
FIG. 22 is a flowchart of a subroutine D.

When the remote control panel is open, the process proceeds to step #35 to execute a subroutine D, where an event that the pointer is moved into the window is checked and the processing therefor is executed. The details of the check and processing are shown in FIG. 22. In the figure, whether the window in which an event occurred is a xxx window or not (in this case, "xxx" inclusively represents the name of a key, and the name of a specific key is substituted for it) is determined. When it is the xxx window, the process proceeds to step #805, where the color of the frame of the window is changed from navy to red and the color of the characters in the window is changed.

Thereafter, the condition of a status flag showing a condition is changed (that is, a flag showing that the pointer is in the window is set) at step #810, and the process proceeds to step #830 to finish this flow. When it is determined at step #800 that the event window is not the xxx window, the process proceeds to step #815, where whether the window in which an event occurred is the next xxx window or not is determined and similar processing is performed at steps #820 and #825.

As previously-described, there are a plurality of key windows operable on the workstation WS, and the order of determination of in which window an event occurred is pre-determined. That is, by preparing the three steps #800, #805 and #810 for every key window so as to be executed successively, the check of the window in which an event occurred and the processing therefor are ensured. While processing is shown with respect to two windows in FIG. 2, in practice, the number of sets of the three steps corresponds to the number of key windows.

Returning to FIG. 16, when the above-described check of the window into which the mouse pointer is moved and processing therefor are completed at step #35, the process proceeds to step #225. When it is determined at step #30 that the remote control panel is not open, the process proceeds to step #40. Since the condition where the remote control panel is open is, as previously described, a condition where the remote display of FIG. 2 is provided and the mouse pointer is not in the key window, when the remote display is not provided or when the remote display is provided but the pointer is in the window, it is determined that the remote control panel is not open, and the process proceeds to step #40.

Figure 23:
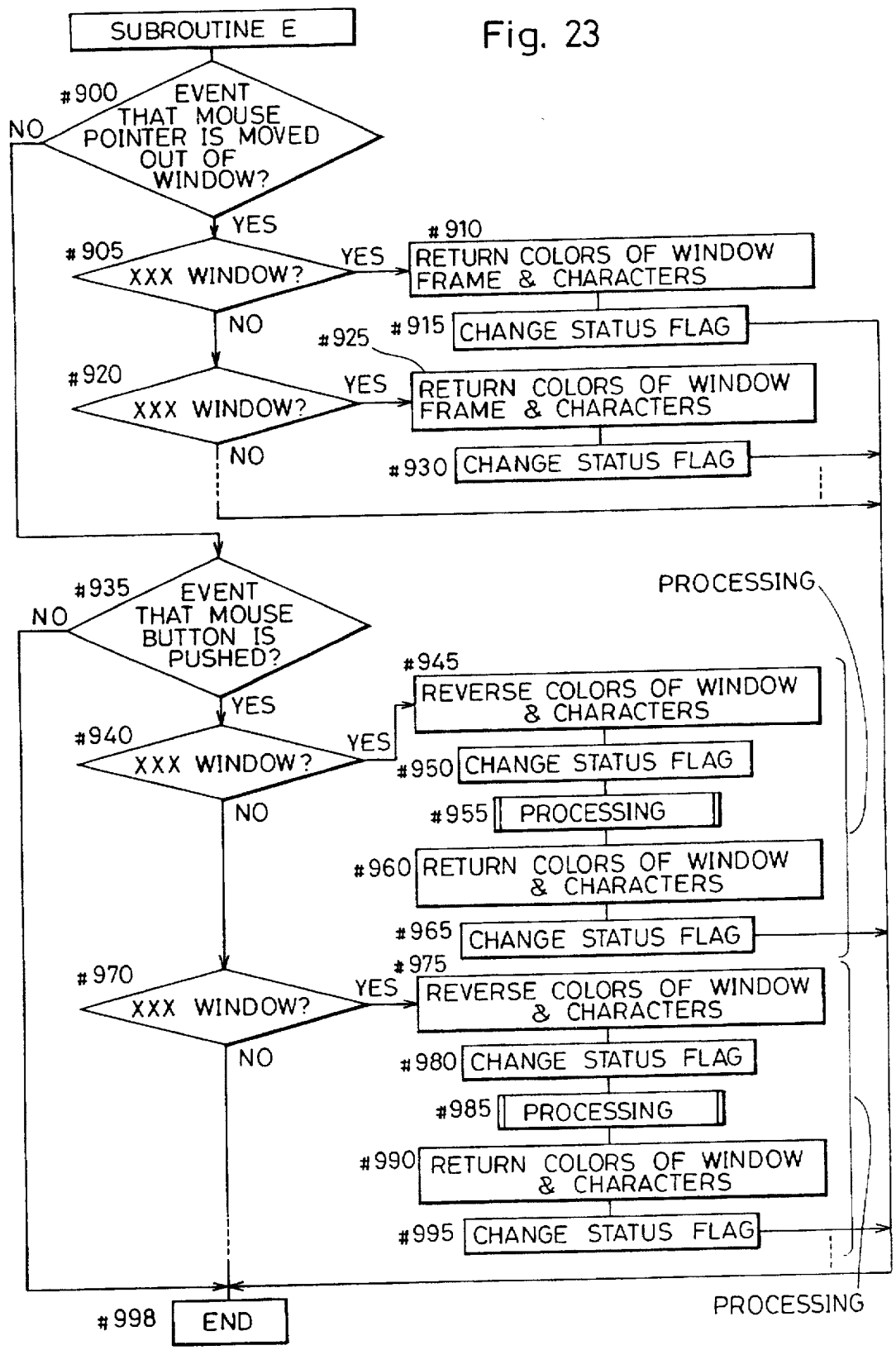
FIG. 23 is a flowchart of a subroutine E.

At step #40, whether the mouse pointer is in the key window or not is determined. When it is in the window, the process proceeds to step #45, where a subroutine E is executed to check the action of the mouse and perform processing accompanying it. The details of the subroutine E are shown in FIG. 23. In the figure, first, at step #900, whether or not the event which occurred is an event that the pointer is moved out of the window is determined. When it is the event that the pointer is moved out of the window, at steps #905, #920, . . . , the window in which the event occurred is detected. With respect to the detected window, the processing as shown in steps #910 and #915 is performed. At step #910, the color of the window frame is returned from red to navy and the color of the characters in the window is returned to the original color. At step #915, the condition of the status flag is changed. Steps #925 and #930 are the same as steps #910 and #915, respectively.

When it is determined at step #900 that the event which occurred is not the event that the mouse pointer is moved out of the window, the process proceeds to step #935, where whether or not the event which occurred is an event that the mouse button is pushed is determined. When the result of the determination is yes, the process proceeds to the flow of steps #940 to #965, the window in which the event occurred (i.e. in which the mouse button is pushed) is detected, and with respect to the detected window, the processing as shown in steps #945 to #965 is performed.

Specifically, at step #945, the color of the background of the window is reversed and the color of the characters in the window is reversed. At the next step #950, the condition of the status flag is changed to show that the pointer is pushed. Then, at step #955, processing such as the generation of a command to be transmitted to the image processing unit IPU or the change of the LCD window panel is performed. After the processing is completed, the background and the characters in the window are returned to the original colors at step #960, and the condition of the status flag is returned at step #965. Then, the process proceeds to step #998 to finish this flow. Steps #975 to #995 are the same as steps #945 to #965, respectively.

Returning to the main flow of FIG. 16, when the mouse pointer is not in the key window at step #40, since the remote display is not provided, the process proceeds to step #50, where whether the color selection mode is open or not is determined. When the result of the determination is yes, step #55 is executed. Step #55 is the above-described subroutine D shown in FIG. 22. When the color selection mode is not open (i.e. when the color selection display of FIG. 3 is provided but the pointer is not in the key window), whether the mouse pointer is in the key window in the color selection mode or not is determined at the next step #60. When it is in the window, the process proceeds to step #65, where the subroutine E shown in FIG. 23 is executed.

As described above, in the main flow, the following processings can also be performed for the color balance mode and the sharpness mode: the determination of whether these modes are open or not; processing performed when they are open; and processing performed when the pointer is in the window thereof (steps #70 to #105).

When it is determined at step #25 that the copying machine unit 9 is neither in the copy ready condition nor in the copy waiting condition, the process proceeds to step #110, where whether copying is being performed or not is determined. When copying is being performed, whether the mouse pointer is in the key window or not is determined at step #115. The process proceeds to step #120 when the pointer is in the key window and to step #125 when it is not in the key window. Step #120 is the above-described subroutine E shown in FIG. 23. At step #125, whether copying is being performed not is determined. When copying is being performed, after the subroutine D is executed at step #130, the process proceeds to step #225. When copying is not being performed, the process proceeds directly to step #225.

When it is determined at step #110 that copying is not being performed, the process proceeds to step #135, where whether an error condition occurs in the copying machine unit or not is determined. The error condition is a condition, for example, where paper is jamming or where there is no paper in the cassette.

When it is determined that an error condition occurs, the process proceeds to the flow of steps #140 to #215. At these steps, it is detected in which of the remote mode, the color selection mode, the color balance mode and the sharpness mode the error condition occurs in the copying machine unit 9. When the mouse pointer is not in the window of the detected mode, the subroutine D is executed. When the pointer is in the window, the subroutine E is executed. After the subroutine D or E is executed, the process proceeds to step #225 to execute a subsequently-described subroutine F.

Figure 24:
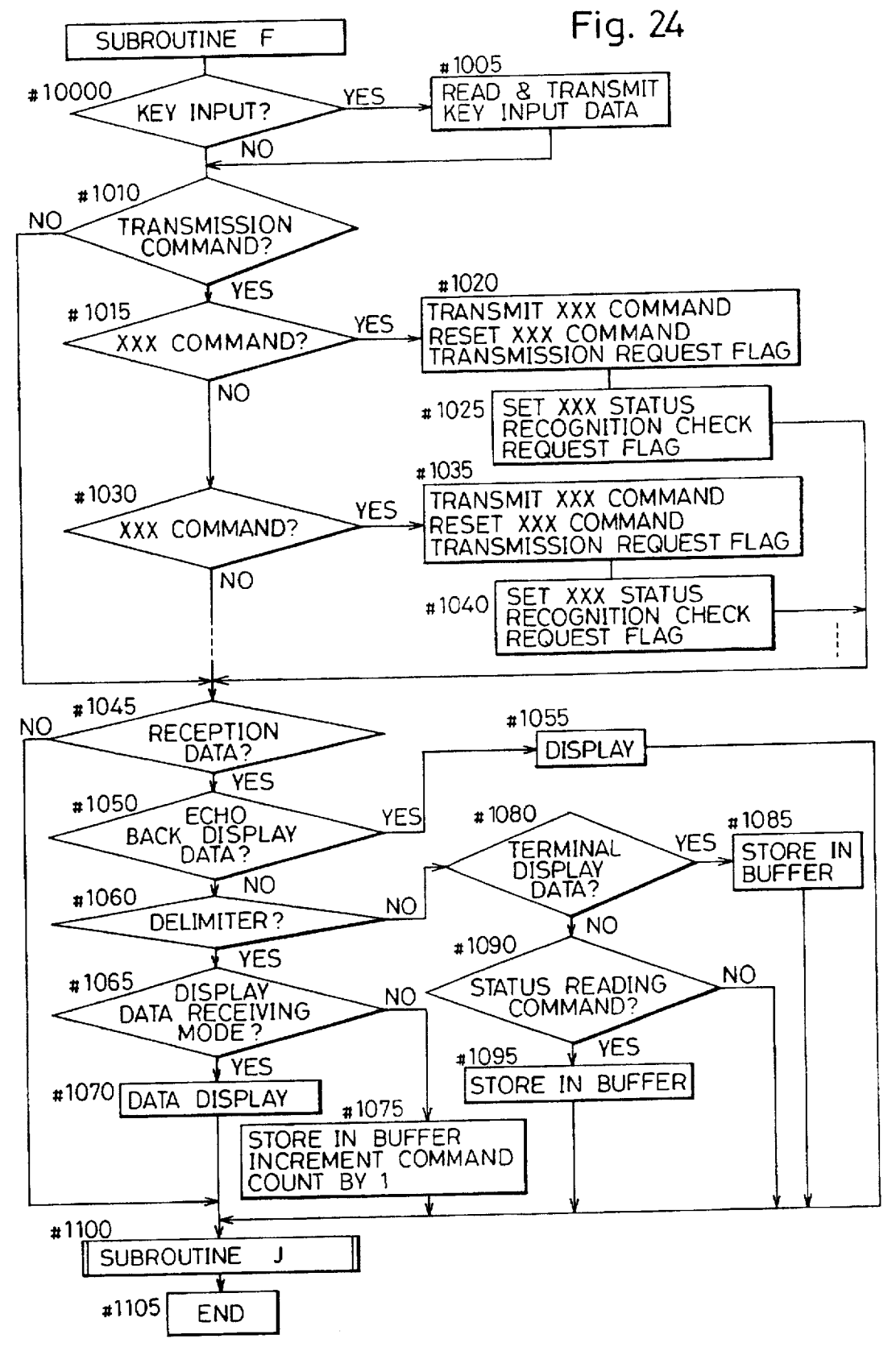

When it is determined at step #135 that no error condition occurs, the process proceeds to step #220, where the remote program has ended or not is determined. When it has not ended, the process proceeds to step #225 to execute the subroutine F. The subroutine F is a routine in which communication data processing such as the terminal data processing, the generation of the remote command, the recognition of the status command and the operation of the flag is performed. The details thereof are shown in FIG. 24.

In processing the communication data, the terminal data must also be processed. First, at step #1000, whether there is a key input at the terminal or not is determined. When there is a key input, the key input data is read and transmitted at step #1005.

The next step #1010 relates to the remote. At this step, whether there is a command to be transmitted to the image processing unit IPU or not is determined based on a command transmission request flag. When there is a transmission command, the kind of the transmission command is detected at the flow from step #1015, and the command is actually transmitted and the transmission request flag is reset at step #1020. Then, a status recognition check request flag is set at step #1025. The steps #1015, #1020 and #1025 are provided for every command. The number thereof corresponds to the number of commands. After the detection of the command and the processing relating to the command are performed, the process proceeds to step #1045.

When it is determined at step #100 that there is no transmission command, the process jumps to step #1045, where whether there is a received data or not is determined. When there is a received data, whether the received data is a terminal echo back display data (data for displaying the content generated by tapping the keys of the terminal) or not is determined at step #1050. When the received data is the terminal echo back display data, the data is displayed at the terminal (workstation WS) at step #1055, and the process proceeds to step #1100. When the received data is not the terminal echo back display data, the process proceeds to step #1060, where whether the data is a delimiter or not is determined.

The delimiter is formed by means of an enter key, and one command is generated by the delimiter. That is, to form a command, first, keys are tapped to generate characters and symbols, and lastly, the enter key is pressed. To form a command I-1000₁ by means of the keyboard of the workstation WS, I, ·,1, 0, 0 and 0 are echo back display data, and they are formed into a command by adding a delimiter ₁ by pressing the enter key. The formed command is transmitted to the image processing unit IPU.

After receiving and processing this command, the image processing unit IPU generates display data INPUT ·PORT-1000–50H₁ and returns them to the workstation WS. The workstation WS receives these data one by one. Specifically, it receives I, N, P, U, T,1, 0, 0, 0, -,5, 0, H and ₁ one by one. The workstation WS does not display INPUT·PORT-1000-50H until it receives the last delimiter ₁.

When it is determined at step #1060 that the received data is not a delimiter, the process proceeds to step #1080, where whether the received data is a terminal display data or not is determined. When the received data is the terminal display data, the data is stored in a display data storage buffer at step #1085, and the process proceeds to step #1100. The data stored in the display data storage buffer is I, N, P, U, T, . . . in the case of the above example. When it is determined at step #1080 that the received data is not the terminal display data, whether the received data is a status reading command from the image processing unit IPU or not is determined at step #1090. When the result of the determination is yes, the communication data is stored in a command storage buffer at step #1095. When the result is no, the process proceeds to step #1100.

When it is determined at step #1060 that the received data is a delimiter, whether a display data receiving mode is activated or not is determined at step #1065. When the result of the determination is no, since the data is a status command not in the display data display mode, it is stored in a command reception buffer for delimiters and a received command count is incremented. When it is determined at step #1065 that the display data receiving mode is activated, after the data (in the case of the above example, INPUT·PORT-1000-50H) stored in the display data storage buffer is displayed, the process proceeds to step #1100.

Figure 25:
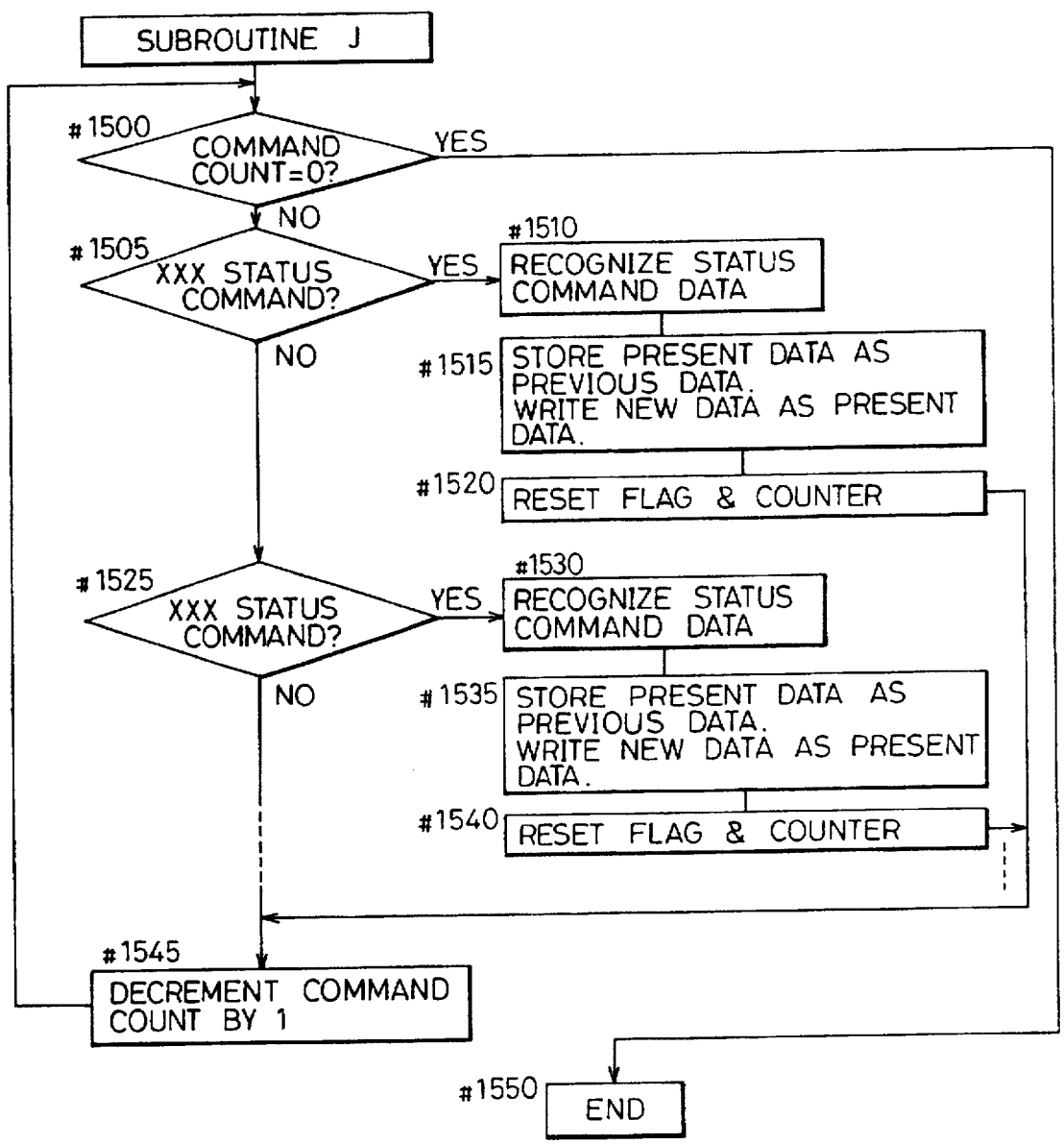
FIG. 25 is a flowchart of a subroutine J.
Figure 26:
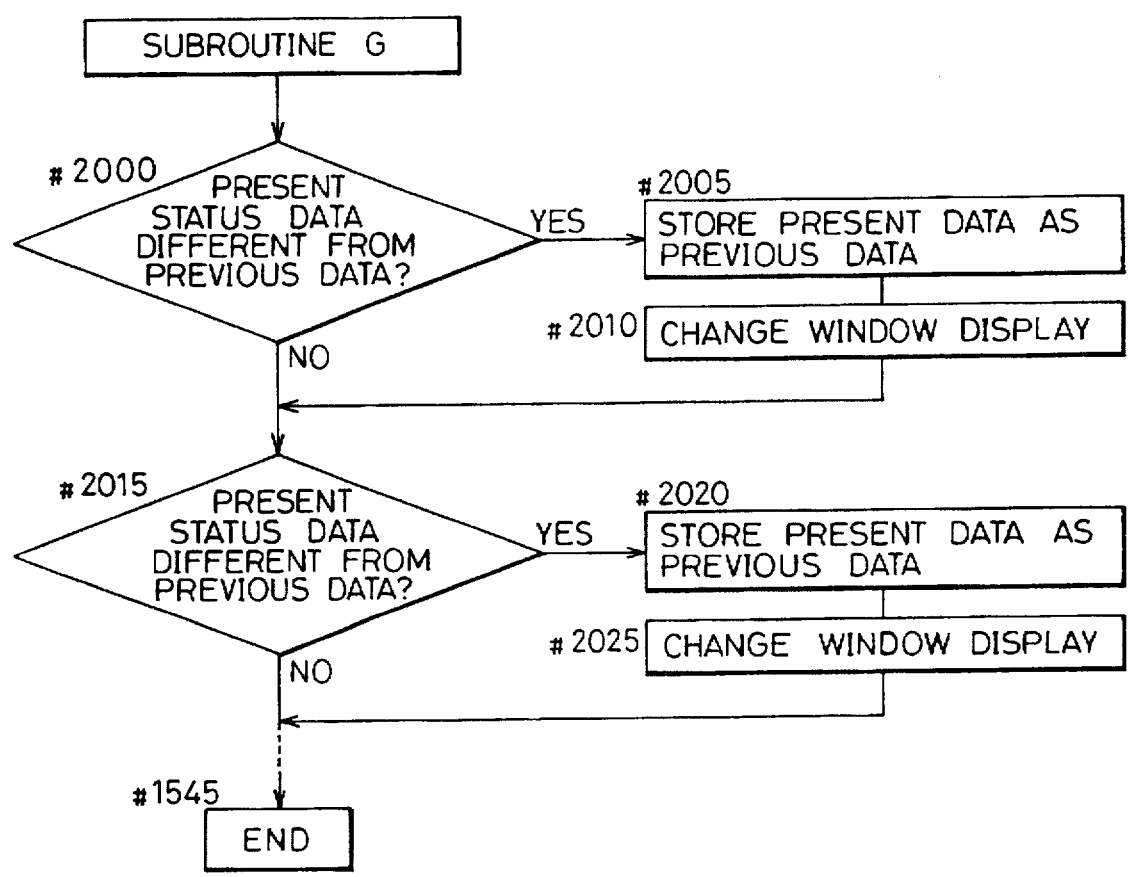
FIG. 26 is a flowchart of a subroutine G.

A subroutine J executed at step #1100 is a routine in which the command stored in the command storage buffer is checked. The details thereof are shown in FIG. 25. In the figure, when the command count in the command storage buffer is 0, no processing is performed. However, when it is not 0, the process proceeds to the flow from step #1505, in which it is detected which status command the command is, the detected command data is recognized, the present status data is stored as the previous status data, the new status data is written as the present status data, and the status recognition check request flag and a re-transmission check counter are reset. Then, at step #1545, the command count is decremented and the process returns to step #1500. When the command count becomes 0 in the end, the process proceeds to step #1550 to finish the command routine.

When the subroutine J ends and the subroutine F of FIG. 24 ends, in the main flow, the process proceeds to step #230 to execute a subroutine G. The subroutine G will be described with reference to FIG. 26. In this routine, at step #2000 and subsequent steps, which status data has replaced the previous status data is detected. When there is a change in status, the present status data is stored as the previous data and the window display corresponding to the status data is changed in accordance with the data.

Figure 27:
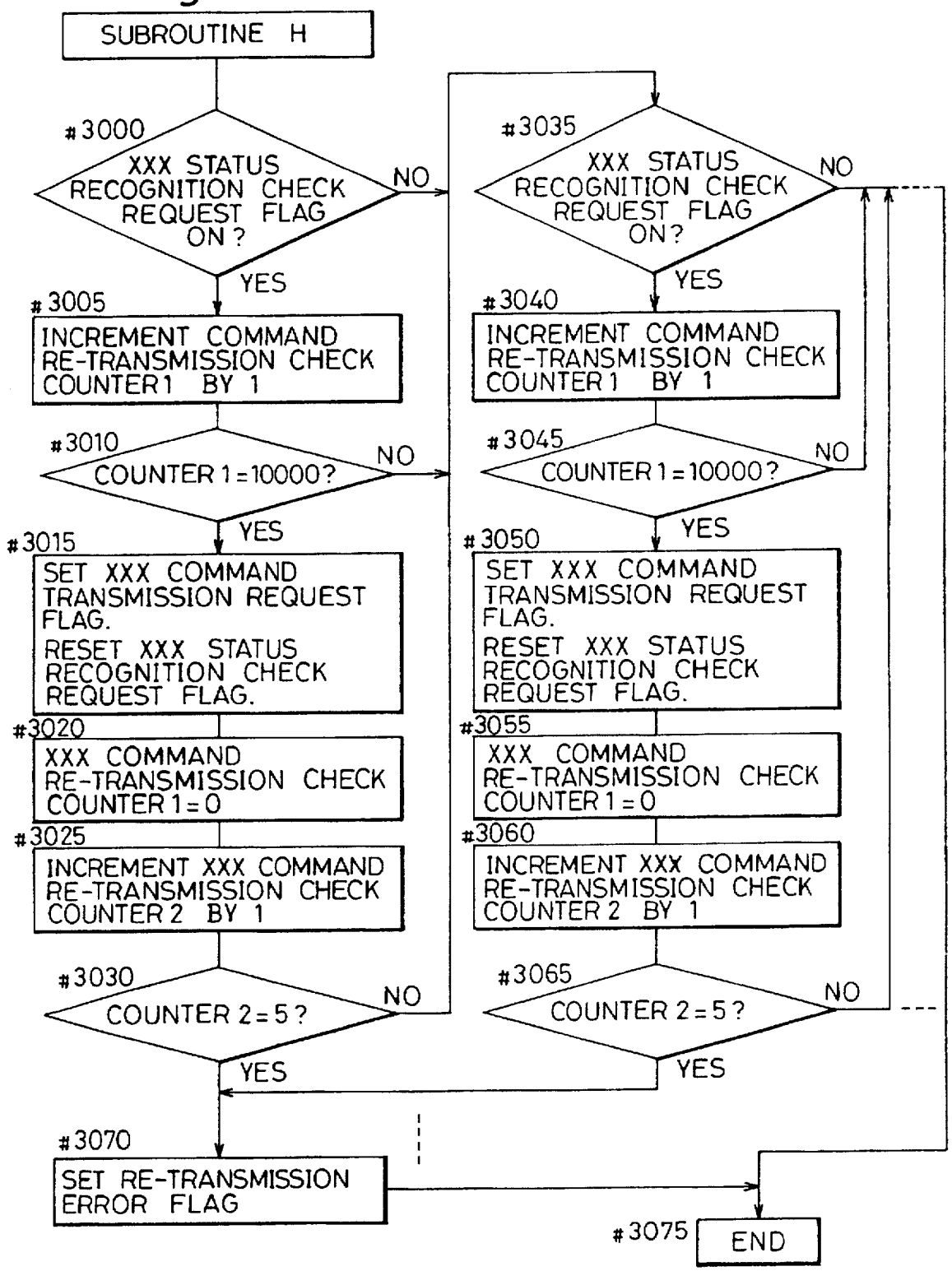
FIG. 27 is a flowchart of a subroutine H.

When this subroutine ends, in the main flow, the process proceeds from step #230 to step #235 to execute a subroutine H. The subroutine H is a routine in which a reception status data for a transmission remote command data is checked and re-transmitted, and the re-transmission is checked. The details thereof are shown in FIG. 27. In this routine, steps #3000 to #3030 form one set of processing and thereafter, a similar processing is performed with respect to another status recognition check request flag. Therefore, only steps #3000 to #3030 will be described here.

First, at step #3000, whether a predetermined status recognition check request flag has been set or not is determined. When it has not been set, the process proceeds to the determination step #3035 relating to the next status flag. When the predetermined status recognition check request flag has been set, after a command re-transmission check counter 1 thereof is incremented at step #3005, whether the command re-transmission check counter 1 has become the re-transmission check loop repetition number 10000 or not is determined at step #3010. When the result of the determination is no, the process proceeds to step #3035. When the result of the determination is yes, the transmission request flag of the same command is set and the status recognition flag is reset at step #3015.

Then, at step #3020, the command re-transmission check counter 1 is set to 0, and after a command re-transmission check counter 2 is incremented at the next step #3025, whether the command re-transmission check counter 2 has become the re-transmission check loop repetition number 5 or not is determined at step #3030. When the result of the determination is no, the process proceeds to step #3035. When the result of the determination is yes, a re-transmission error flag is set at step #3070, and this flow ends at step #3075.

Figure 29:
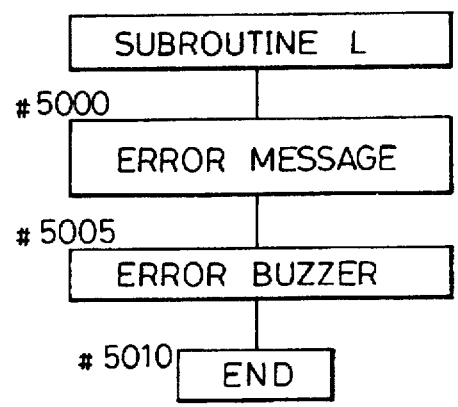
FIG. 29 is a flowchart of a subroutine L.

When the subroutine H ends, the main flow proceeds from step #235 to step #240, where whether a re-transmission error occurs or not is determined. When no re-transmission error occurs, the process returns to step #10 to repeat the flow therefrom. When a re-transmission error occurs, the process proceeds to step #245, where a program termination processing subroutine L is executed. In this subroutine L, as shown in FIG. 29, an error message is displayed in the command execution window at step #5000, and after an error buzzer is provided at step #5005, this routine ends at step #5010.

Figure 19:
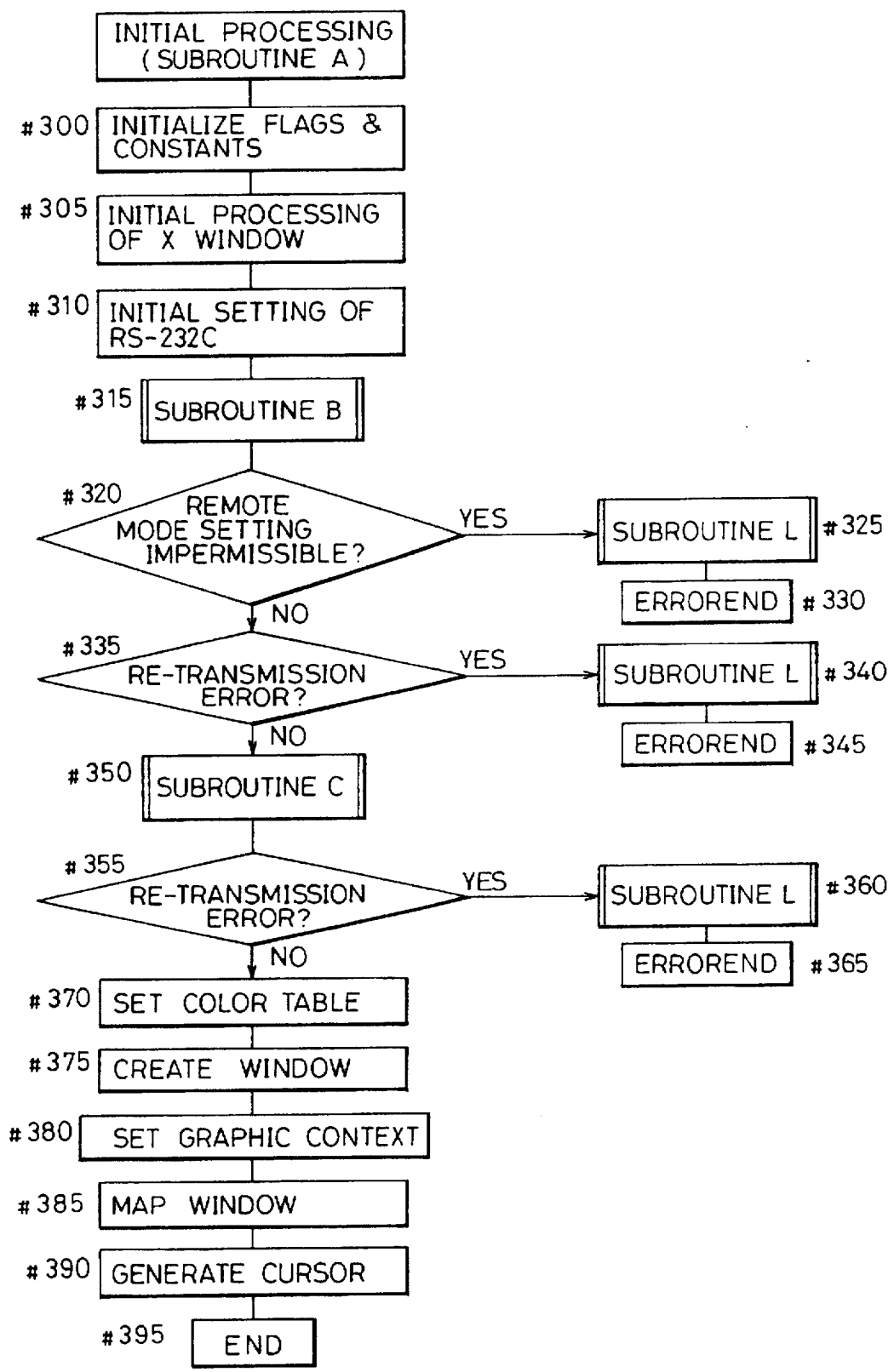
FIG. 19 is a view showing an initial processing subroutine A executed in the main flow.

Referring now to FIG. 19, the subroutine A relating to the initial setting executed at step #5 of the main flow will be described. First, at step #300, flags and constants are initialized. Then, at step #305, the initial processing of the X window is performed, and at step #310, the initial setting of an interface used for communication with the image processing unit IPU is performed. Thereafter, a subroutine B is executed at step #315. The subroutine B is a remote mode setting routine, which is executed here since in this embodiment, the remote mode is activated simultaneously with the activation of the program. In this routine, the procedures to set the remote mode are taken and the re-transmission control to set the remote mode is performed.

Figure 20:
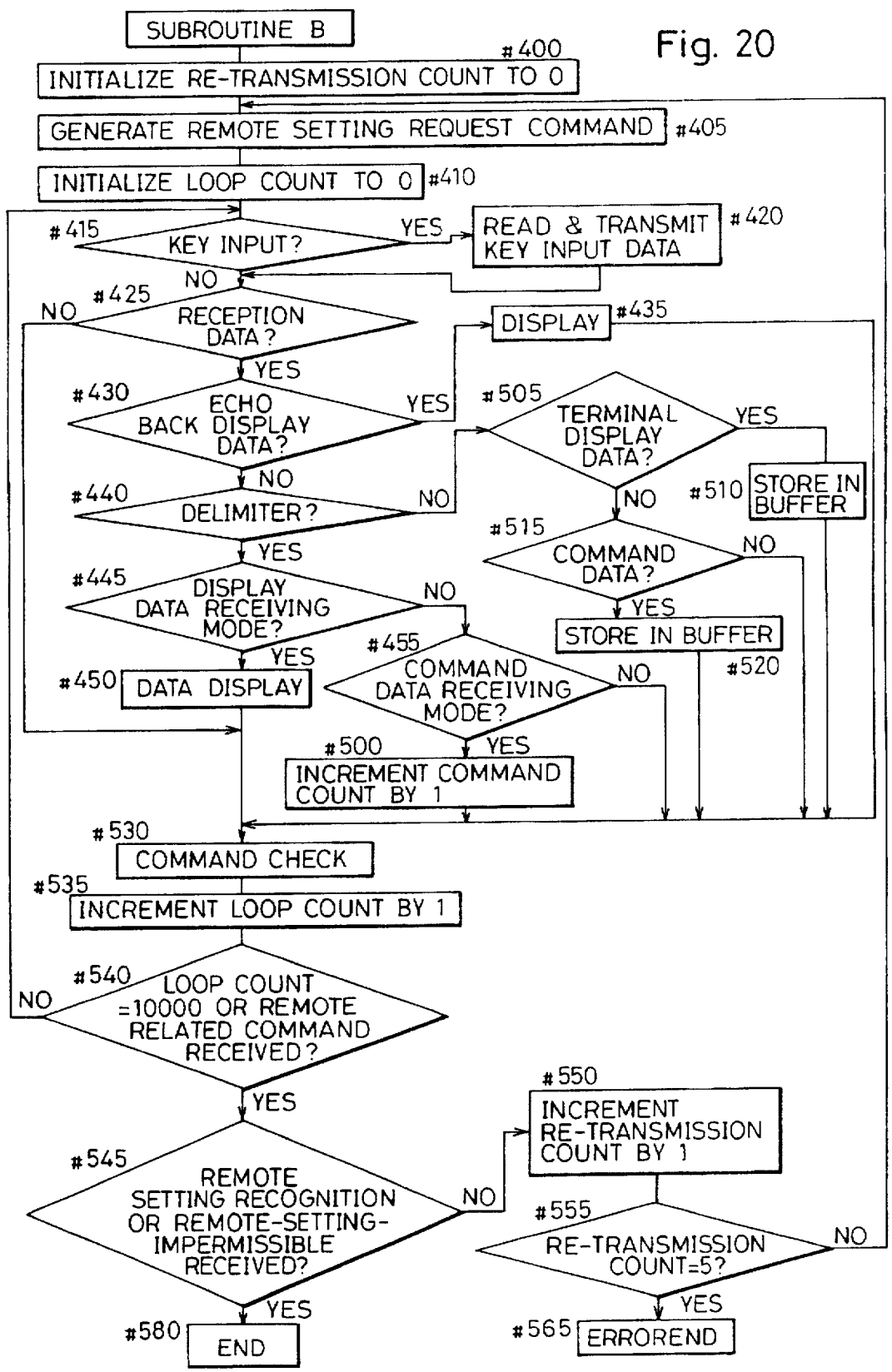
FIG. 20 is a flowchart of a subroutine B.

As shown in FIG. 20, in the subroutine B, the communication processing and the re-transmission processing are performed. First, at step #400, the re-transmission count (counter 2) is initialized. Then, at step #405, a remote setting request command is generated, and at step #410, the loop count (counter 1) is initialized. Thereafter, the process proceeds to step #415, where whether there is a key input for the terminal or not is determined. When there is the key input, after the details of the key input are read and a data formed by the key input is transmitted at step #420, the process proceeds to step #425. When there is no key input, the process proceeds directly to step #425, where whether there is a received data or not is determined.

When there is no received data, the process jumps to step #530, where the counted command in the command storage buffer is checked. Specifically, whether a remote setting recognition data or a remote-setting-impermissible data is in the command storage buffer is checked. At this time, since it is impossible to set the remote mode in a simulation mode, the result of the check is the remote-setting-impermissible data.

Then, after the loop count is incremented at step #535, whether the loop count has reached a predetermined number 10000 or not and whether a command relating to the remote has been received or not are determined at step #540. When neither the loop count has reached 10000 nor the command relating to the remote has been received, the process returns to step #415 to repeat the flow from step #415. When the loop count has reached 10000 or the remote command has been received, the process proceeds to step #545, where whether the remote setting recognition data has been received or not and whether the remote-setting-impermissible has been received or not are determined. When either of the data has been received, the process proceeds to step #560 to finish this subroutine.

When neither of the data has been received, the process proceeds to step #550, where the re-transmission count is incremented. At the next step #555, whether the re-transmission count has become 5 or not is determined. When it has become 5, the process proceeds to step #565, where an error termination is performed. When it has not become 5, the process returns to step #405 to execute the flow from step #405 again. As described above, when it is determined that the re-transmission count has not become 5, the remote setting request command is generated at step #405 for re-transmission. On the contrary, in the case where the loop count has not become 10000, since the process returns to step #415 which is below step #405, the re-transmission of the remote setting request command is not performed.

When it is determined at step #425 that there is a received data, the process proceeds to step #430. Since steps #430 to #520 are the same as steps #1045 to #1095 of the previously-described subroutine F, no description thereof will be given.

After the subroutine B is executed in this manner, in the initial processing flow, the process proceeds to step #320, where whether the setting of the remote mode is impermissible or not is determined. When the setting of the remote mode is impermissible, the program error termination processing subroutine L is executed at step #325, and the process ends by reason of the error at step #330. When the setting of the remote mode is permissible, a re-transmission processing error (a condition where the re-transmission count has become 5 at the previously-described step #555) occurs or not is determined at step #335. When the re-transmission error occurs, the program error termination processing subroutine L is executed at step #340 and the process ends by reason of the error at step #345.

Figure 21:
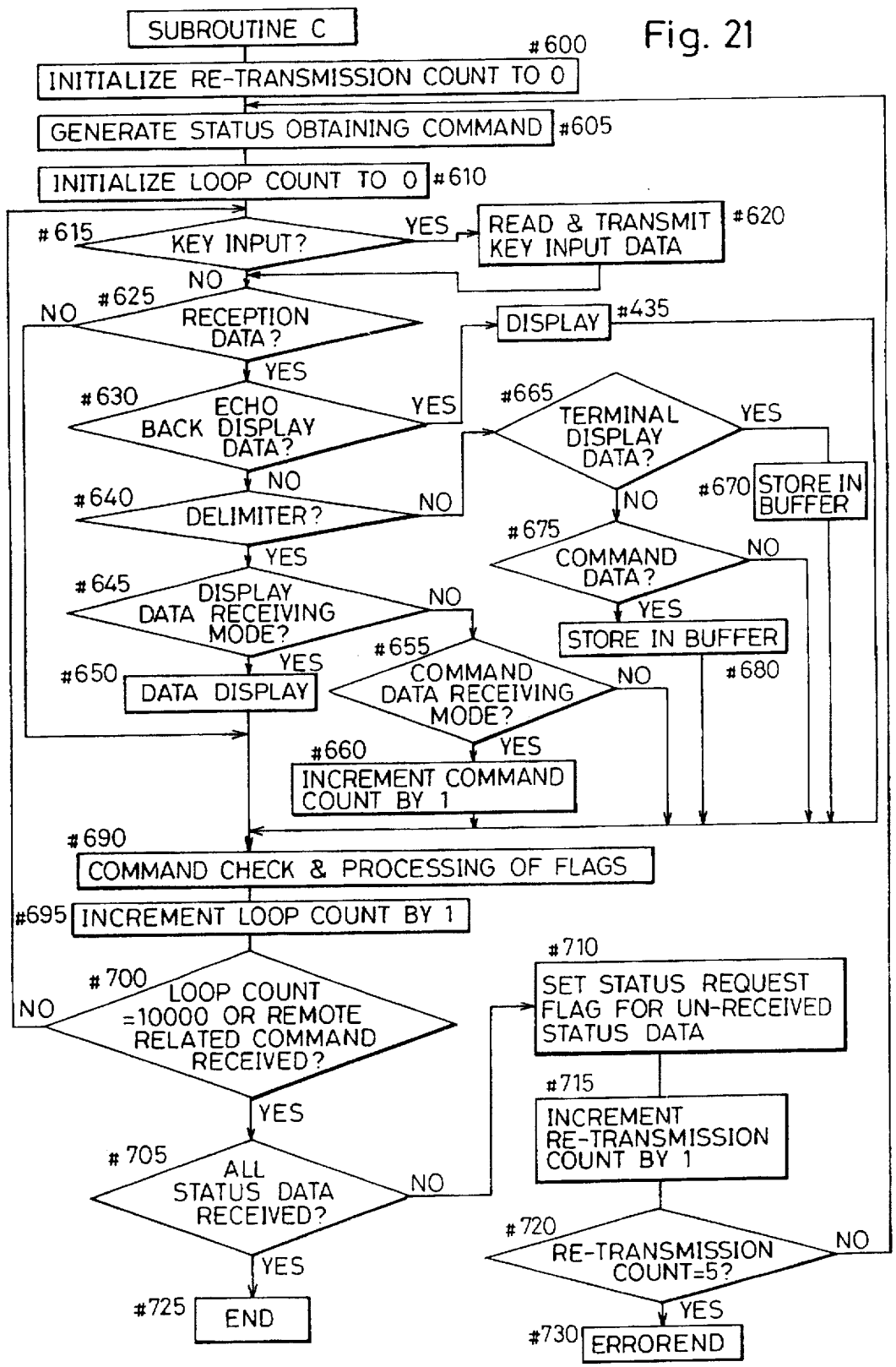
FIG. 21 is a flowchart of a subroutine C.

When no re-transmission error occurs, the process proceeds to step #350, where a subroutine C is executed. The subroutine C is a routine for getting information on the copying machine unit 9, such as which cassette is selected, to create the remote display. The details thereof are shown in FIG. 21. First, the re-transmission repetition count is initialized at step #600, and commands for gaining various statuses of the copying machine unit 9 are generated at step #605. Then, a reception waiting loop count is initialized at step #610, and the flow from step #615 is executed.

In the subroutine C, request commands of all the statuses are generated to perform the received data processing and the command reception processing. This subroutine ends when all the status data are received. When not all of the status data are received, processing is performed with respect to the loop counted 10000 times and the re-transmission repetition number thereof (five times) through the re-transmission control. This is the same as the previously-described case of the remote mode setting.

After the subroutine C is executed in this manner, whether the re-transmission error occurs or not is determined at step #355. When the re-transmission error occurs, the program error termination processing is performed at step #360, and the process ends by reason of the error at step #365. When no re-transmission error occurs, processing for providing a display, i.e. the color setting (step #370), the creation of the window (position and size of the window) (step #375), the setting of the graphic context such as the color of characters and fonts (step #380), the mapping of the window (step #390) and the generation of the cursor (step #390) are performed. Then, the initial processing ends.

Figure 28:
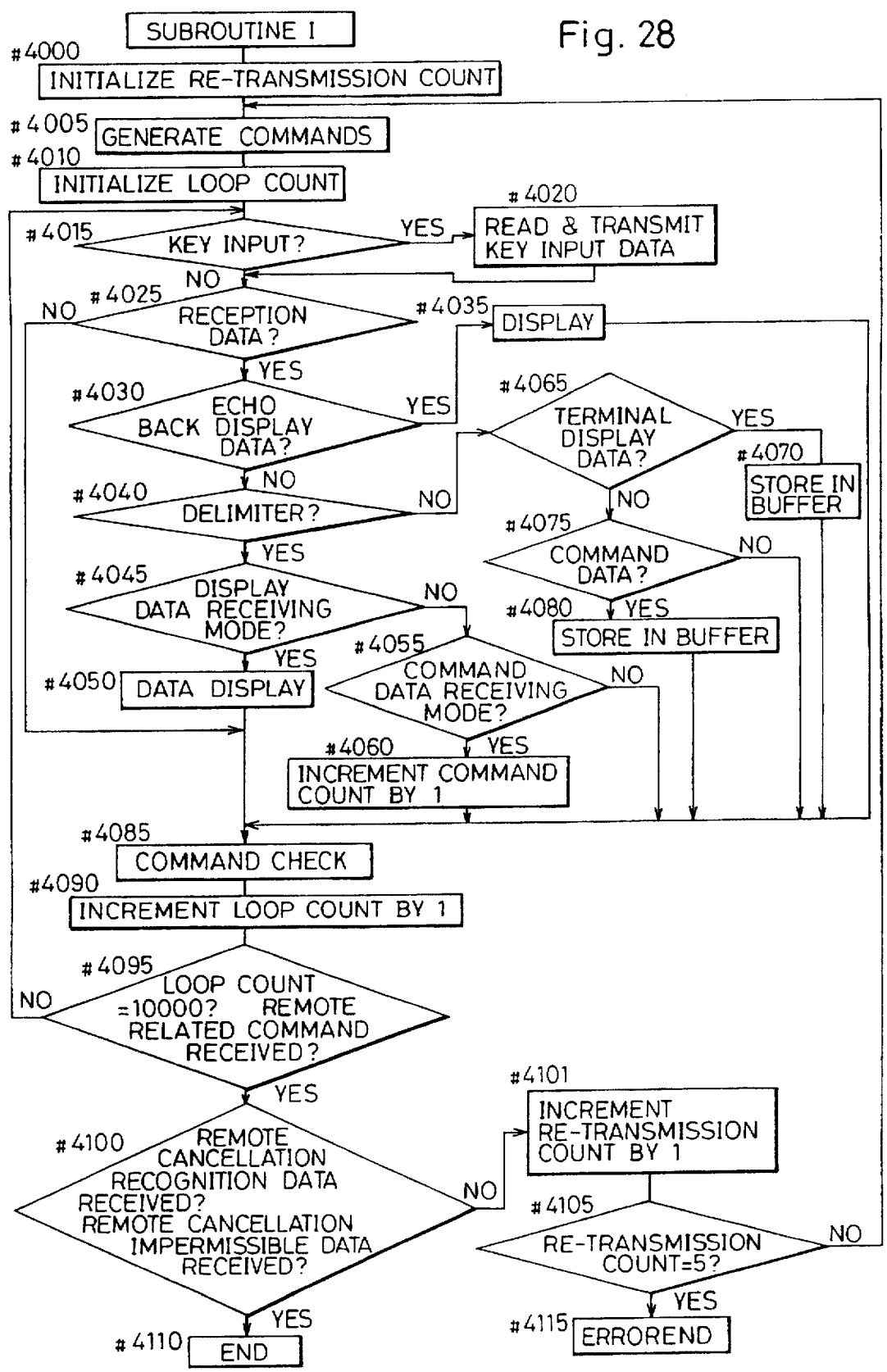
FIG. 28 is a flowchart of a subroutine I.

Returning to the main flow of FIG. 16, when it is determined at step #220 that the remote program has ended, a subroutine I for the remote mode cancellation processing in the copying machine unit 9 and the re-transmission control of the cancellation is executed at step #250. The subroutine I is shown in FIG. 28. Since it is substantially the same as the previously-described remote setting subroutine B except that "remote setting" is replaced by "remote cancellation", no description thereof will be given.

After the subroutine I is executed, the process proceeds to step #255, where whether the remote cancellation is impermissible or not is determined. When it is impermissible, a program error termination processing is performed at step #260. When it is not impermissible, whether the re-transmission error occurs or not is determined at step #265. When the re-transmission error occurs, the program error termination processing is performed at step #270. When no re-transmission error occurs, the program termination processing is performed at step #275.

Figure 30:
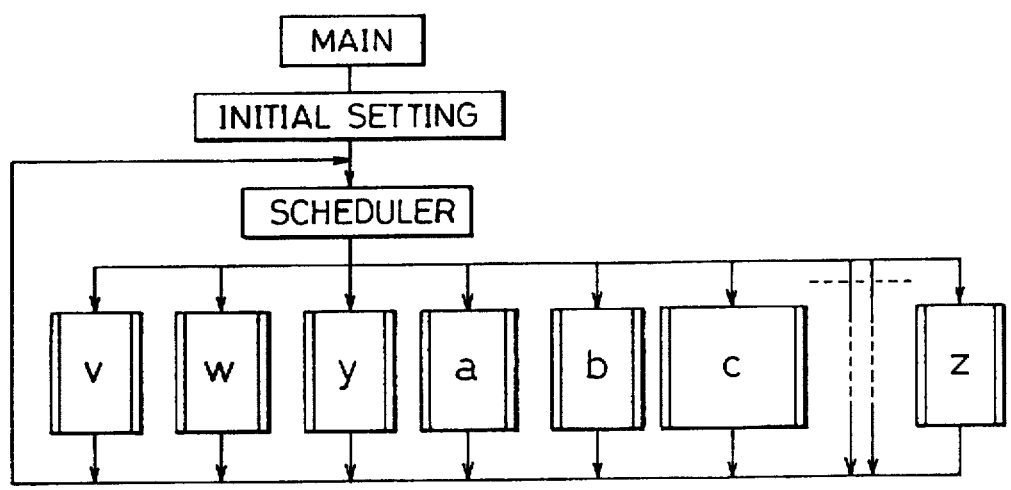
FIG. 30 is a view showing a main flow of the image processing unit.

Finishing the description of the program of the workstation WS, the program of the image processing unit IPU will subsequently be described. In the program of the image processing unit IPU, as shown in FIG. 30, the following sections operate in parallel: a section v in which the control of a serial communication with the operation portion 10 is performed; a section w in which the control of an RS-232C communication with the terminal is performed; a section y in which a special communication protocol processing where communication is performed only with respect to the data of the set data which has been changed is performed in communication with the operation portion 10; a section a in which data from the terminal (in this case, the workstation WS) are processed; a section b in which the status of the copying machine unit 9 transmitted from the operation portion 10 is checked to transmit to the workstation WS commands relating to information on the copying machine unit 9 from the operation portion 10 (only when the information has been changed); a section c in which the image processing control and the handshaking of the remote mode are performed; and a section z which is an idle condition where there is nothing to process.

Of these sections, the sections a, b and c constitute the program section relating to the remote control, and the outlines thereof are as follows.

Section a (terminal [workstation WS] data processing)

Processing for commands from the terminal, data recognition, debugger programs and remote commands (flag setting, command).

Section b (status check)

Check of the status information on the copying machine unit 9 from the operation portion 10. When the status has been changed, the control of flags and the generation of commands are performed.

Section c (control of the image processing unit and the copying machine unit)

The handshaking with the operation portion 10 relating to the control of the copying machine unit, the control of the image processing unit, and the handshaking with the operation portion 10 relating to the remote mode and a processing therefor.

A remote command from the workstation WS is recognized and converted in the section a of the program of the image processing unit IPU, and is transmitted to the operation portion 10 as a key ON data for every function from the section c. The key ON data is the same as the data generated when a key of the operation portion 10 is pressed. A command from the workstation WS, which is recognized in the section a, is converted into the key ON data in the section a. Similarly responding to the normal function setting key which is provided to the operation portion 10, the operation portion 10 changes the setting when it receives the key ON data from the image processing unit IPU. The changed function setting data is fed back to the image processing unit IPU as the status data. The image processing unit IPU checks the change in status of the copying machine unit 9 in the section b, and with respect to the changed statuses, the status commands are generated to the workstation WS.

The sections a, b and c are controlled by the following flags:

Remote setting request flag

When this flag is set, the remote setting handshaking with the operation portion 10 is performed in the section c.

This flag is set when the remote setting command is received in the section a.

This flag is reset in the section c after the remote mode flag set to ON is transmitted from the operation portion.

Remote cancellation request flap

When this flag is set, the remote canceling handshaking with the operation portion is performed in the section c.

This flag is set when the remote cancellation command is received in the section a.

This flag is reset in the section c after the remote mode flag reset to OFF is transmitted from the operation portion.

Remote setting recognition flag

When this flag is set, a remote setting recognition command is generated in the section a to send it to the workstation WS.

This flag is set in the section c after the remote mode flag set to ON is transmitted from the operation portion.

This flag is reset when the remote setting command is transmitted to the workstation in the section b.

Remote cancellation recognition flag

When this flag is set, communication of the remote cancellation recognition command is performed with the operation portion in the section c.

This flag is set in the section c after the remote mode flag set to OFF is transmitted from the operation portion.

This flag is reset when the remote cancellation command is transmitted to the workstation in the section b.

xxx (printing, stop/clear, reset) condition setting request flag

When this flag is set, the handshaking with the operation portion for setting the xxx condition is performed in the section c.

This flag is set when the xxx condition setting command is received in the section a.

This flag is reset when the xxx recognition communication data is received in the section c through the handshaking with the operation portion.

xxx (printing, stop/clear, reset) condition setting recognition flag

When this flag is set, the xxx condition recognition command is generated in the section a to send it to the workstation WS.

This flag is set when the xxx recognition communication data is received in the section c through the handshaking with the operation portion.

This flag is reset when the xxx condition setting command is transmitted to the workstation WS in the section b.

Function setting xxx key ON request flag

When this flag is set, the xxx key ON data is transmitted to the operation portion in the section c.

This flag is set when the function setting xxx command is received in the section a.

This flag is reset when the xxx key ON data is transmitted to the operation portion in the section c.

Function setting xxx key ON recognition flag

When this flag is set, the xxx status of the copying machine unit relating to the xxx key is checked in the section b.

This flag is set when the xxx ON data is transmitted to the operation portion in the section c.

This flag is reset when the xxx status is changed in the section b.

Function setting xxx key OFF request flag

When this flag is set, the xxx key OFF data is transmitted to the operation portion in the section c.

This flag is set when the xxx status relating to the xxx key is changed when the xxx key ON recognition flag is set in the section b.

This flag is reset when the xxx key OFF data is transmitted to the operation portion in the section c.

xxx status change notification flag

When this flag is set, the xxx status command is generated to the workstation WS in the section b.

This flag is set when the xxx status is changed in the section b.

This flag is reset when the xxx status command is generated to the workstation WS in the section b.

Figure 31:
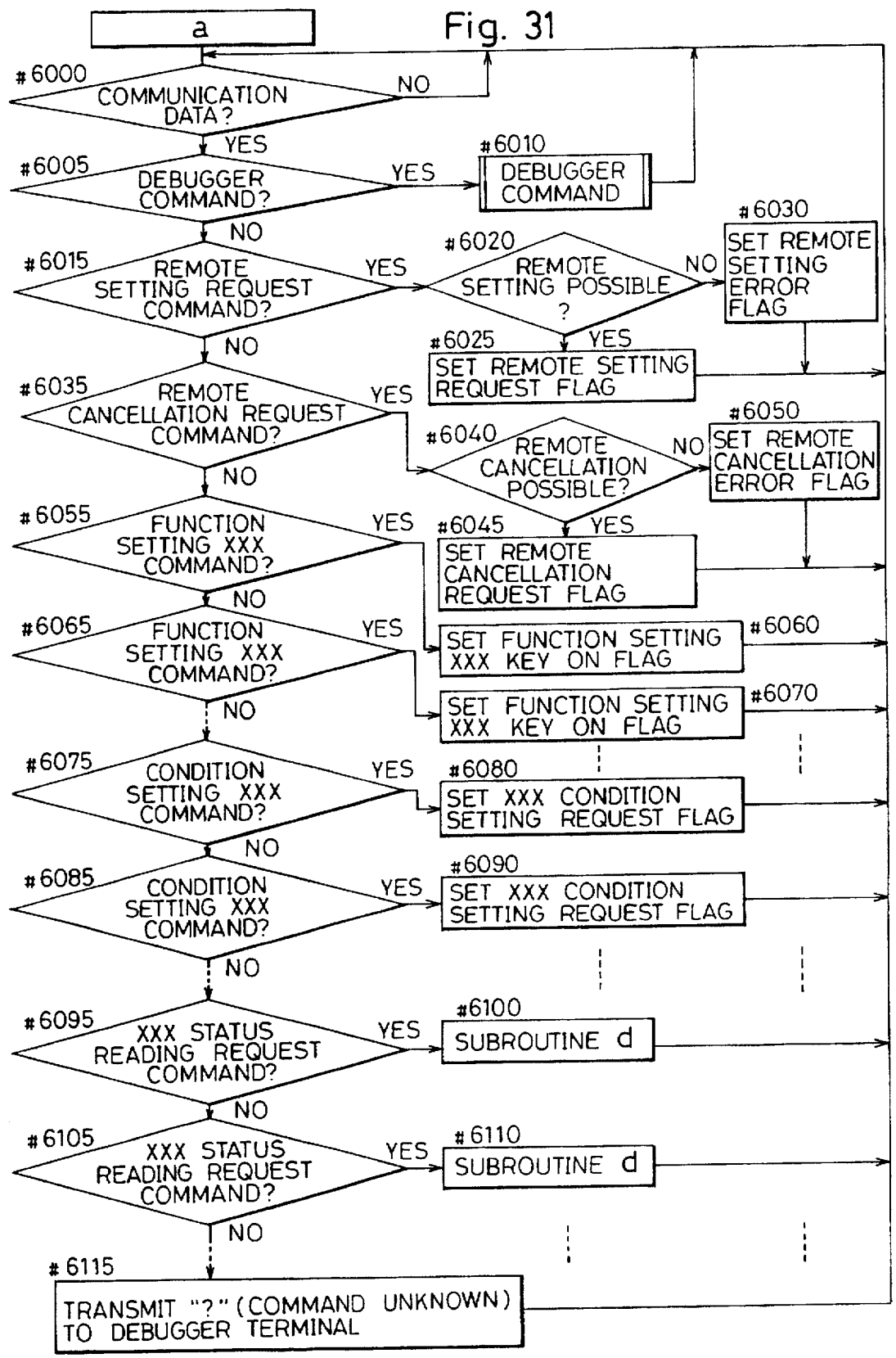
FIG. 31 is a flowchart of a control performed in a section a thereof.

Referring to the terminal processing flowchart of FIG. 31, the section a will be described. First, at step #6000, whether there is a communication data from the terminal (WS) or not is determined. The communication data from the terminal is a command relating to the key input or the remote. When there is a communication data, whether the communication data is a terminal debugger command or not is determined at step #6005. When it is the debugger command, it is processed at step #6010. When it is not the debugger command, whether it is a remote setting request command or not is determined at step #6015. When it is the remote setting request command, whether the remote setting is possible or not is determined at step #6020. When it is possible, the remote setting request flag is set at step #6025. When it is impossible, a remote setting error flag is set at step #6030.

When the communication data is not the remote setting request command at step #6015, the process proceeds to step #6035, where whether the communication data is a remote cancellation request command or not is determined. When the result of the determination is yes, the process proceeds to step #6040, where whether the remote cancellation is possible or not is determined. When it is possible, the remote cancellation request flag is set at step #6045. When it is impossible, a remote cancellation error flag is set at step #6050.

When it is determined at step #6035 that the communication data is not the remote cancellation request command, the process proceeds to step #6055, where whether the communication data is the function setting xxx command or not is determined. When the result of the determination is yes, the process proceeds to step #6060, where the function setting xxx key ON flag is set. If there is a parameter data such as the copy quantity or the selection of the copy color, it is also set at this step. Steps similar to steps #6055 and #6060 are prepared also for other function setting xxx commands; steps #6065 and #6070 are an example. These steps are provided in number corresponding to the number of necessary functions.

When it is determined that the communication data is not a function setting xxx command, the process proceeds to step #6075, where whether the communication data is a condition setting xxx command or not is determined. When the result of the determination is yes, the xxx condition setting request flag is set at step #6080. With respect to the condition setting xxx command, steps similar to steps #6075 and #6080 are provided in necessary number. Steps #6085 and #6090 are an example. The condition setting xxx command is a command such as a printing request command and a stop/clear request command.

When it is determined that the communication data is not the condition setting xxx command, whether the communication data is a xxx status reading request command or not is determined at step #6095. When the result of the determination is yes, the process proceeds to step #6100, where a subroutine d is executed to transmit a xxx function setting status command to the workstation WS. Steps #6105 and #6110 are performed in a similar manner. The xxx status reading request command is a command of the copying machine unit 9.

Figure 32:
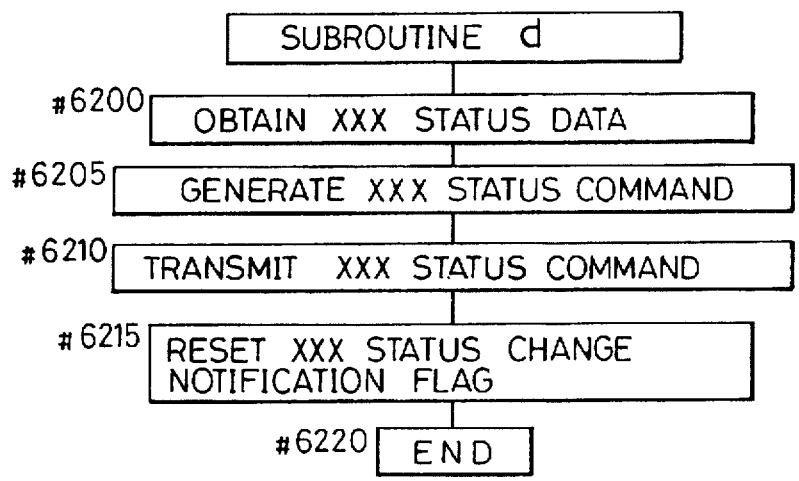
FIG. 32 is a flowchart of a subroutine d thereof.

In the subroutine d, as shown in FIG. 32, a condition data (e.g. copy quantity) of the copying machine unit 9 is obtained from the operation portion at step #6200, and based on the condition data, the xxx status command to be transmitted to the workstation WS is generated at step #6205. Then, the command is actually transmitted to the workstation WS at step #6210, and the xxx status change notification flag is reset at step #6215. Although the processing at step #6215 is basically not a transmission which takes place in response to the change of the status of the copying machine unit 9, it is added to this subroutine since it takes place in the same section of the program, i.e. in the section a.

Figure 33:
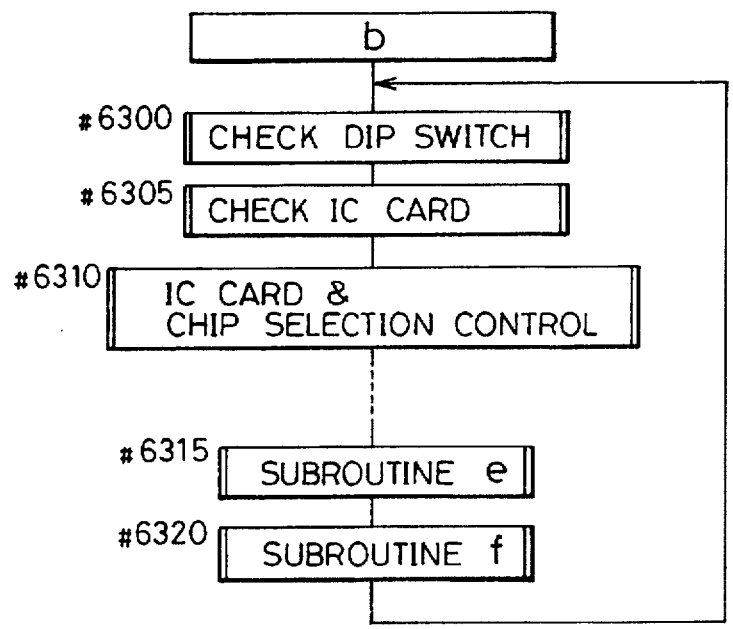
FIG. 33 is a flowchart of a control performed in a section b.

Referring to FIG. 33, status check programs executed in the section b will be described. A dip switch and an integrated circuit (IC) card are attached to a circuit board of the copying machine unit 9. In this program, the conditions thereof are checked at steps #6300 and #6305, and the IC card and chip selection control are performed at step #6310. Further, the check of the status of the copying machine unit 9 relating to this embodiment and the control of the transmission to the workstation WS in response to the condition change are performed at steps #6315 and #6320, respectively. The details of steps #6315 and #6320 are shown in FIGS. 34 and 35 as subroutines e and f, respectively.

Figure 34:
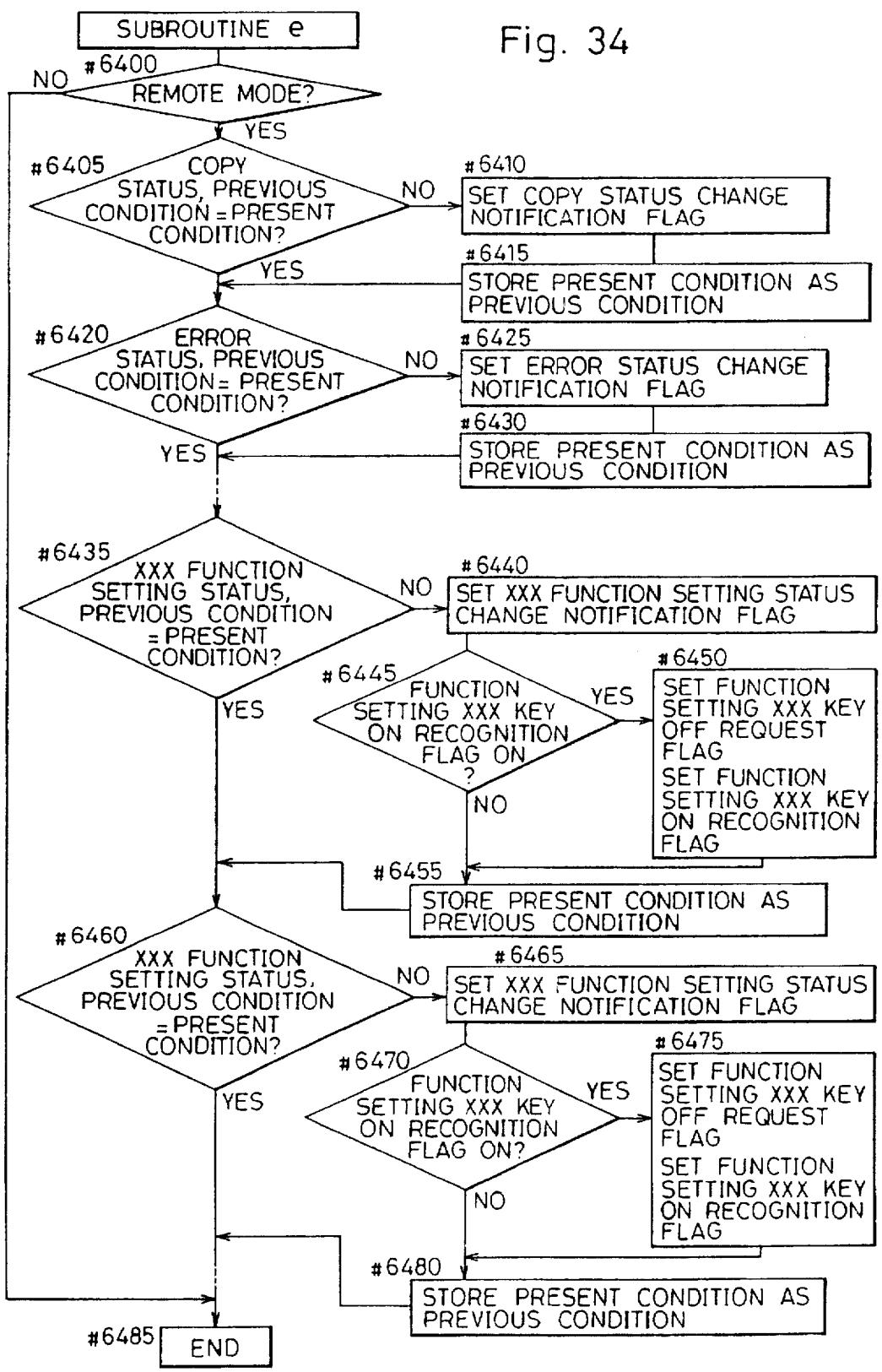
FIG. 34 is a flowchart of a subroutine e thereof.
Figure 35:
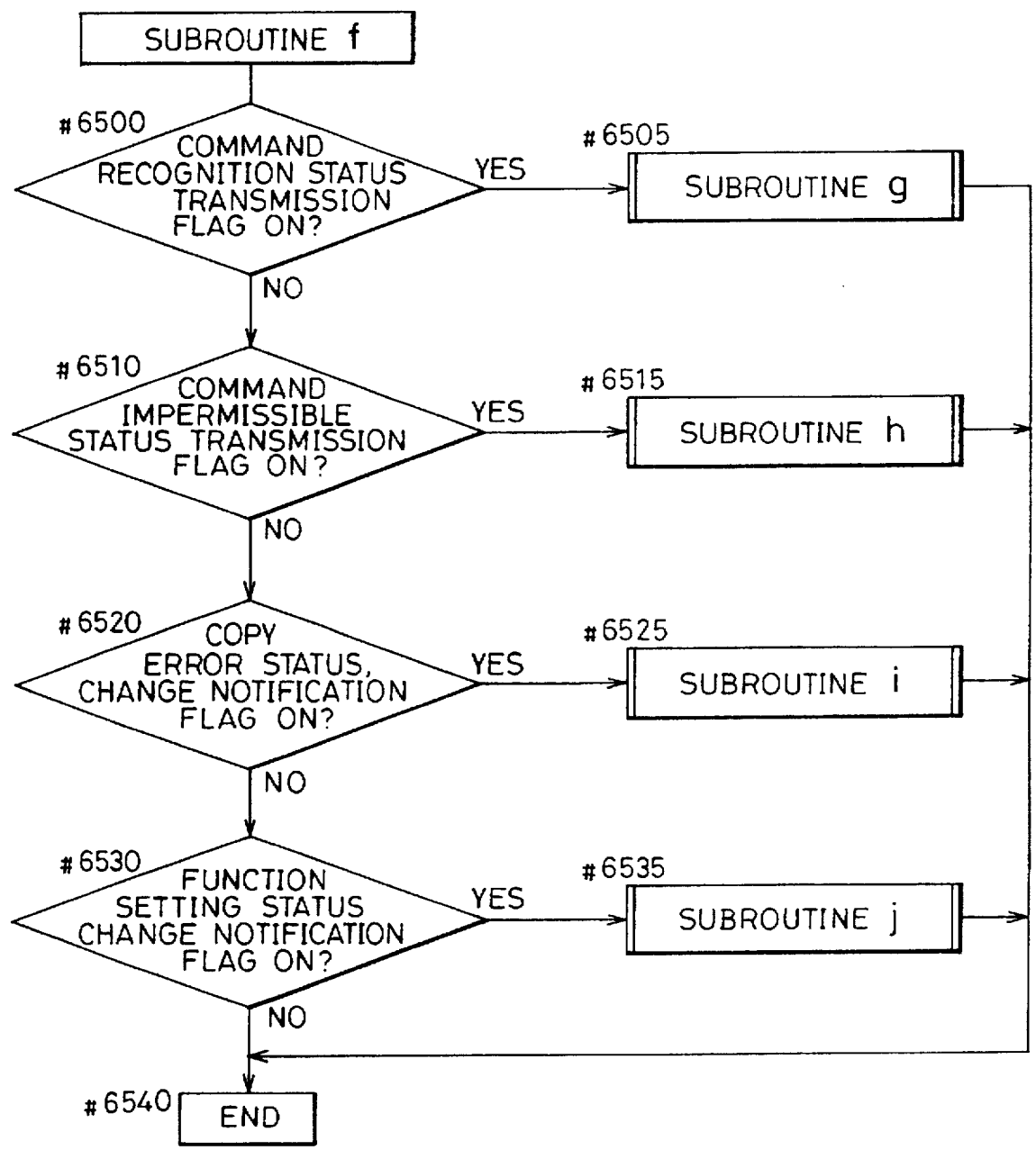
FIG. 35 is a flowchart of a subroutine f.

In the subroutine e of FIG. 34, since the check of the status of the copying machine unit 9 is necessary only in the remote mode, when it is determined at step #6400 that the remote mode is not ON, the process proceeds to step #6485 to finish this flow. When the remote mode is ON, since it is necessary to notify the workstation WS that the status has been changed, the process proceeds from step #6400 to #6405, where the previous condition and the present condition are compared with respect to every status. When the status has been changed, a status change notification flag for the status is set at step #6410, and the present condition of the status is stored as the previous condition at step #6415. While in FIG. 34, only the case of the copy status (a condition in which copying is being performed) (steps #6405, #6410 and #6415) and the case of the error status (a condition where paper is jamming or where there is no paper in the cassette) (steps #6420, #6425 and #6430) are shown, the processing is performed in a similar manner with respect to other statuses.

Then, at step #6435 and subsequent steps, a similar processing is performed with respect to the function setting status (e.g. a condition where the cassette is changed from the upper cassette to the lower cassette). In the case of the function setting status, however, the flow is different from those of the copy status and the error status in that the processing at steps #6445 (#6470) and #6450 (#6475) are further provided.

Since the condition of the function setting status in the subroutine e is changed not only by an instruction from the workstation WS in the remote mode but also by an operation on the copying machine unit, the subroutine e includes processing for both cases. When the condition is changed by an operation on the copying machine unit, the result of the determination at step #6445 (#6470) is no, and the process proceeds directly to step #6455 (#6480). On the contrary, when the condition is changed by an instruction from the workstation WS, the determination result is yes, and after the processing at step #6450 (#6475) is executed, the process proceeds to step #6455 (#6480).

The subroutine f shown in FIG. 35 is a routine in which information on the status of the copying machine unit 9 is transmitted to the workstation WS. In this subroutine, whether a command recognition status transmission flag is ON or not, whether a command impermissible status transmission flag is ON or not, whether a copy error status change notification flag is ON or not, and whether a function setting status change notification flag is ON or not are successively determined. When the result of the determination is yes, the status and the status command are transmitted to the workstation. Subroutines g, h, i and j in which the transmission is performed are shown in FIGS. 36 to 39, respectively.

Figure 36:
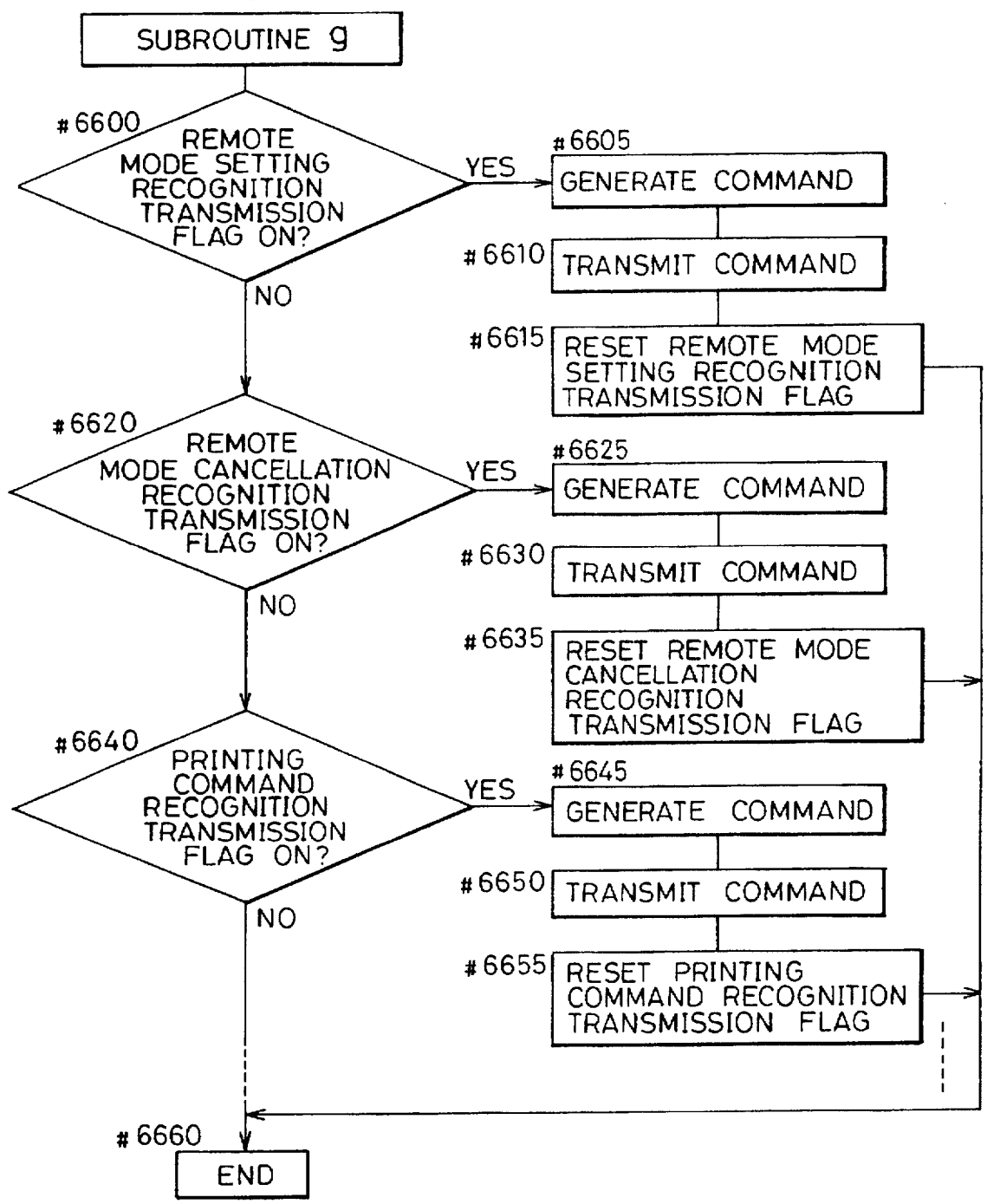
FIG. 36 is a flowchart of a subroutine g.

In the subroutine g of FIG. 36, first, when it is determined at step #6600 that a remote mode setting recognition transmission flag is ON, a command is generated at step #6605 and transmitted to the workstation WS at step #6610. Then, the remote mode setting recognition transmission flag is reset to finish this subroutine. These processing steps (#6600 to #6615) are also provided for the remote mode cancellation recognition and the printing command recognition. Moreover, although not shown, these steps are provided for the stop/clear command recognition and the reset command recognition.

Figure 37:
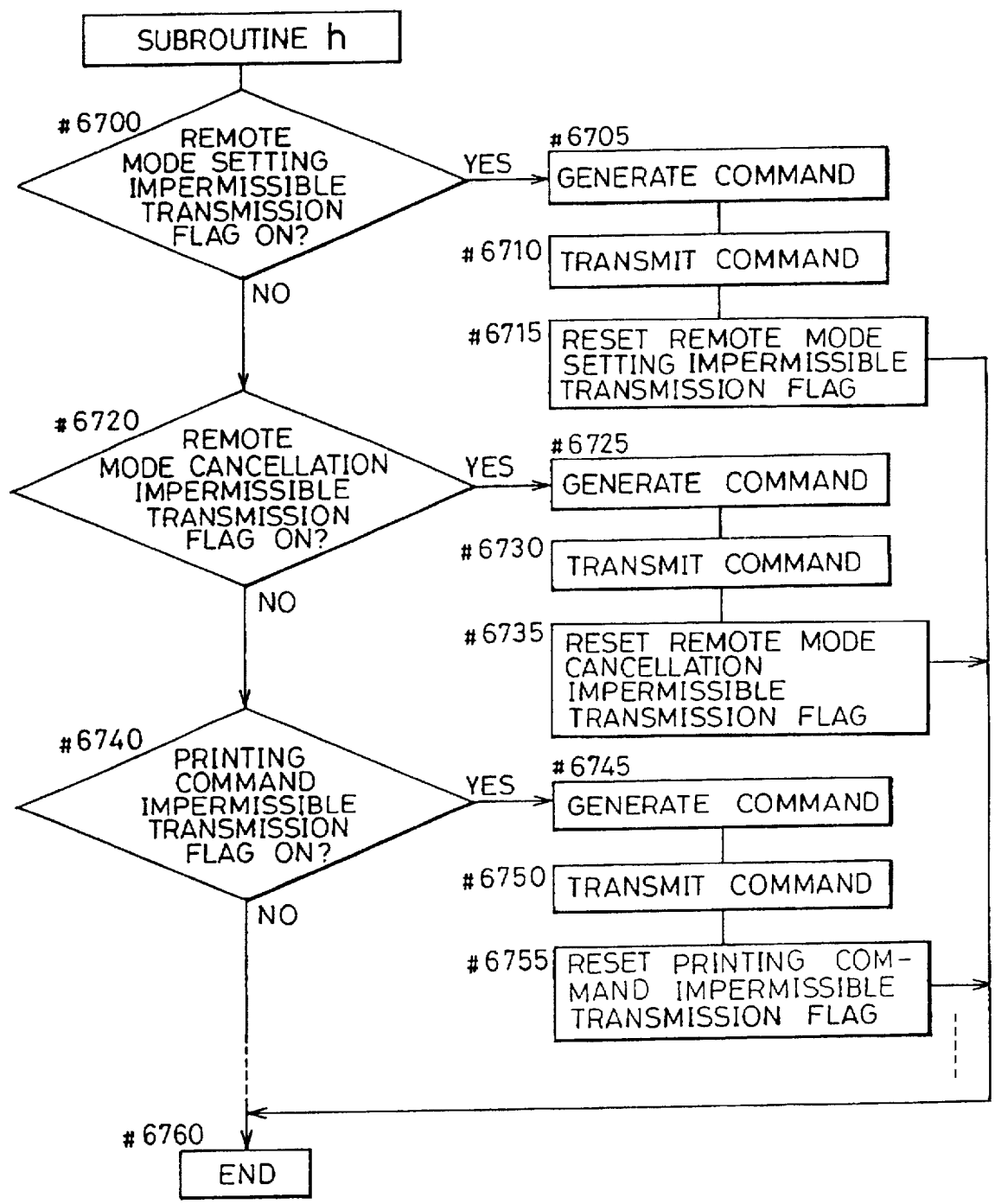
FIG. 37 is a flowchart of a subroutine h.

As shown in FIG. 37, the subroutine h is similar to the subroutine g. While in FIG. 37, processing is shown only with respect to the cases where the remote mode setting is impermissible, where the remote mode cancellation is impermissible and where the printing command is impermissible, processing for the cases where the stop/clear command is impermissible and where the reset command is impermissible are also provided.

Figure 38:
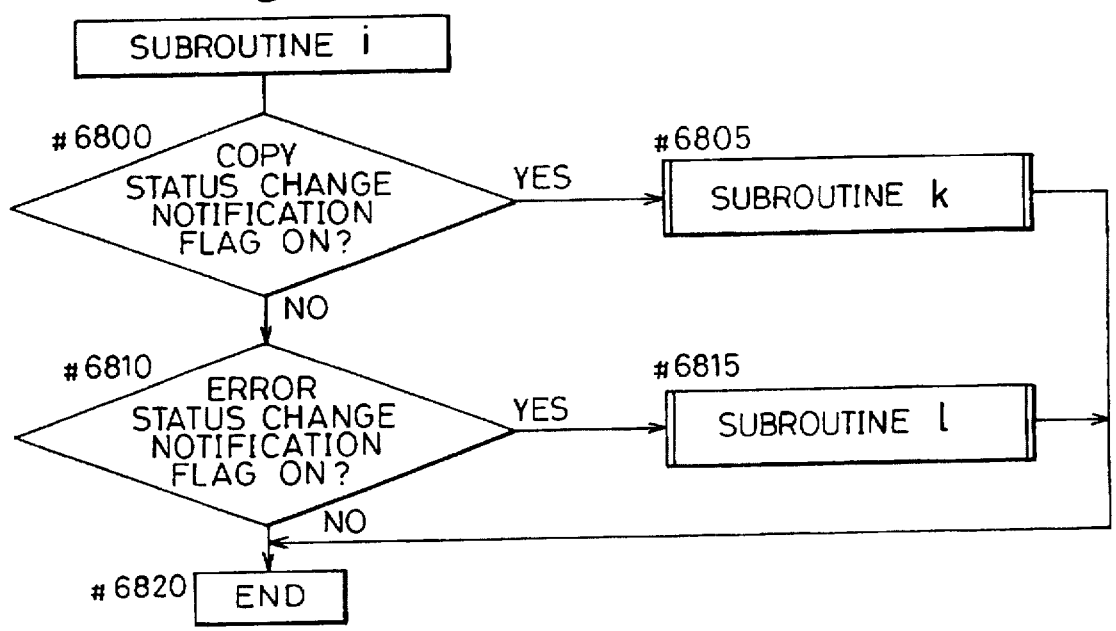
FIG. 38 is a flowchart of a subroutine i.

In the subroutine i, as shown in FIG. 38, when it is determined that a copy status change notification flag is ON, a copy status transmission subroutine k (see FIG. 40) is executed at step #6805, and when it is determined that an error status change notification flag is ON, an error status transmission subroutine l (see FIG. 41) is executed at step #6815. Then, this subroutine ends.

Figure 39:
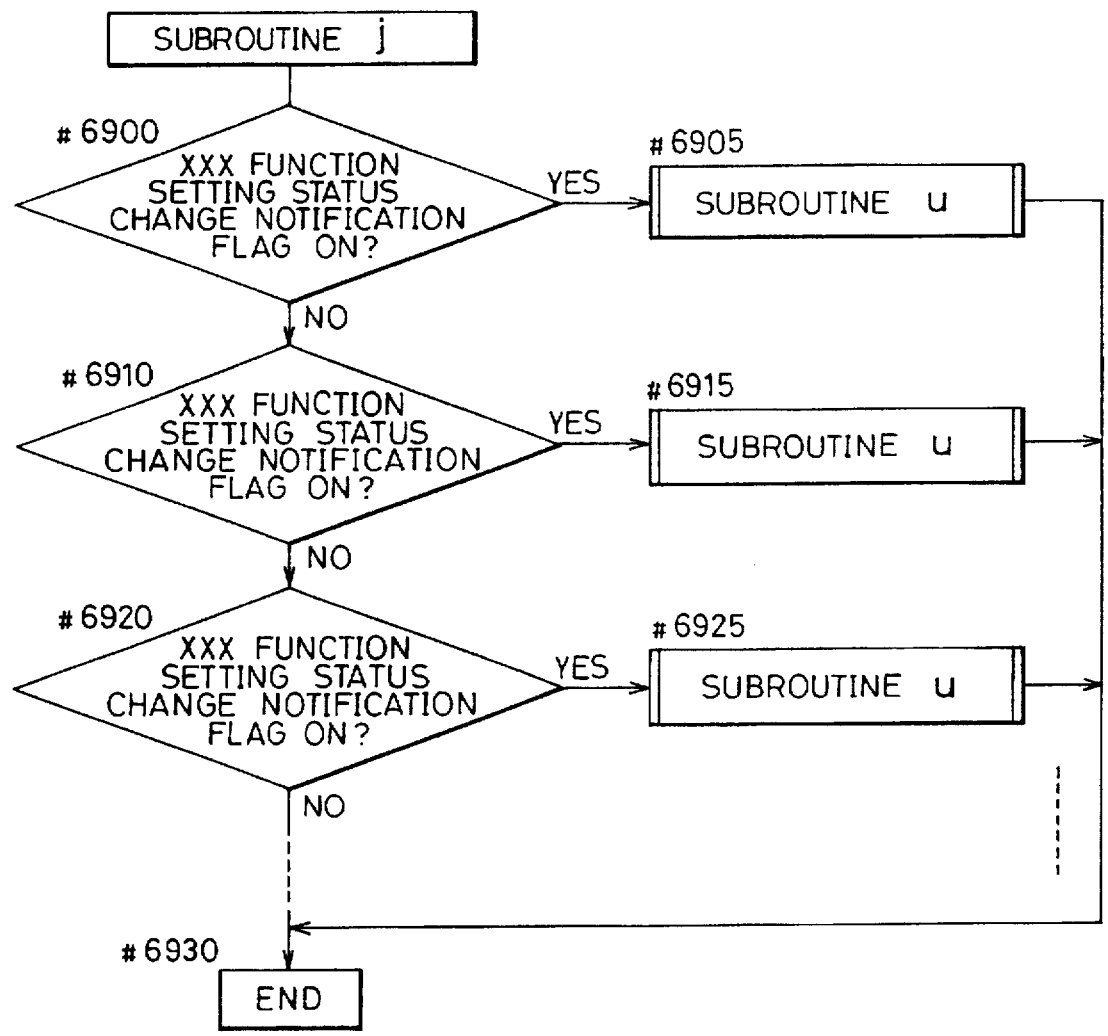
FIG. 39 is a flowchart of a subroutine j.
Figure 40:
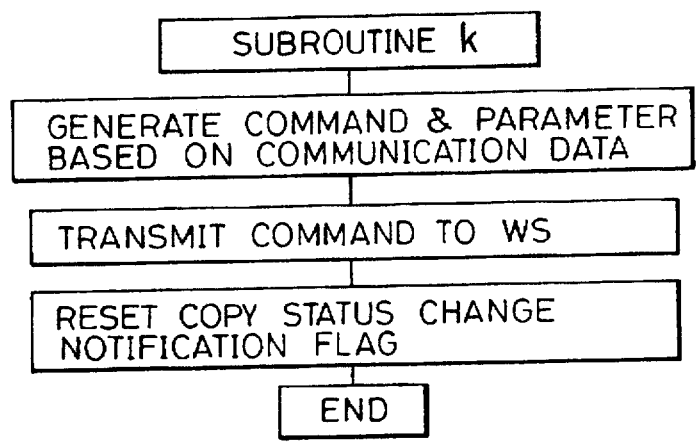
FIG. 40 is a flowchart of a subroutine k.
Figure 41:
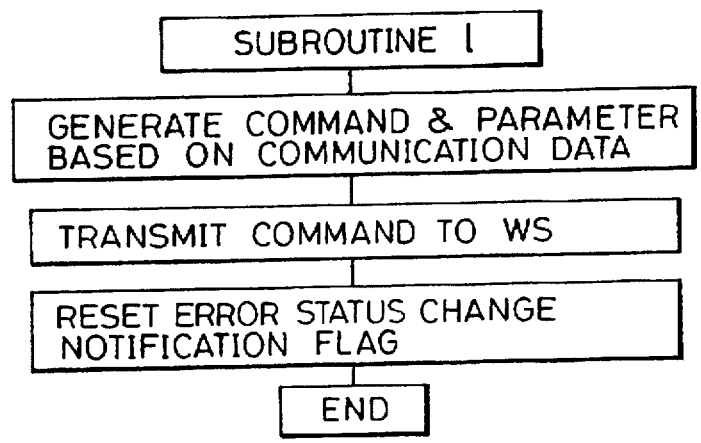
FIG. 41 is a flowchart of a subroutine l.
Figure 42:
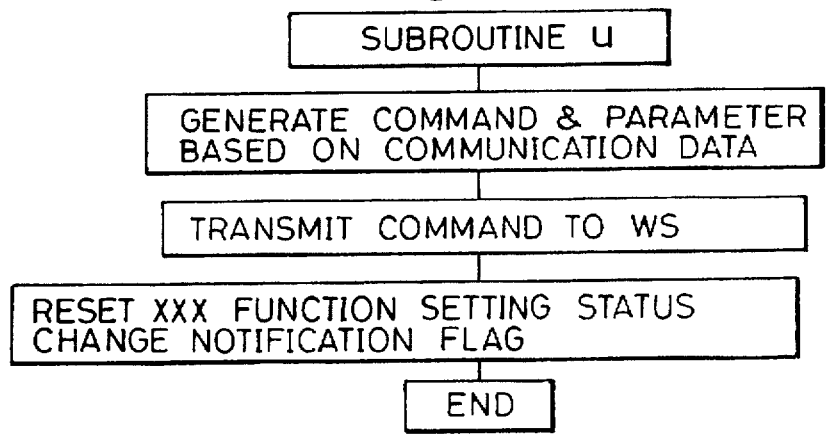
FIG. 42 is a flowchart of a subroutine u.

In the subroutine j, as shown in FIG. 39, a xxx function with respect to which a xxx function setting status change notification flag is ON is detected, and a setting status transmission subroutine u (see FIG. 42) relating to the function is executed. Then, this flow ends.

Figure 43:
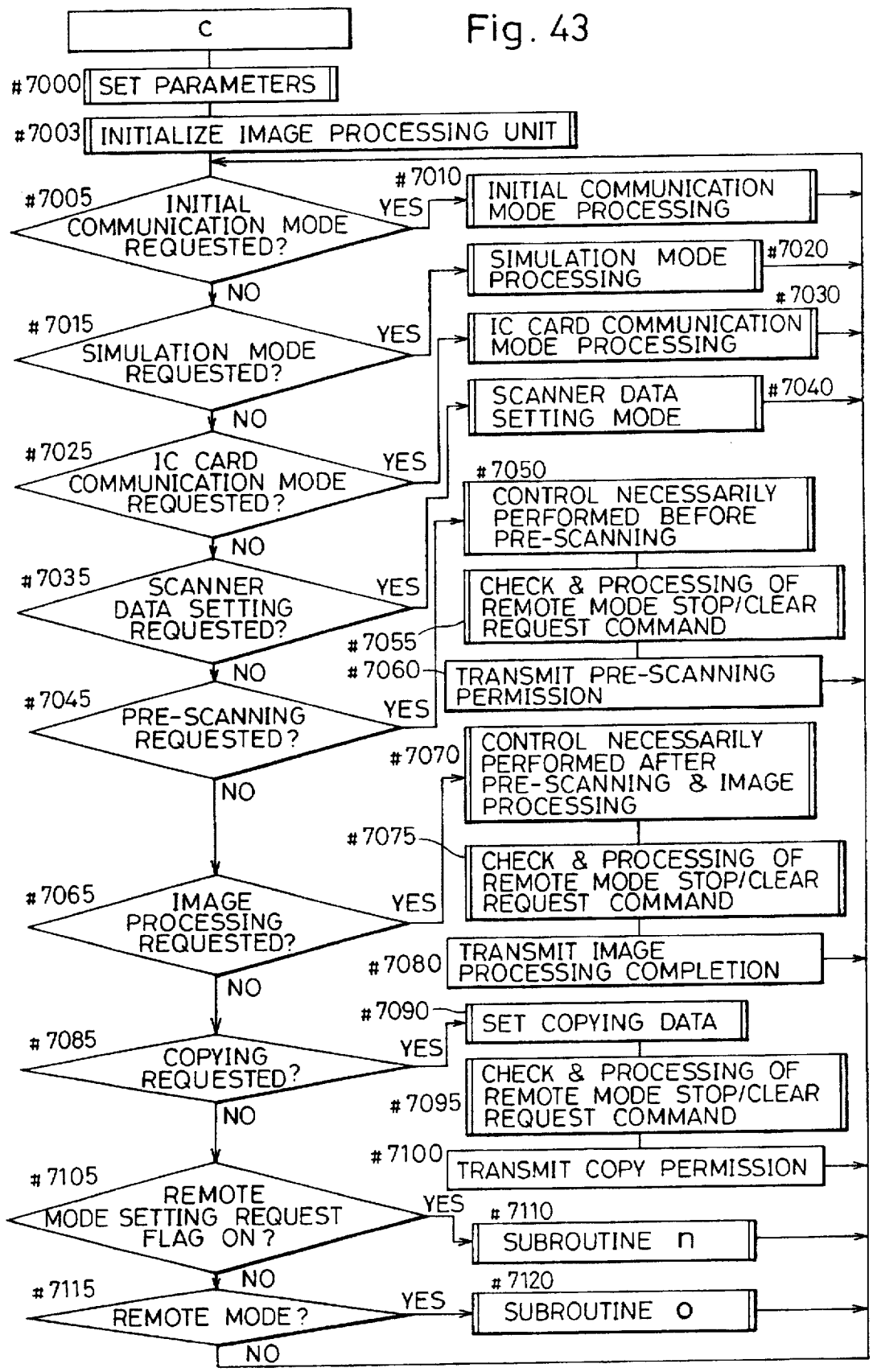
FIG. 43 is a flowchart of a subroutine c.

Referring now to FIG. 43, the section c will be described. In this section, the handshaking for the control of the image processing portion and the control of the copying machine unit 9 is performed. At step #7000, parameters for image processing are set. At step #7003, the hardware of the image processing portion is initialized.

Then, whether an initial communication mode is requested or not and whether the simulation mode is requested or not are determined at steps #7005 and #7015, respectively. The reason that these determinations are performed is as follows: When the power is activated or when the simulation mode is ON, the communication area between the operation portion 10 and the image processing unit IPU is of only 256 byte. However, since various parameters for image processing are necessary in addition thereto, other data corresponding to seven pages (128 byte ×7) are also provided. The data are backed up by the operation portion 10. It is in the simulation mode that the data are received through communication. Therefore, when it is determined that the initial communication mode is requested, the initial communication mode processing is performed at step #7010, and when it is determined that the simulation mode is requested, the simulation mode processing is performed at step #7020.

The settings of functions of the operation portion 10 can be stored in an IC card. An IC card communication mode request is a request for a communication therefor. When it is determined that this request is made, the IC card communication mode processing is performed at step #7030.

Then, in response to the depression of the printing button, predetermined processings are successively performed. First, in order to correct the shading of the scanner, it is necessary to set a data therefor. Since a scanner data setting request is to be transmitted from the operation portion 10, whether such a request is present or not is determined at step #7035. When it is present, the image processing unit IPU sets a scanner data for the scanner at step #7040.

When the scanner data setting is completed, since a prescanning request is to be transmitted from the operation portion 10, whether such a request is present or not is determined at step #7045. When it is present, processing, such as the setting of data for sensing an original or data for automatic exposure, necessarily performed before prescanning is performed at step #7050. The check and processing of the stop/clear request command in the remote mode is performed at step #7055, and thereafter, prescanning-permissible is transmitted to the operation portion 10 at step #7060.

When the pre-scanning is completed, since an image processing request is to be transmitted that the density should be set based on the original sensing and automatic exposure data, whether such a request is present or not is determined at step #7065. When it is present, steps #7070 to #7080 are executed. Then, since an actual copying request is to be transmitted, whether such a request is present or not is determined at step #7085. When it is present, data for copying (e.g. data for dither and data for filter) are set at step #7090, and after the check and processing of the stop/clear request command in the remote mode are performed at step #7095, copy-permissible is transmitted to the operation portion 10 at step #7100.

In the section c, handshaking is always performed with the operation portion 10 in this manner. The check of a remote mode setting request at step #7105 is included in the processing of the section c. That is, the process of the section c normally proceeds round and round in the processing loop, and since the remote mode setting request flag is set when a command from the workstation WS is received in the previously-described section a, whether the remote mode setting request flag is ON or not is determined at step #7105. When it is ON, at step #7110, a subroutine n is executed in which a remote mode setting handshaking is performed. When it is determined that the remote mode setting request flag is not ON, the process proceeds to step #7115, where whether the remote mode is ON or not is determined. When the remote mode is ON, at step #7120, a subroutine o is executed in which the check and processing of the remote mode are performed.

Figure 44:
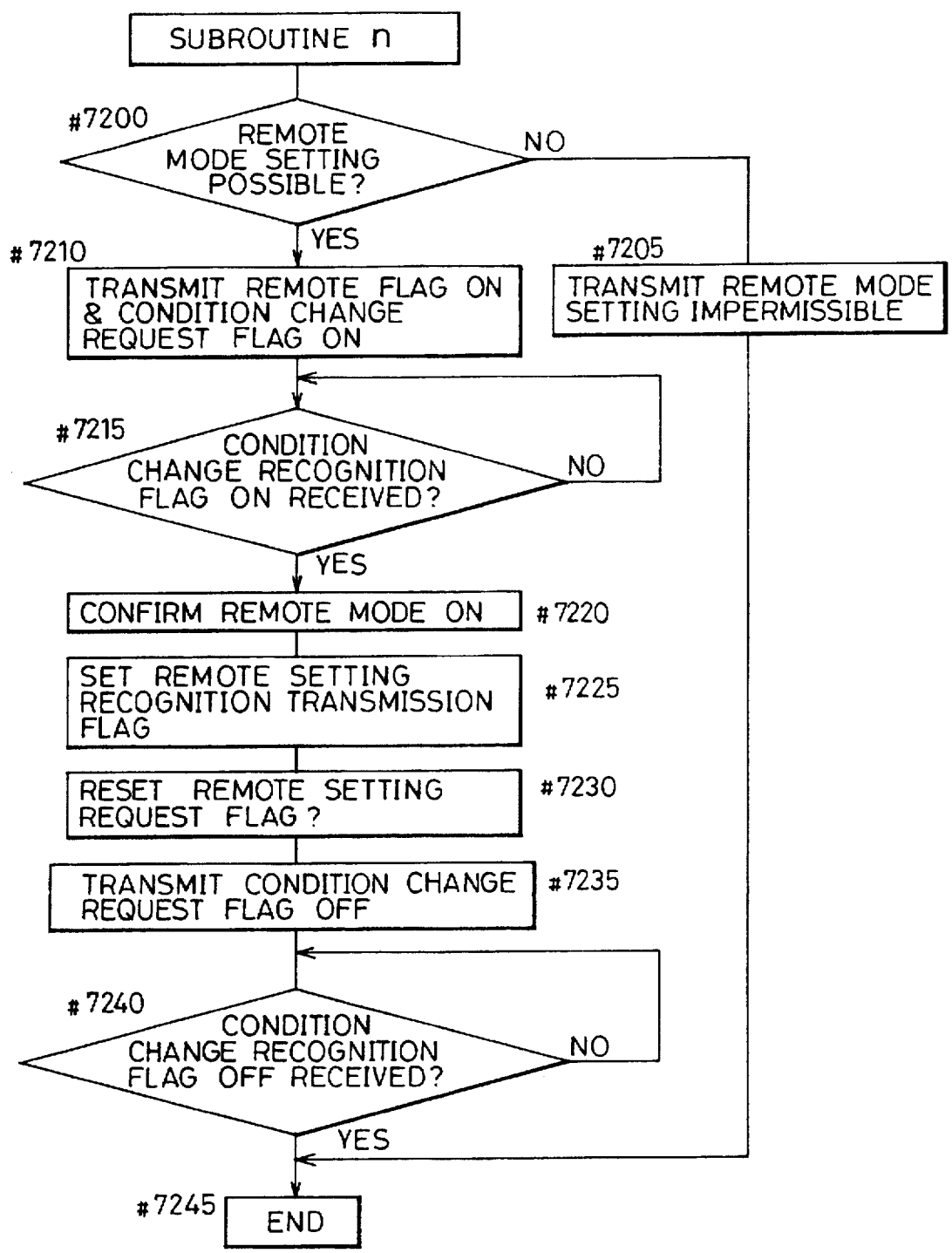
FIG. 44 is a flowchart of a subroutine n.

The subroutine n is, as shown in FIG. 44, a handshaking with the operation portion 10 relating to the remote mode setting. At step #7200, whether it is possible to set the remote mode or not is determined. Since it is impossible to set the remote mode during copying and in the simulation mode, remote-mode-setting-impermissible is transmitted to the workstation WS at step #7205, and this flow ends.

When it is determined that setting of the remote mode is possible, the process proceeds to the flow from step #7210, where a handshaking with the operation portion 10 is performed. First, at step #7210, a remote flag is set and remote-flag-ON is transmitted to the operation portion 10, and condition-change-request-flag-ON is transmitted to request the condition change from the normal condition to the remote mode condition. Then, at the next step #7215, the process waits until a condition change recognition flag is received from the operation portion 10.

When condition-change-recognition-ON is received, it is confirmed at step #7220 that the remote mode has been activated, and after the confirmation, a flag for transmitting the remote setting recognition command to the workstation WS is set at step #7225. Then, a remote setting request flag is reset at step #7230 and condition-change-request-flag-OFF is transmitted to the operation portion 10. The remote setting request flag is reset at step #7230 in order to allow the process to proceed to step #7115 when it comes to step #7105 of the above-described subroutine c again, since the handshaking with the operation portion 10 has been performed.

In the subroutine n of FIG. 44, after step #7235, the process proceeds to step #7240, where the process waits until a data is received showing that the condition change recognition flag for notifying that the condition has been changed is OFF. When it is received, the process proceeds to step #7245 to finish the subroutine n.

Figure 45:
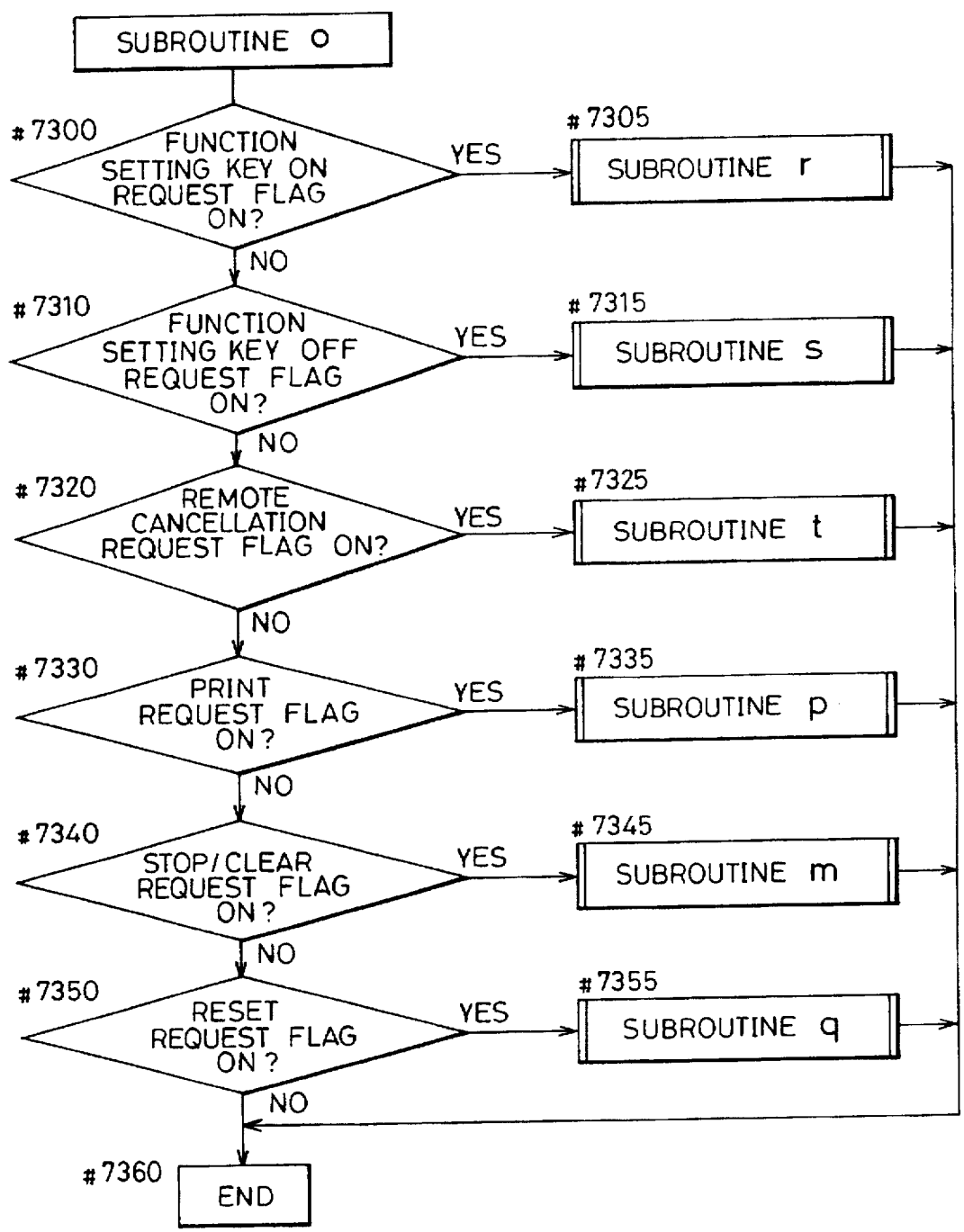
FIG. 45 is a flowchart of a subroutine o.

Referring now to FIG. 45, there is shown a subroutine o in which the check and processing in the remote mode are performed. Specifically, whether a function setting ON request flag has been set or not, whether a function setting OFF request flag has been set or not, whether the remote cancellation request flag has been set or not, whether a printing request flag has been set or not, whether a stop/clear request flag has been set or not and whether a reset request flag has been set or not are determined at steps #7300, #7310, #7320, #7330, #7340 and #7450, respectively. When the result of the determination is yes, the processing at steps #7305, #7315, #7325, #7335, #7345 or #7355 is performed.

Figure 46:
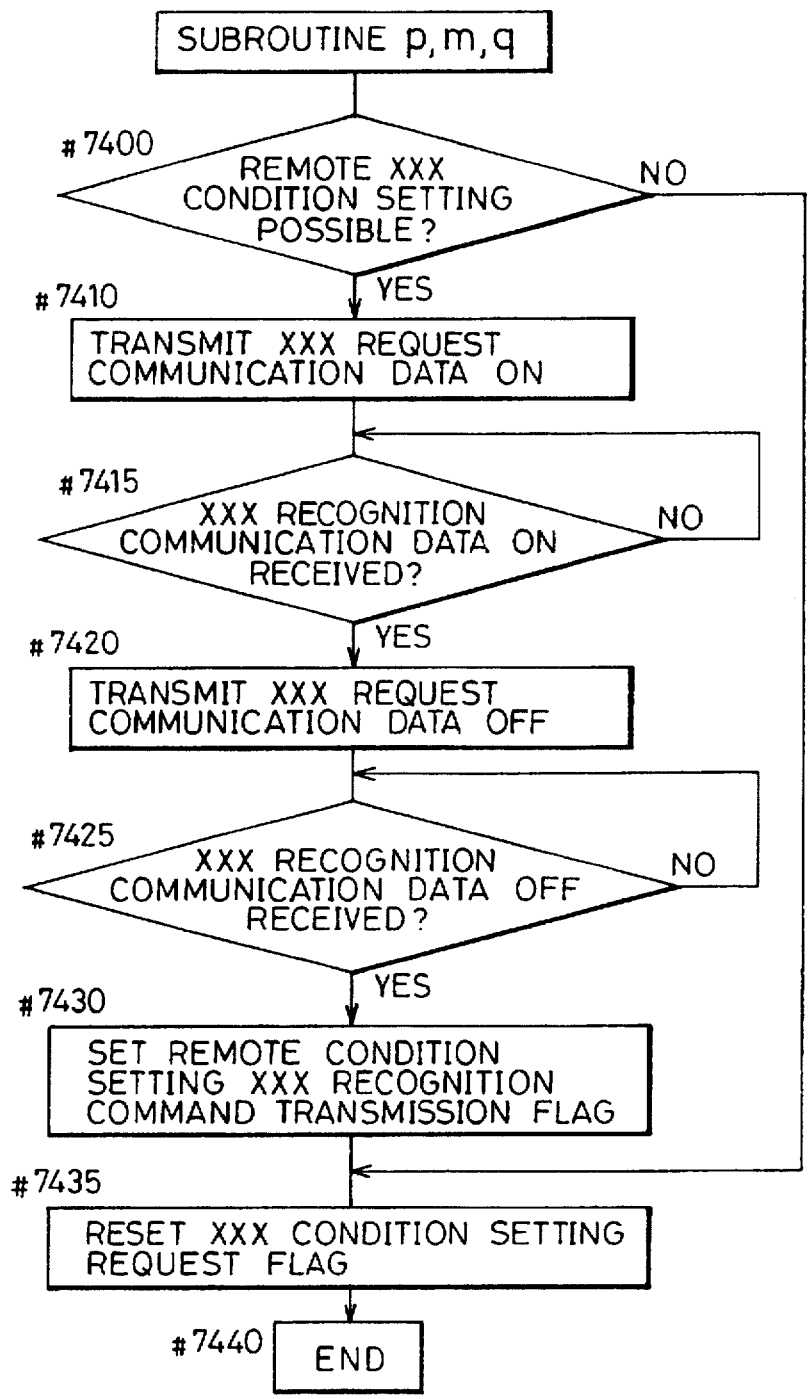
FIG. 46 is a flowchart of subroutines p, m and q.

Of the processings at these steps, a subroutine p at step #7335, a subroutine m at step #7345, and a subroutine q at step #7355 are shown together in FIG. 46. In FIG. 46, xxx indicates printing in the subroutine p, stop/clear in the subroutine m, and resetting in the subroutine q.

First, at step #7400, whether it is possible to set a remote xxx condition or not is determined. When it is impossible, the xxx condition setting request flag is reset at step #7435, and the process proceeds to step #7440 to finish this routine. When it is possible, a handshaking with the operation portion 10 is performed at steps #7410 to #7435. Specifically, at step #7410, a xxx request communication data is set and xxx-request-communication-data-ON is transmitted to the operation portion 10. At step #7415, the process waits until xxx-recognition-communication-data-ON is received from the operation portion 10. When it is received, at step #7420, the xxx request communication data is reset and the xxx-request-communication-data-OFF is transmitted to the operation portion 10, and the process waits until the xxx-recognition-data-OFF is received from the operation portion 10 at step #7425. When it is received, a remote condition setting xxx recognition command transmission flag to be transmitted to the workstation WS is set at step #7430. Then, the xxx condition setting request flag is reset at step #7435, and this subroutine ends at step #7440.

Figure 47:
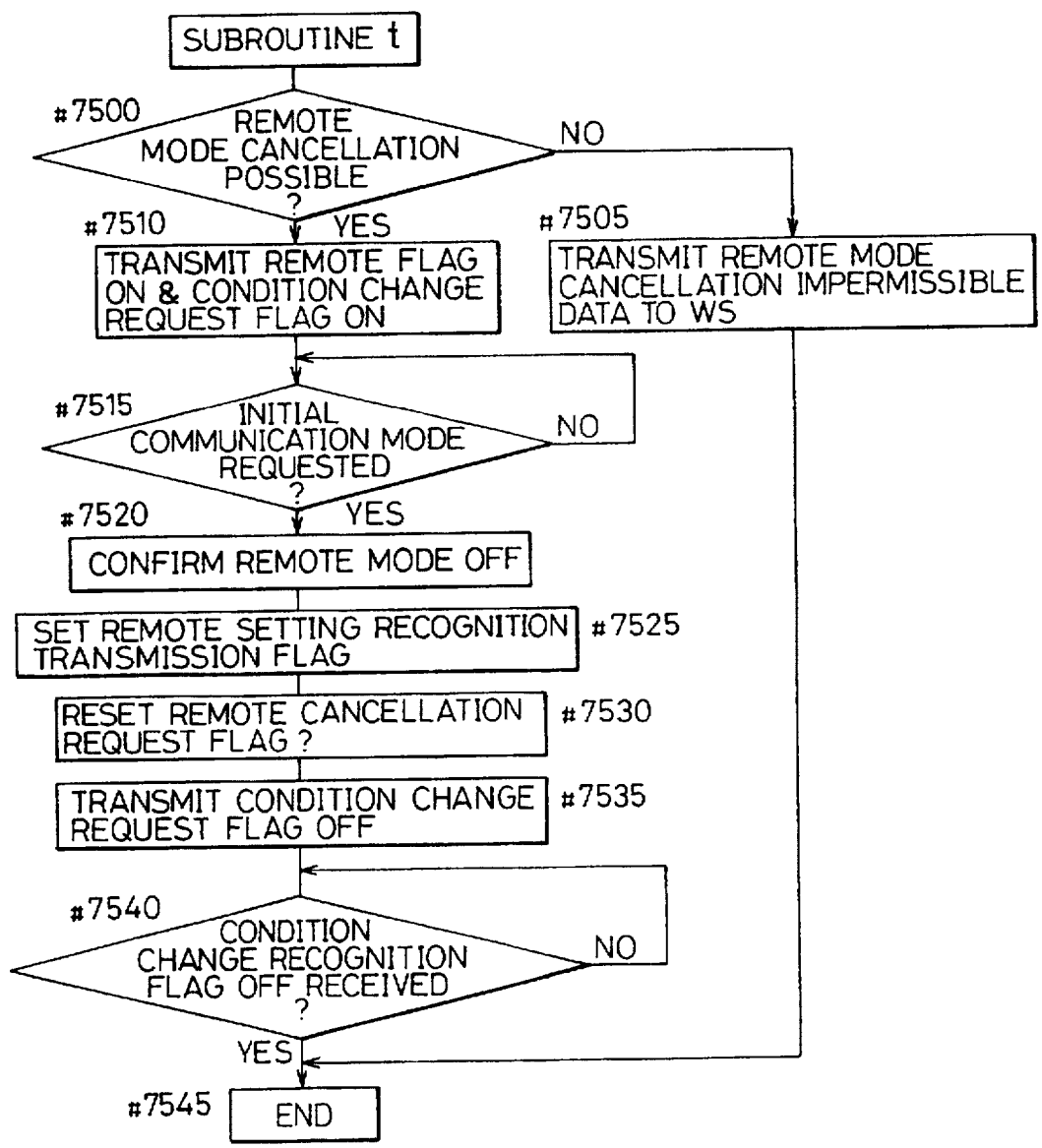
FIG. 47 is a flowchart of a subroutine t.

FIG. 47 shows a subroutine t executed at step #7325 of FIG. 45. This subroutine, in which the remote mode is canceled, is substantially the same as the remote mode setting handshaking shown in FIG. 44 except that "setting" is replaced by "cancellation". Therefore, description thereof will not be given.

Figure 48:
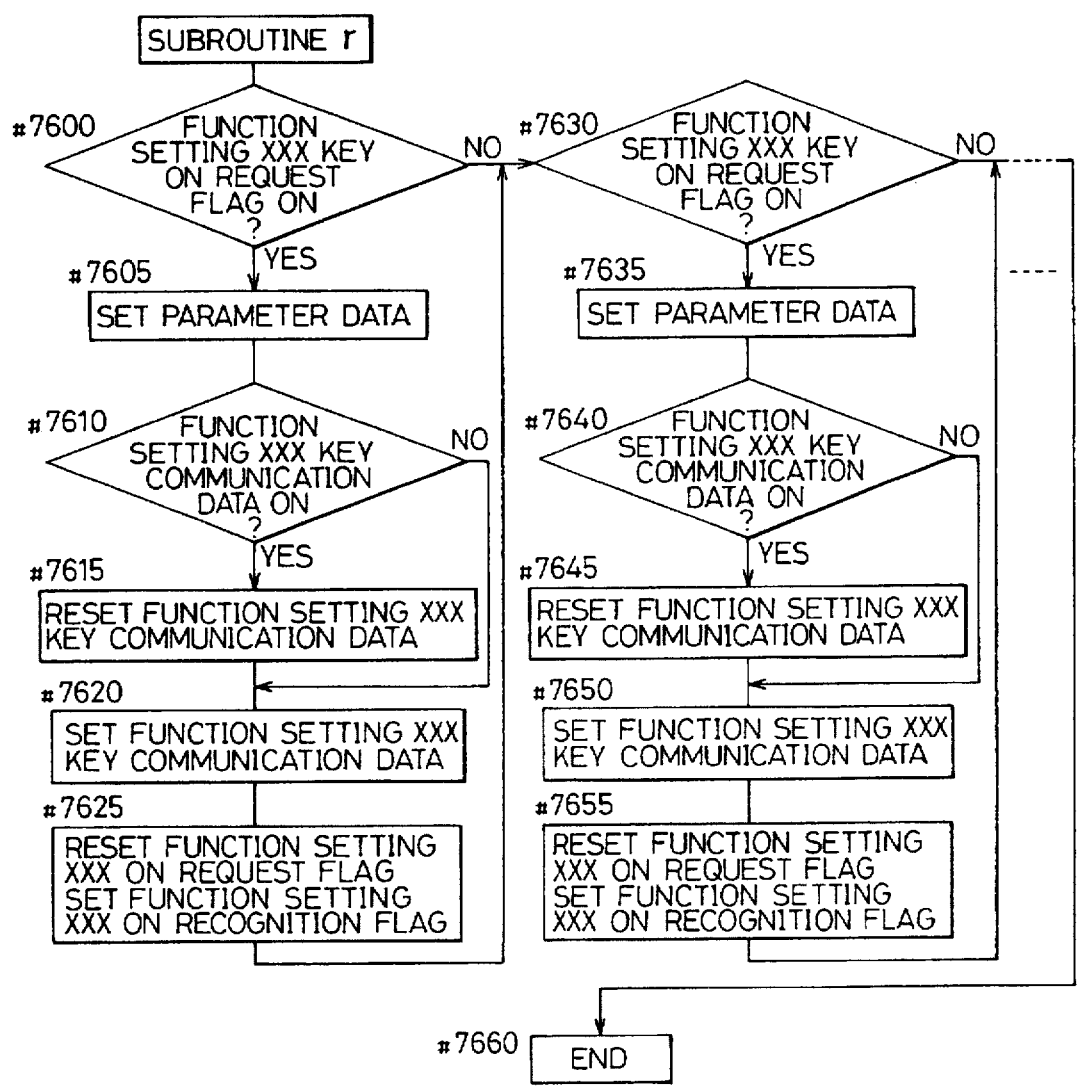
FIG. 48 is a flowchart of a subroutine r.

FIG. 48 shows a function setting key ON subroutine r executed at step #7305 of FIG. 45. In this figure, the processings are shown only from steps #7600 to #7625 and from #7630 to #7655 for two functions of a plurality of prepared functions. Steps #7600 to #7625 will be described here. First, at step #7600, whether a predetermined function setting xxx key ON request flag is ON or not is determined. When it is ON, parameters such as the copy quantity are set at step #7605, and thereafter, whether a function setting xxx key communication data to be transmitted to the operation portion 10 is ON or not is determined at step #7610. When it is ON, it is reset at step #7615 and set again at step #7620. When it is OFF, it is set immediately.

In this process from steps #7610 to #7620, the result of the determination at step #7610 should be no. However, for example, the image processing unit IPU recognizes a command from the workstation WS, and when no command reaches the operation portion 10, the function setting data to be transmitted to the operation portion 10 remains ON. Under such a condition, the same command is re-transmitted from the workstation WS. To cope with this situation, the communication data is reset at step #7615 and set again at step #7620. After the communication data is set at step #7620, a function setting key ON request flag is reset and a function setting key ON recognition flag is set at step #7625.

Figure 49:
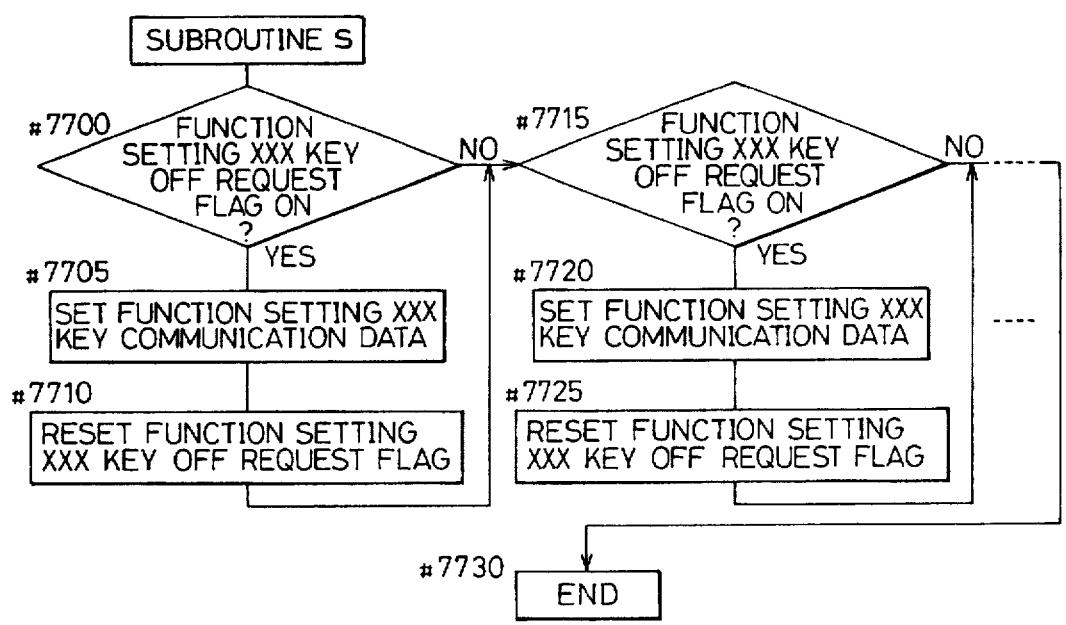
FIG. 49 is a flowchart of a subroutine s.

FIG. 49 shows a function setting key OFF subroutine s executed at step #7315 of FIG. 45. In this routine, a key OFF request flag is set when a data showing that the condition has been changed with respect to a function specified by a key ON is received in the section b where the status check is performed. When the key OFF request flag is set, the key is actually turned off, and the key OFF request flag is reset. Each of steps from #7700 to #7710 and steps #7715 to #7725 corresponds to one function. Similar steps are provided in number corresponding to the number of functions.

Only steps #7700 to #7710 will be described here. First, whether the function setting xxx key OFF request flag is ON or not is determined at step #7700. When it is ON, the function setting xxx key communication data to be transmitted to the operation portion 10 is reset at step #7705, and the function setting xxx key OFF request flag is reset at step #7710.

Finishing the description of the program of the image processing unit IPU, lastly, the flowcharts of the program of the operation portion 10 will be described. The CPU of the operation portion 10 controls the copying machine unit 9, the communication with the copying machine unit 9, the key input on the operation portion, the display on the operation portion 10, the image processing unit IPU, the communication with the image processing unit IPU and the entire system. Only an image processing control handshaking with the image processing unit IPU relating to the remote control will be described here with reference to flowcharts.

When a xxx condition request ON data or a function setting xxx key ON data is received from the image processing unit IPU, a processing similar to that performed when a relevant key on the operation portion 10 is pressed is performed. Information on the status of the copying machine unit 9 is transmitted through the control of the communication with the image processing unit IPU when the status is changed.

Figure 50:
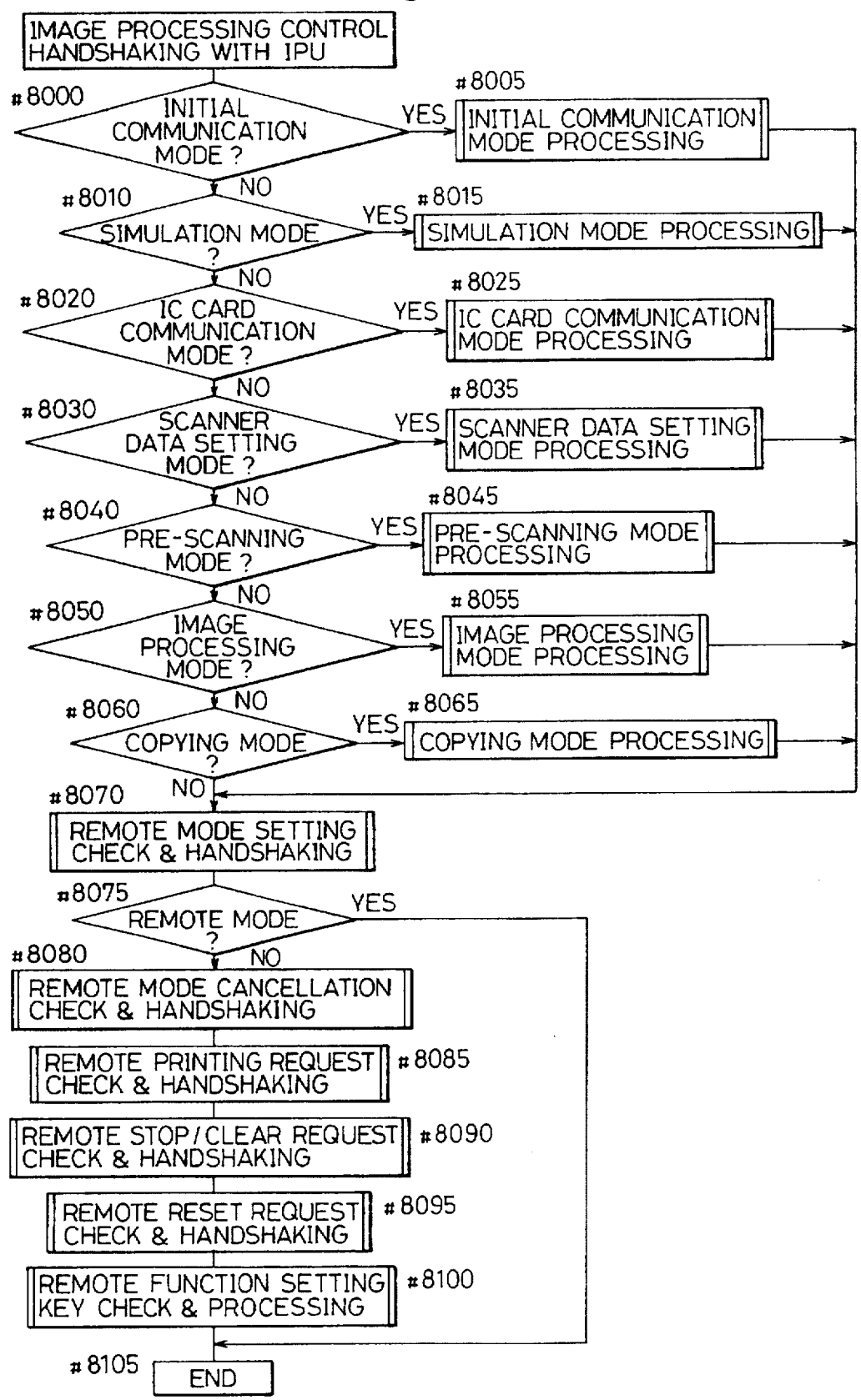
FIG. 50 is a flowchart of a handshaking which the operation portion performs with the IPU.

FIG. 50 is a flowchart of the image processing control handshaking with the image processing unit IPU. The operation portion 10 is provided with internal flags relating to the initial communication mode, the simulation mode, the IC card communication mode, the scanner data setting mode, the prescanning mode, the image processing mode and the copy mode. The determination of conditions of these flags are performed at steps #8000, #8010, #8020, #8030, #8040, #8050 and #8060. When the result of the determination is yes, the processing at steps #8005, #8015, #8025, #8035, #8045, #8055 or #8065 is performed.

Steps #8070 to #8100 relate to the remote mode. First, at step #8070, the check and handshaking for the remote mode setting are performed. When it is determined at step #8075 that the remote mode is ON, this flow ends. When it is determined that the remote mode is not ON, the check and handshaking for the remote mode cancellation, the check and handshaking for the remote printing request, the check and handshaking for the remote stop/clear request, the remote reset request and handshaking, and the remote function setting key check and processing therefor are performed at steps #8080, #8085, #8090, #8095 and #8100, respectively.

Figure 51:
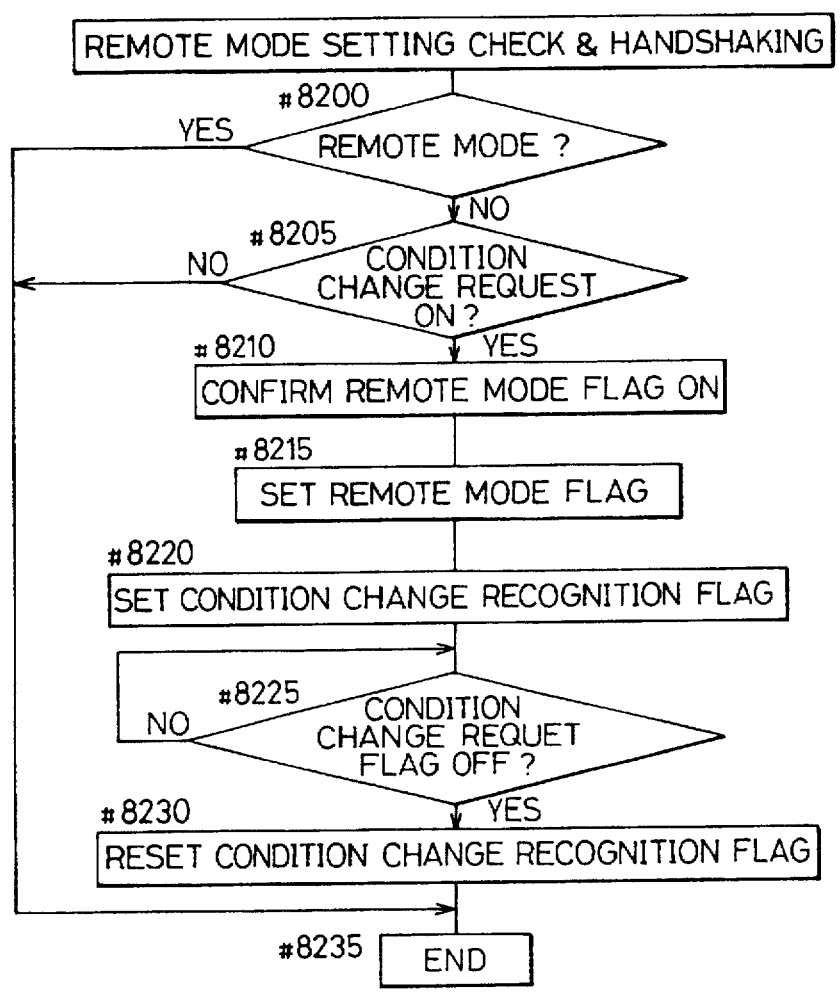
FIG. 51 is a flowchart of a remote mode setting check thereof.

The details of the remote mode setting check flag and handshaking of step #8070 are shown in FIG. 51. At step #8200, whether the remote mode is ON or not is determined. When the remote mode is ON, this flow ends. When the remote mode is not ON, the process proceeds to step #8205, where whether the condition change request is ON or not is determined.

When it is determined that the condition change request is not ON, this flow ends. When it is determined that the condition change request is ON, remote-mode-flag-ON transmitted from the image processing unit IPU is confirmed at step #8210, the remote mode flag to be transmitted to the image processing unit IPU is set at step #8215, and the condition change recognition flag is set at step #8220. Then, at step #8225, the process waits until the condition change request flag from the image processing unit IPU is reset, and at the next step #8230, the condition change recognition flag is reset to finish this flow.

Figure 52:
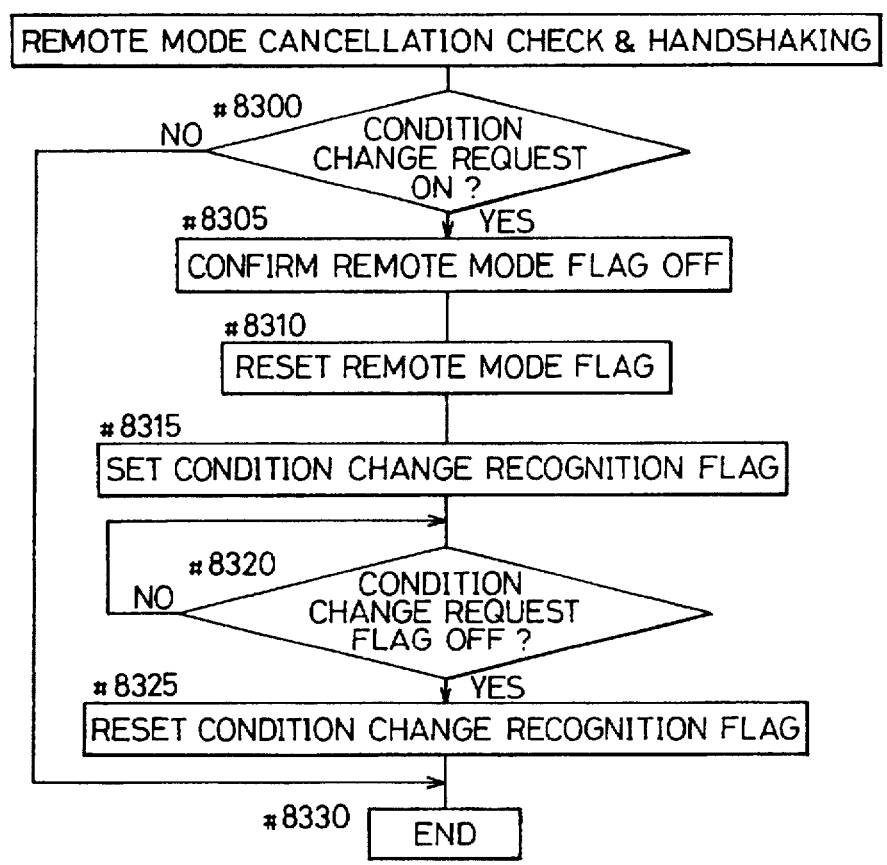
FIG. 52 is a flowchart of a remote mode cancellation check thereof.

The details of the remote mode cancellation check and handshaking performed at step #8080 of FIG. 50 are shown in FIG. 52. No description will be given of this flow, since it is the same as the flow of FIG. 51 except that whether the remote mode is ON or not is determined at step #8200 of FIG. 51 whereas whether the condition change request is ON or not is determined at step #8300 of FIG. 52, and that the ONs at step #8210 and #8215 of FIG. 51 are replaced by OFFs at steps #8305 and #8310 of FIG. 52.

Figure 53:
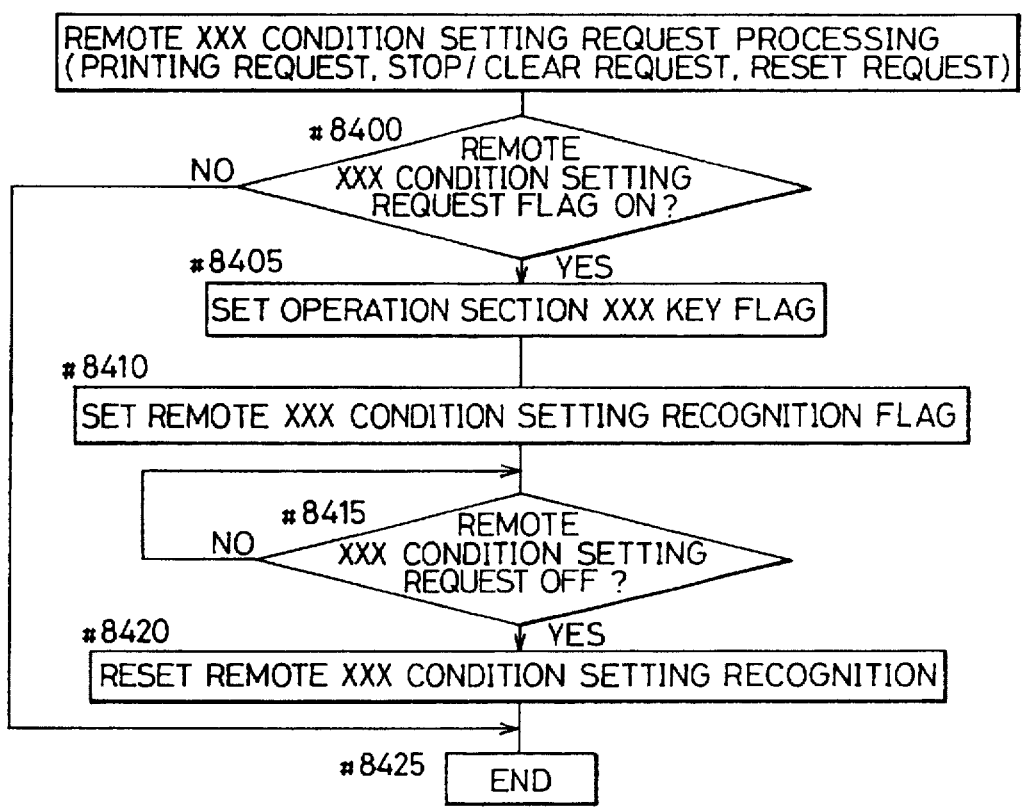
FIG. 53 is a flowchart of a condition setting request processing in the remote mode.

FIG. 53 inclusively shows the details of steps #8085 and #8095 of FIG. 50. The xxx in the figure indicates printing or stop/clear or reset. First, at step #8400, whether a remote xxx condition setting request flag is ON or not is determined. When it is not ON, the process proceeds to step #8425 to finish this flow. When it is ON, an operation portion xxx key flag is set at step #8405.

The operation portion xxx key flag is set when a key not of the remote control window but of the operation portion 10 is operated. However, this flag is set also in this case since in the remote mode, the same operation is performed as that performed when the key of the operation portion is operated.

Then, a remote xxx condition setting recognition flag is set at step #8410, and the process waits until the remote xxx condition setting request flag is reset at step #8415. After the remote xxx condition setting recognition flag is reset at step #8420, the process proceeds to step #8425 to finish this flow.

Figure 54:
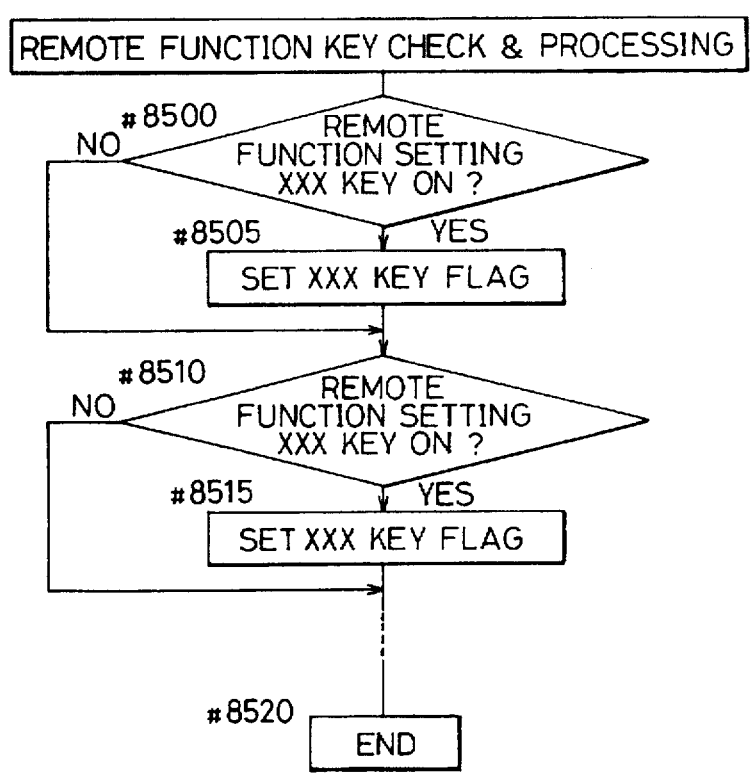
FIG. 54 is a flowchart of a function key check and its processing in the remote mode.

FIG. 54 is a flowchart relating to the function setting key check and processing therefor performed at step #8100 of FIG. 51. When remote-function-setting-xxx-key-ON is received, a key flag of the operation portion 10 is set. In a case where the function setting xxx key is OFF, which is not described herein, it is needless to say that the key flag of the operation portion 10 is reset.

Obviously, many modifications and variations of the present invention are possible in light of the above teachings. It is therefore to be understood that within the scope of the appended claims, the invention may be practiced other than as specifically described.

What is claimed is:

1. An image formation processing system comprising:
   an image forming unit;
   an operation portion including a first central processing unit capable of controlling image formation by the image forming unit based on input data, the operation portion being provided in the image forming unit;
   an image processing unit including a second central processing unit;
   a system housing containing the image forming unit and the image processing unit; and
   a workstation connected to the operation portion through the image processing unit, the workstation being physically remote from the system housing,
   wherein data communication can be performed between the workstation and the image processing unit and between the image processing unit and the operation portion,
   wherein image formation processing by the image forming unit can be controlled based on a command generated by operating the workstation,
   wherein the data include copy condition data whereby the workstation provides copy condition data to the operation portion through the image processing unit,
   wherein the workstation transmits a command to the image processing unit in accordance with a control operation performed by a user and wherein the image processing unit decodes the command, sets a condition of the operation portion in accordance with the command through a communication with the operation portion and notifies the workstation of a result thereof, and
   wherein the operation portion produces image forming unit controlling data of a same format as a format of data generated when a key on the operation portion is locally operated, in accordance with a condition setting request command generated at the workstation.

2. An image formation processing system according to claim 1, wherein when data indicating that the image forming unit has been set in accordance with the command are not returned to the workstation, the workstation re-transmits the command.

3. An image formation processing system according to claim 2, wherein a warning is provided when data indicating that the image forming unit has been set in accordance with the command are not returned to the workstation although the re-transmission of the command has been repeated predetermined times.

4. An image formation processing system according to claim 3, wherein said workstation performs a reception check a predetermined plural number of times each time a command is transmitted and wherein when, in spite of the predetermined plural number of times of the reception check, data indicating the forming unit has been set in accordance with the command are not returned to the workstation although the re-transmission of the command has been repeated the predetermined times, the workstation does not re-transmit the command thereafter.

5. An image formation processing system according to claim 1, wherein said workstation controls the image forming unit in a remote control mode and wherein the remote control mode is capable of operating on a window system of the workstation.

6. An image formation processing system according to claim 1, wherein said workstation is capable of controlling, in response to an operation of a mouse, all copy condition commands of the image forming unit for completely and remotely operating the image forming unit in the remote control mode.

7. An image formation processing system according to claim 1, wherein command data in a remote control mode are provided with a predetermined sign to be distinguished from command data in a terminal mode.

8. An image formation processing system according to claim 7 further comprising:

display controlling means for providing a display association with a remote control mode in the form of a window on a display screen of the workstation, wherein a display associated with the remote control mode is formed in response to an activation of a remote control mode of the workstation, and wherein at the time of the activation of the remote control mode, information on status of the image forming unit is supplied to the workstation as an initial setting of the display window.

9. An image formation processing system according to claim 8, wherein a key window operable by means of a mouse and a display window for only showing information on a condition and a setting of the image forming unit are provided on the display screen.

10. An image formation processing system according to claim 9, wherein the display controlling means changes the color of a character in an operable key window to another color when a mouse pointer is moved in the operable key window and does not change the color of a character in an inoperable key window when the mouse pointer is moved in the inoperable key window.

11. An image formation processing system according to claim 10, wherein the display controlling means returns the color of the character in the operable key window to an original color when the mouse pointer moved in the operable key window is moved out of the operable key window.

12. An image formation processing system according to claim 11, wherein the display controlling means changes the color of the background of an operable key window when an operation button of the mouse is pressed while the mouse pointer is in the key window.

13. An image formation processing system according to claim 9, wherein the key window has a frame and wherein the display window does not have a frame.

14. An image formation processing system according to claim 13, wherein the display controlling means changes the color of the frame of an operable key window to another color when a mouse pointer is moved in the operable key window and does not change the color of the frame of an inoperable key window when the mouse pointer is moved in the inoperable key window.

15. An image formation processing system according to claim 14, wherein the display controlling means returns the color of the frame of the operable key window to its original color when the mouse pointer moved in the operable key window is moved out of the key window.

16. An image formation processing system according to claim 15, wherein the display controlling means changes the color of the background of an operable key window when an operation button of the mouse is pressed while the mouse pointer is in the operable key window.

17. An image formation processing system according to claim 13 wherein the display controlling means changes the operable color of the background of an operable key window when an operation button of the mouse is pressed while the mouse pointer is in the key window.

* * * * *